(12) United States Patent
Oguri et al.

(10) Patent No.: US 7,224,513 B2
(45) Date of Patent: May 29, 2007

(54) PUMPING LIGHT SOURCE HAVING AMPLIFICATION-BAND EXTENDING FUNCTION FOR RAMAN AMPLIFICATION, RAMAN AMPLIFIER USING THE SAME, AND METHOD AND PROGRAM FOR SETTING AMPLIFICATION BAND EXTENSION

(75) Inventors: Atsushi Oguri, Tokyo (JP); Yoshihiro Emori, Tokyo (JP); Shu Namiki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/035,321

(22) Filed: Jan. 14, 2005

(65) Prior Publication Data

US 2005/0179990 A1   Aug. 18, 2005

Related U.S. Application Data

(63) Continuation of application No. PCT/JP03/08991, filed on Jul. 15, 2003.

(30) Foreign Application Priority Data

Jul. 15, 2002  (JP) .............................. 2002-206331
Sep. 24, 2002  (JP) .............................. 2002-278102

(51) Int. Cl.
*H01S 3/00*  (2006.01)
(52) U.S. Cl. ............... 359/334; 359/337.1; 359/341.33

(58) Field of Classification Search ................ 359/334, 359/337.1, 341.33
See application file for complete search history.

(56) References Cited

U.S. PATENT DOCUMENTS

| | | | |
|---|---|---|---|
| 5,861,980 A | 1/1999 | Ono | |
| 6,587,260 B2 | 7/2003 | Kikuchi et al. | |
| 6,690,504 B1 * | 2/2004 | Nagel et al. | 359/334 |
| 6,867,907 B2 * | 3/2005 | Inoue et al. | 359/334 |
| 6,958,856 B2 * | 10/2005 | Inoue et al. | 359/334 |
| 6,966,704 B2 | 11/2005 | Ikeda et al. | |
| 7,050,221 B2 | 5/2006 | Emori et al. | |

FOREIGN PATENT DOCUMENTS

| | | |
|---|---|---|
| EP | 1229616 A2 | 10/2001 |
| JP | 9-83489 | 3/1997 |
| JP | 10-73852 | 3/1998 |
| JP | 2000-105395 | 4/2000 |
| JP | 2001-15845 | 1/2001 |
| JP | 2001-33838 | 2/2001 |
| JP | 2002-82366 | 3/2002 |

* cited by examiner

*Primary Examiner*—Mark Hellner
(74) *Attorney, Agent, or Firm*—Oblon, Spivak, McClelland, Maier & Neustadt, P.C.

(57) ABSTRACT

A pumping light source unit for Raman amplification includes at least one pumping light source that outputs a first pumping light covering a current amplification band; at least one additional pumping light source that outputs a second pumping light covering an amplification band to be extended; and a setting control unit that controls a setting for a gain of an entire amplification band by resetting outputs of the first pumping light and the second pumping light. The pumping light source unit has a function of extending the amplification band in a stepwise manner.

25 Claims, 62 Drawing Sheets

FIG.32

| EMBODIMENT | RAMAN GAIN | FIBER | EXTENSION DIRECTION | C1 | C2 |
|---|---|---|---|---|---|
| 1 | 10dB | TW-RS | SHORT WAVELENGTH | 2.1 | 19 |
| 2 | 5dB | TW-RS | SHORT WAVELENGTH | 2.0 | 19 |
| 3 | 15dB | TW-RS | SHORT WAVELENGTH | 2.1 | 19 |
| 4 | 10dB | SMF | SHORT WAVELENGTH | 3.4 | 31 |
| 5 | 10dB | TW-RS | LONG WAVELENGTH | 1.9 | 20 |

FIG.55

| EMBODIMENT | FIRST EMBODIMENT | SECOND EMBODIMENT | THIRD EMBODIMENT | FOURTH EMBODIMENT | FIFTH EMBODIMENT |
|---|---|---|---|---|---|
| PUMPING LIGHT FREQUENCY INTERVAL | 1THz | 1THz | 1THz | 1THz | 1THz |
| FIBER | TW-RS | TW-RS | TW-RS | SMF | TW-RS |
| RAMAN GAIN [dB] | 10 | 5 | 15 | 10 | 10 |
| EXTENSION DIRECTION | SHORT WAVE-LENGTH DIRECTION | SHORT WAVE-LENGTH DIRECTION | SHORT WAVE-LENGTH DIRECTION | SHORT WAVE-LENGTH DIRECTION | SHORT WAVE-LENGTH DIRECTION |
| FIRST CONDITION | ○ | ○ | ○ | ○ | ○ |
| SECOND CONDITION | ○ | ○ |  | ○ |  |
| THIRD CONDITION |  |  | ○ |  |  |
| FOURTH CONDITION |  |  |  |  |  |
| FIFTH CONDITION |  |  |  |  | ○ |

| EMBODIMENT | SEVENTH EMBODIMENT | EIGHTH EMBODIMENT | NINTH EMBODIMENT | TENTH EMBODIMENT | ELEVENTH EMBODIMENT | TWELFTH EMBODIMENT |
|---|---|---|---|---|---|---|
| PUMPING LIGHT FREQUENCY INTERVAL | 2THz | 2THz | 2THz | 2THz | 2THz | 2THz |
| FIBER | TW-RS | TW-RS | TW-RS | SMF | TW-RS | TW-RS |
| RAMAN GAIN [dB] | 10 | 5 | 15 | 10 | 10 | Net Gain=-7 |
| EXTENSION DIRECTION | SHORT WAVE-LENGTH DIRECTION | SHORT WAVE-LENGTH DIRECTION | SHORT WAVE-LENGTH DIRECTION | SHORT WAVE-LENGTH DIRECTION | SHORT WAVE-LENGTH DIRECTION | SHORT WAVE-LENGTH DIRECTION |
| FIRST CONDITION | ○ | ○ | ○ | ○ | ○ | ○ |
| SECOND CONDITION | ○ | ○ |  | ○ |  | ○ |
| THIRD CONDITION |  | ○ |  |  |  |  |
| FOURTH CONDITION | ○ |  | ○ | ○ | ○ | ○ |
| FIFTH CONDITION |  |  |  |  | ○ |  |

FIG.58

| EMBODIMENT | RAMAN GAIN | FIBER | EXTENSION DIRECTION | C1 | C2 |
|---|---|---|---|---|---|
| 7 | 10dB | TW-RS | SHORT WAVELENGTH | 4.0 | 18 |
| 8 | 5dB | TW-RS | SHORT WAVELENGTH | 3.9 | 18 |
| 9 | 15dB | TW-RS | SHORT WAVELENGTH | 4.0 | 18 |
| 10 | 10dB | SMF | SHORT WAVELENGTH | 6.5 | 29 |
| 11 | 10dB | TW-RS | LONG WAVELENGTH | 3.7 | 20 |

FIG.61

| PUMPING WAVELENGTH [nm] | 1424.2 | 1431.0 | 1437.9 | 1444.8 | 1451.8 | 1458.8 | 1466.0 | 1473.2 | 1480.5 | 1487.8 | 1495.2 | TOTAL [mW] |
|---|---|---|---|---|---|---|---|---|---|---|---|---|
| FIRST EMBODIMENT<br>NECESSARY PUMPING LIGHT OUTPUT [mW] | 65 | 64.5 | 61.7 | 61 | 51.5 | 58.8 | 63.7 | 47 | 0 | 0 | 189.5 | 662.7 |
| FIFTH EMBODIMENT<br>NECESSARY PUMPING LIGHT OUTPUT [mW] | 67.8 | 47.8 | 54.5 | 195.2 | 171.7 | 150.7 | 141.8 | 129.5 | 119.2 | 106 | 93 | 1277.2 |

FIG.63

| | PUMPING WAVELENGTH [nm] | 1424.2 | 1437.9 | 1451.8 | 1466.0 | 1480.5 | 1495.2 | TOTAL [mW] |
|---|---|---|---|---|---|---|---|---|
| SEVENTH EMBODIMENT | NECESSARY PUMPING LIGHT OUTPUT [mW] | 110.0 | 104.0 | 93.3 | 99.4 | 0.0 | 167.7 | 574.4 |
| ELEVENTH EMBODIMENT | NECESSARY PUMPING LIGHT OUTPUT [mW] | 110.0 | 82.0 | 171.2 | 146.3 | 121.3 | 92.7 | 723.5 |

PUMPING LIGHT SOURCE HAVING AMPLIFICATION-BAND EXTENDING FUNCTION FOR RAMAN AMPLIFICATION, RAMAN AMPLIFIER USING THE SAME, AND METHOD AND PROGRAM FOR SETTING AMPLIFICATION BAND EXTENSION

CROSS-REFERENCE TO RELATED APPLICATIONS

This application is a continuation of PCT/JP03/08991 filed on Jul. 15, 2003, the entire content of which are incorporated herein by reference.

BACKGROUND OF THE INVENTION

1) Field of the Invention

The present invention relates to a pumping light source having an amplification-band extending function for Raman amplification, capable of extending an existing amplification band stepwise while maintaining a flat amplification band, a Raman amplifier using the same, and a method and a program for setting an amplification band extension.

2) Description of the Related Art

An amount of information transmission has been increasing rapidly according to the spread of the Internet in recent years. To cope with this rapid increase in the amount of information transmission, an increase in a transmission capacity and an increase in a density of transmission of a transmission system are desired. As a method of expanding a transmittable capacity in a WDM system, there is a method of extending a signal band. As a conventional technique for extending a gain wavelength band of a Raman amplifier used in the WDM system, there is a method of extending the gain wavelength band from a wavelength band of about 1530 nanometers to 1565 nanometers called a C band to a wavelength band of about 1565 nanometers to 1625 nanometers called an L band. This is a method of extending the gain wavelength band from the C band to a (C+L) band at a time (see, for example, Japanese Patent Application Laid-Open No. H10-73852 and Japanese Patent Application Laid-Open No. 2001-15845).

However, when it is unnecessary to extend an amplification band to be larger than a required amplification band, there is a problem in that excess capital investment is performed. In some cases, it is desired to extend an amplification band little by little while controlling initial investment and collecting capital investment costs. In the market, the advent of a flexible Raman amplifier, which is capable of extending a flat amplification band by an extension unit smaller than that in the past, has been demanded.

SUMMARY OF THE INVENTION

It is an object of the present invention to solve at least the above problems in the conventional technology.

A pumping light source unit for Raman amplification according to one aspect of the present invention includes at least one pumping light source that outputs a first pumping light covering a current amplification band; at least one additional pumping light source that outputs a second pumping light covering an amplification band to be extended; and a setting control unit that controls a setting for a gain of an entire amplification band by resetting outputs of the first pumping light and the second pumping light. The pumping light source unit has a function of extending the amplification band in a stepwise manner.

A Raman amplifier according to another aspect of the present invention amplifies an input signal light using a pumping light source for Raman amplification that includes at least one pumping light source that outputs a first pumping light covering a current amplification band; at least one additional pumping light source that outputs a second pumping light covering an amplification band to be extended; and a setting control unit that controls a setting for a gain of an entire amplification band by resetting outputs of the first pumping light and the second pumping light. The pumping light source unit has a function of extending the amplification band in a stepwise manner.

A method of setting outputs of pumping lights from each of a plurality of pumping light sources used when extending an amplification band in a stepwise manner, according to still another aspect of the present invention, includes acquiring pumping light wavelengths of a pumping light source covering a current amplification band and an additional pumping light source, and a history of an output of a pumping light of the pumping light source; determining an output of a pumping light of each of the pumping light sources in such a manner that a total output of the pumping light at each stage of amplification band extension is proportional to number of pumping wavelengths; and resetting an output of a pumping light of a pumping light source having the respective pumping light wavelengths determined at the determining.

A method of setting outputs of pumping lights from each of a plurality of pumping light sources used when extending an amplification band in a stepwise manner, according to still another aspect of the present invention, includes acquiring pumping light wavelengths of a pumping light source covering a current amplification band and an additional pumping light source, and a history of an output of a pumping light of the pumping light source; determining an output of a pumping light of each of the pumping light sources in such a manner that a total output of pumping lights P in milliwatt in each stage of amplification band extension satisfies a condition $$P = (C1 \cdot n + C2)G$$

where n is number of pumping wavelengths, G is a Raman gain in decibel, and C1 and C2 are constants that are set for each amplifier to which the pumping light source unit is applied; and resetting an output of a pumping light of a pumping light source having the respective pumping light wavelengths determined at the determining.

A method of setting outputs of pumping lights from each of a plurality of pumping light sources used when extending an amplification band in a stepwise manner, according to still another aspect of the present invention, includes acquiring pumping light wavelengths of a pumping light source covering a current amplification band and an additional pumping light source, and a history of an output of a pumping light of the pumping light source; determining an output of a pumping light of each of the pumping light sources to satisfy a condition that an output of a pumping light in a longest wavelength at each stage of amplification band extension is reduced sequentially with progress of stages, a condition that, when an amplification band is extended to a short wavelength side, an output of a pumping light of a pumping light source that has a shortest wavelength according to a combination of each of the pumping light sources at each stage is maximized, and when an amplification band is extended in a long wavelength side, maximizing a pumping light output in a pumping light source, which has a longest pumping light wavelength, according to a combination of the respective pumping light sources at each stage, and a condition that either an output of a pumping light of a pumping light source that has a longest wavelength at each stage or an output of a pumping light of a pumping light source that has a shortest wavelength is maximized; and resetting an output of a pumping light of a pumping light source having the respective pumping light wavelengths determined at the determining.

A computer-readable recording medium according to still another aspect of the present invention stores a computer program that causes a computer to execute the above methods according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 32 is a table of values of constants C1 and C2 at the time when a relation of a total pumping output to the number of pumping wavelengths in the first to the fifth embodiments is represented by expressions;

FIG. 55 is a table of a correspondence relation of the first to the fifth conditions applied to the first to the twelfth embodiments;

FIG. 58 is a table of values of constants C1 and C2 at the time when a relation of a total pumping light output to the number of pumping wavelengths according to the seventh to the eleventh embodiments is represented by an expression;

FIG. 61 is a table of comparative data of pumping light outputs that are required for respective pumping wavelength according to the first and the fifth embodiments;

FIG. 63 is a table of comparative data of pumping light outputs that are required for respective pumping wavelengths according to the seventh and the eleventh embodiments;

DETAILED DESCRIPTION

Exemplary embodiments of a pumping light source for Raman amplification, a Raman amplifier using the same, and a method and a program for setting an amplification band extension according to the present invention will be explained in detail below with reference to the accompanying drawings.

Figure 1:
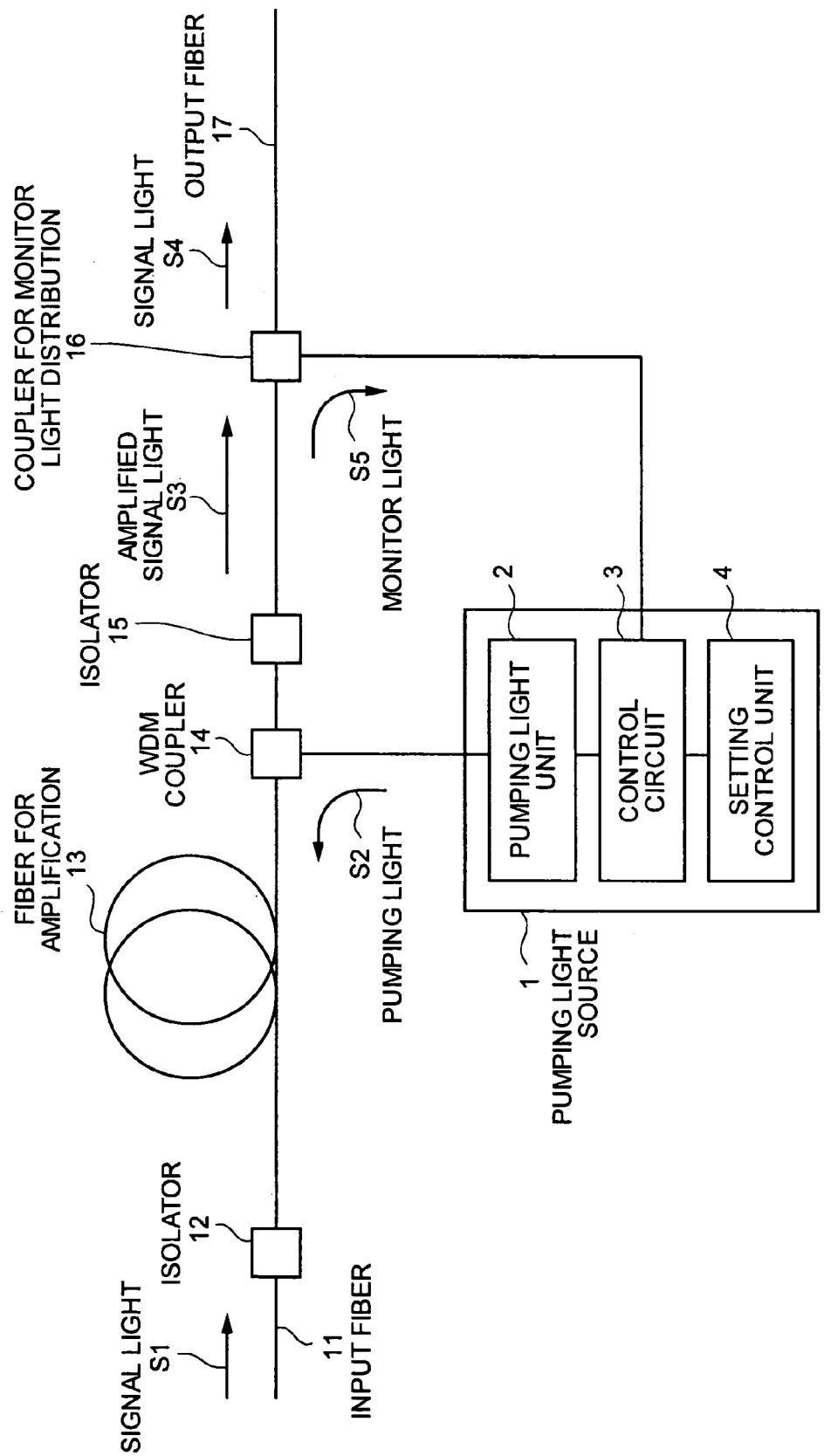
FIG. 1 is a schematic diagram of a Raman amplifier according to a first embodiment of the present invention.

FIG. 1 is a schematic diagram of a Raman amplifier according to a first embodiment of the present invention. In FIG. 1, this Raman amplifier has a pumping light source 1 and adopts a backward pumping system in which this pumping light source 1 outputs pumping light S2 having plural pumping light wavelengths to a fiber for amplification 13 via a WDM coupler 14. Here, when signal light S1, which is an object of amplification, is inputted to the fiber for amplification 13 via an isolator 12, this signal light S1 is amplified and inputted to a coupler for monitor light distribution 16 as amplified signal light S3 via an isolator 15. The coupler for monitor light distribution 16 outputs a part of the amplified signal light S3 to the pumping light source 1 and outputs the remaining amplified signal light S3 to an output fiber 17 as amplified signal light S4. Although the backward pumping system is adopted according to the first embodiment, it is also possible to apply the present invention not only to this backward pumping system but also to a forward pumping system or a bidirectional pumping system according to the first embodiment and embodiments to be described below.

The pumping light source 1 includes a pumping light unit 2, a control circuit 3, and a setting control unit 4. The pumping light unit 2 multiplexes pumping lights of plural wavelengths for pumping and outputs the pumping lights as the pumping light S2. The control circuit 3 controls laser output states, for example, optical outputs of respective semiconductor lasers in the pumping light unit 2 based on light of a part of the amplified signal light S3 inputted from the coupler for monitor light distribution 16 and performs feedback control such that a gain band of Raman amplification has a flat characteristic. When a new pumping light source is added to the pumping light unit 2, the setting control unit 4 instructs the control circuit 3 to apply control for resetting initial values of pumping light outputs for respective pumping light sources to all the pumping light sources including this new pumping light source such that an extended amplification band has a flat characteristic.

Figure 2:
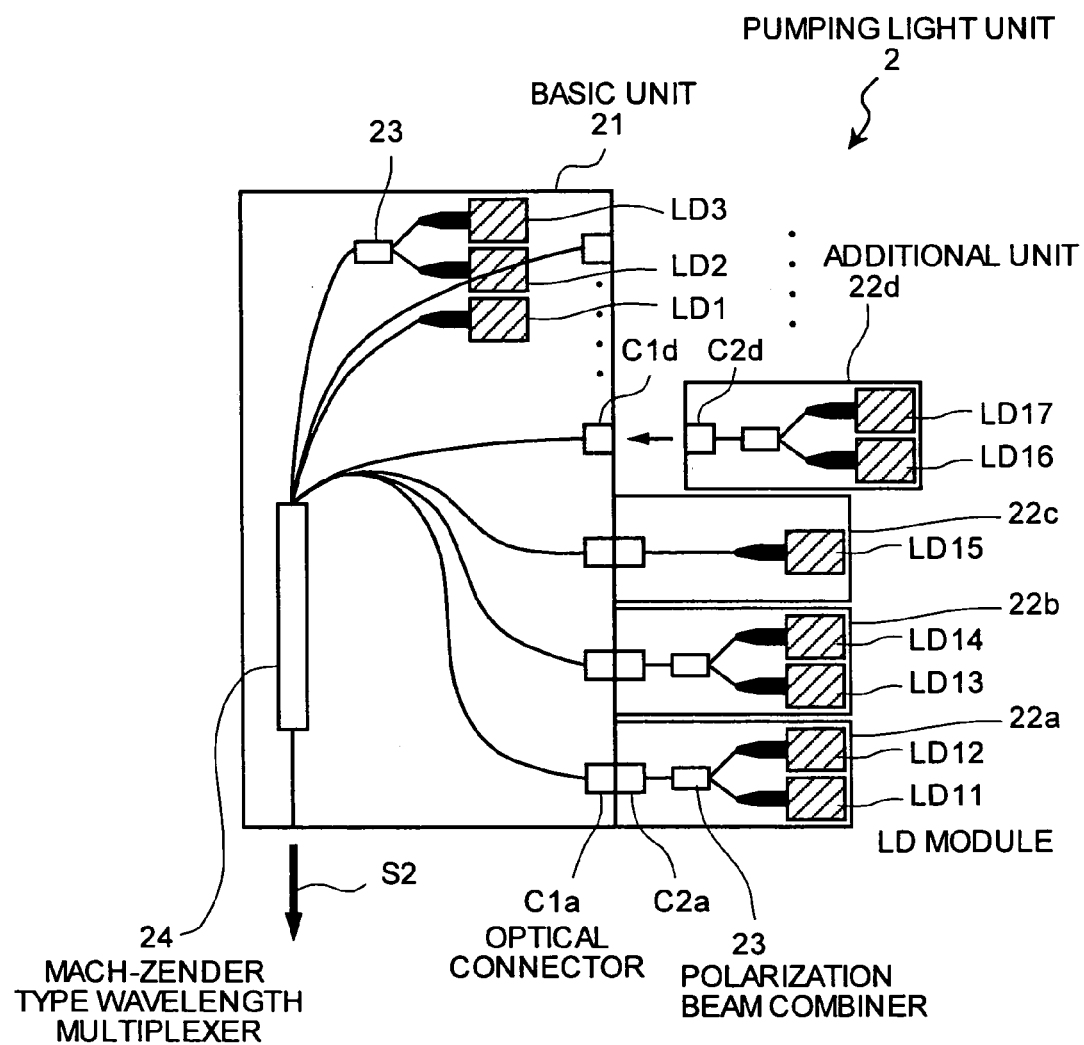
FIG. 2 is a diagram of a structure of a pumping light source shown in FIG. 1.

With reference to FIG. 2, a detailed structure of the pumping light unit 2 will be explained. In FIG. 2, the pumping light unit 2 includes a basic unit 21 and additional units 22a to 22d. The basic unit 21 and the additional units 22a to 22d are connected by optical connectors C1a to C1d and C2a to C2d. The basic unit 21 includes laser diode (LD) modules LD1 to LD3, which are pumping light sources forming an amplification band before extension, and a Mach-Zender type wavelength multiplexer 24. Pumping lights outputted from the LD modules LD1 to LD3 are inputted to the Mach-Zender type wavelength multiplexer 24 via a fiber, and pumping lights are inputted to the Mach-Zender type wavelength multiplexer 24 from the connectors C1a to C1d via an optical fiber. The Mach-Zender type wavelength multiplexer 24 multiplexes inputted pumping lights of respective wavelengths, and outputs the pumping lights as the pumping light S2. Pumping lights outputted from the LD modules LD2 and LD3 are subjected to polarization composition by a polarization beam combiner 23 and outputted to the Mach-Zender type wavelength multiplexer 24. By performing the polarization composition in this way, a larger pumping light output can be obtained and, since polarization dependency of pumping light is eliminated, it is possible to realize stabilization of Raman amplification. Note that, in the case of an LD module outputting pumping light of one wavelength like the LD module LD1, means for unpolarizing a laser beam outputted from the LD module may be provided.

On the other hand, the additional units 22a to 22d are units of pumping light sources having one or more LD modules and have the connectors C2a to C2d connectable to the optical connectors C1a to C1d. Note that the additional units 22a, 22b, and 22d have two LD modules LD11 and LD12, LD13 and LD14, and LD16 and LD17, respectively, and subject pumping lights to polarization composition with the polarization beam combiner 23 to output the pumping lights to the outside. The additional unit 22c has an LD module LD15 that outputs only one pumping light.

The additional units 22a to 22c are units that have already been constituted additionally for extension of an amplification band. The additional unit 22d is a unit that is to be constituted additionally to further extend the amplification band. With such an additional structure of the additional units 22a to 22d, it is possible to extend a small amplification band stepwise. Note that, although the four additional units 22a to 22d are indicated in the pumping light unit 2 described above, additional units may be further added. In this case, an optical connector for connection only has to be provided. In addition, although the basic unit 21 uses the Mach-Zender type wavelength multiplexer 24, this Mach-Zender type wavelength multiplexer 24 may be a fiber type or may be a planar lightwave circuit (PLC) type. When an LD module for outputting high-power pumping light is present, the pumping light may be multiplexed with pumping lights of the other LD modules by the Mach-Zender type wavelength multiplexer and, then, finally multiplexed by a WDM wavelength multiplexer having a low loss.

The laser diode modules LD1 to LD3 serving as pumping light sources forming an amplification band before extension may be mounted on separate units and connected to the basic unit in the same manner as the additional units.

Figure 3:
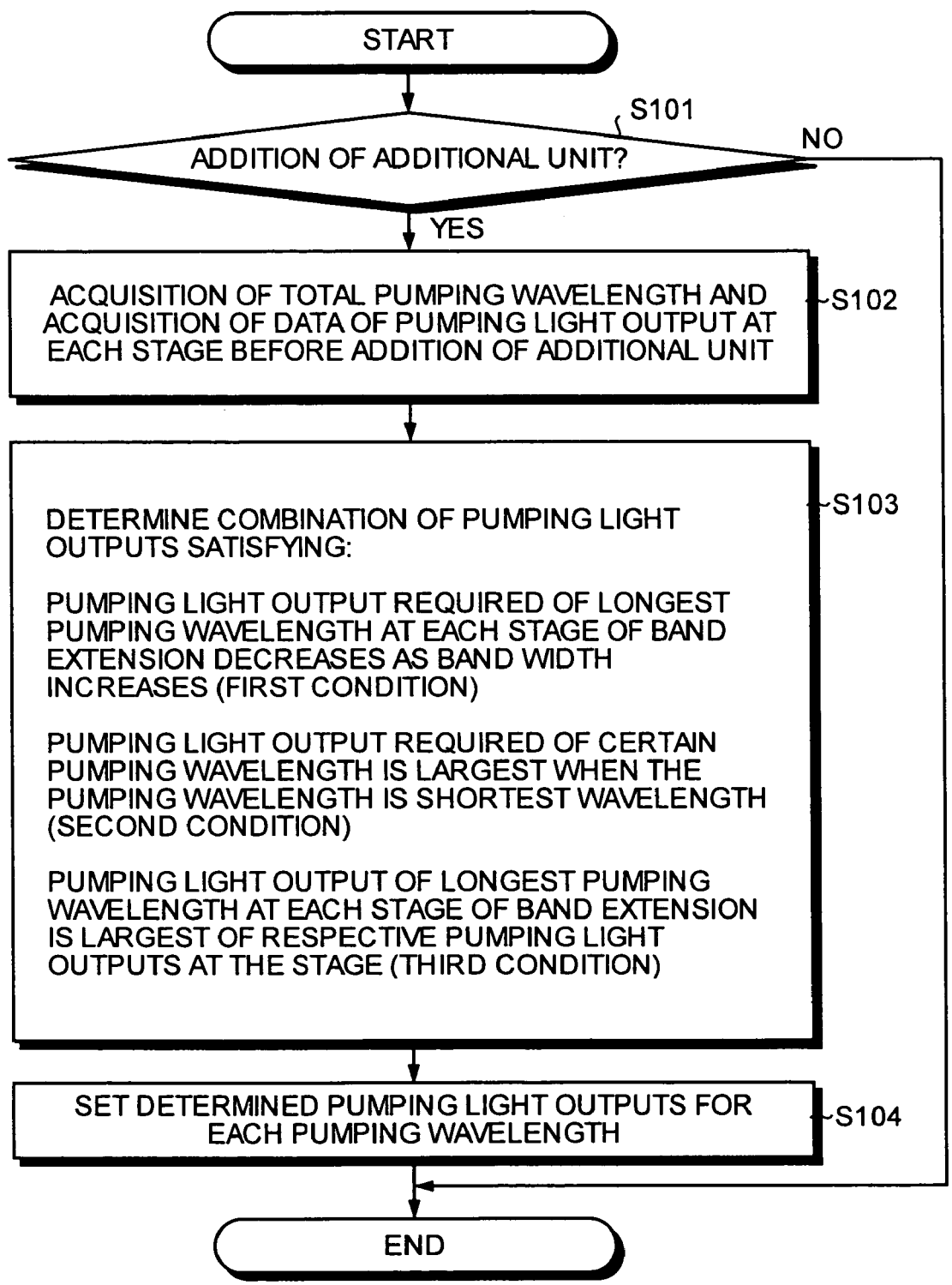
FIG. 3 is a flowchart of a setting control processing procedure by a setting control unit shown in FIG. 1.

Next, a pumping light output control processing procedure involved in the amplification band extension by the setting control unit 4 will be explained with reference to FIG. 3. Note that, in this explanation, extension of an amplification band is performed in a short wavelength direction, respective pumping light frequency intervals are 1 terahertz, and a Raman gain is about 10 decibels or less. In FIG. 3, first, the setting control unit 4 judges whether an additional unit is installed (step S101). It is possible to perform this judgment on whether an additional unit is installed according to, for example, whether new additional units are connected to the optical connectors C1a to C1d of the basic unit 21. Alternatively, when an operator adds an additional unit, the setting control unit 4 may judge that an additional unit is installed at a stage when a pumping light wavelength of the additional unit is inputted. If there is no installation of an additional unit (NO at step S101), the setting control unit 4 ends the processing.

On the other hand, if there is installation of an additional unit (YES at step S101), the setting control unit 4 further performs processing described below. First, the setting control unit 4 acquires all pumping wavelengths and acquires data of pumping light outputs at each stage before the installation of the additional unit (step S102). Then, the setting control unit 4 determines combinations of pumping light outputs, which satisfy first to third conditions to be described below, for all pumping light sources included in the LD modules already set and the LD module added anew (step S103).

Thereafter, the setting control unit 4 instructs the control circuit 3 to reset the determined pumping light outputs for each of the pumping light sources that output the respective pumping wave lengths (step S104) and ends the setting control processing. Note that the resetting by the setting control unit 4 is an initial setting at the time of extension of an amplification band. Fine pumping light output control and the like for the respective pumping light sources after that are performed by the control circuit 3.

Figure 4:
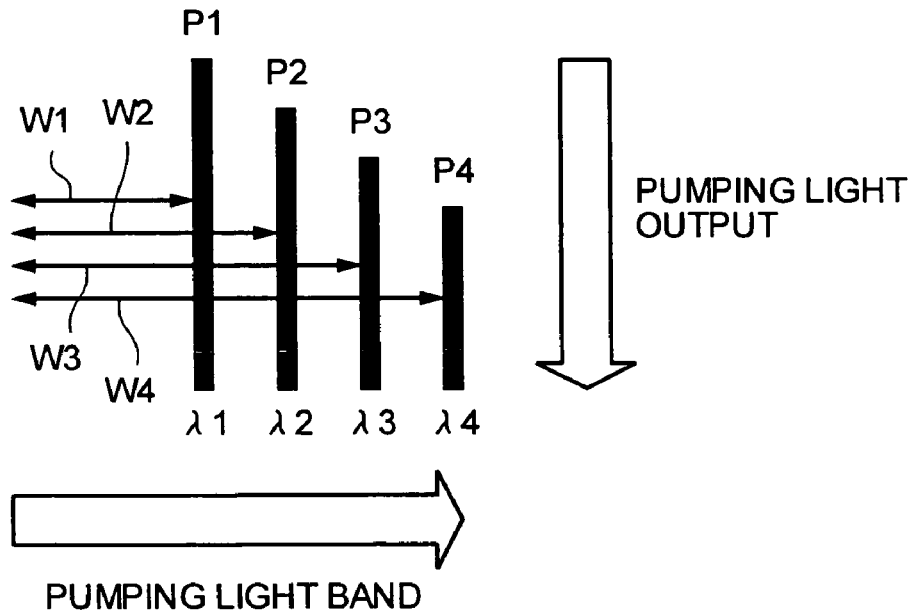
FIG. 4 is a schematic diagram for explaining a first condition at the time when an amplification band is extended to a long wavelength side.
Figure 5:
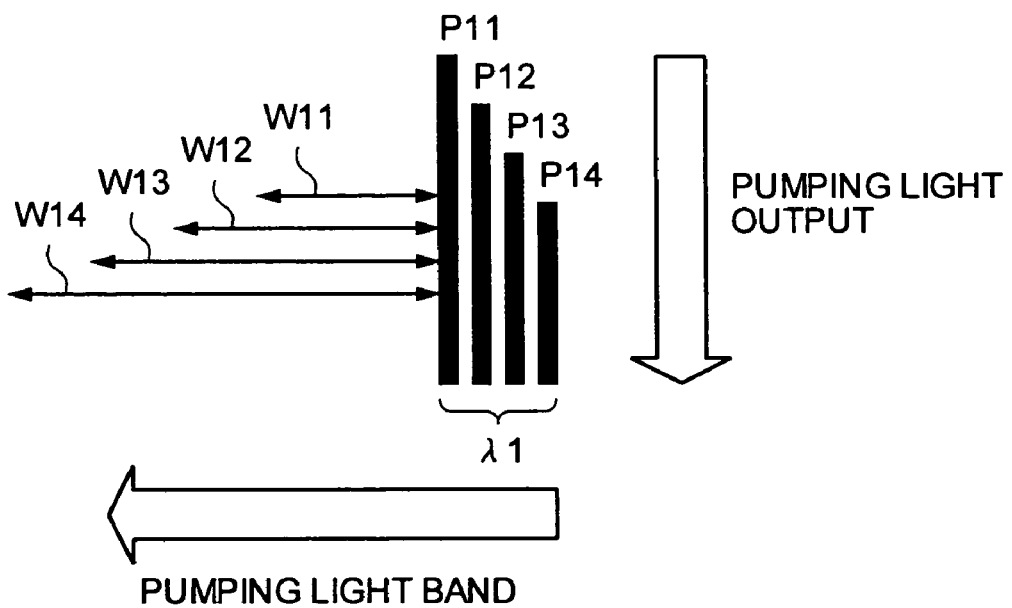
FIG. 5 is a schematic diagram for explaining a first condition at the time when an amplification band is extended to a short wavelength side.

Here, the first condition means that a pumping light output required of a longest pumping wavelength at each stage of the band extension decreases as a band width increases. FIGS. 4 and 5 are diagrams schematically showing this first condition. FIG. 4 indicates the first condition at the time when an amplification band is extended to a long wavelength side. This condition is that, when an amplification band is extended to pumping light bands W1 to W4 according to amplification band extension, a longest pumping wavelength is sequentially changed to wavelengths $\lambda 1$ to $\lambda 4$, and pumping light outputs P1 to P4 of the wavelengths $\lambda 1$ to $\lambda 4$ at each stage sequentially decrease. On the other hand, FIG. 5 indicates a first condition at the time when an amplification band is extended to a short wavelength side. This condition is that, when an amplification band is extended to pumping light bands W11 to W14 according to amplification band extension, the longest pumping wavelength $\lambda 1$ is not changed, and the pumping light outputs P11 to P14 at each stage sequentially decrease. Note that, since an amplification band is extended to a short wavelength side according to the first embodiment, the first embodiment corresponds to FIG. 5.

Figure 6:
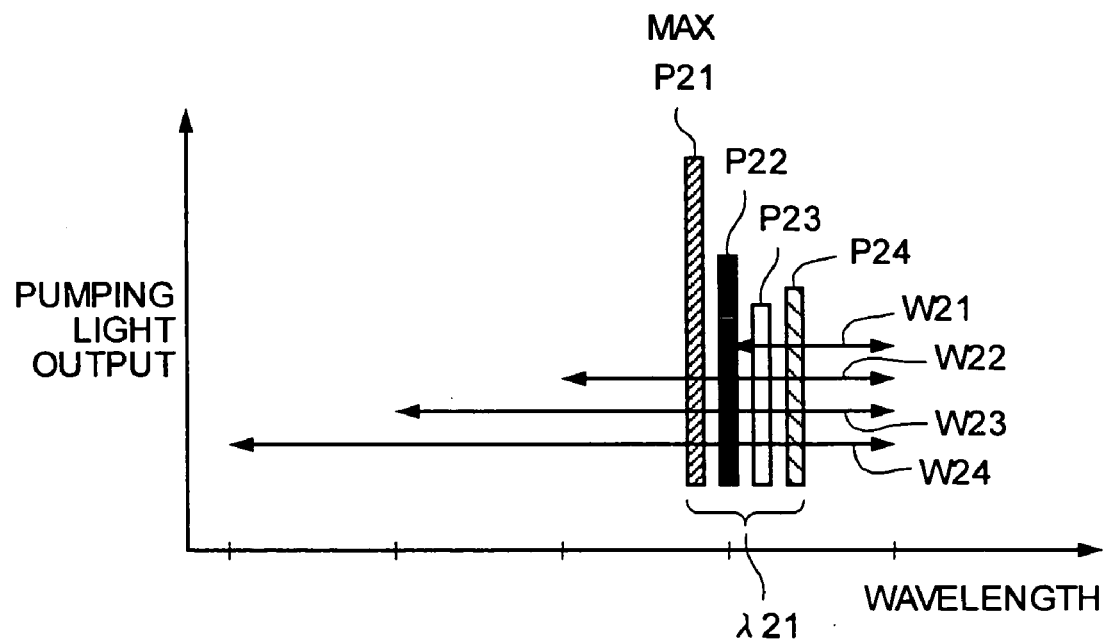
FIG. 6 is a schematic diagram for explaining a second condition.

The second condition means that a pumping light output required of a certain pumping wavelength is the largest when the pumping wavelength is a shortest wavelength. FIG. 6 is a diagram schematically showing this second condition. In FIG. 6, when an amplification band is extended to pumping light band widths W21 to W24 according to amplification band extension, a certain pumping wavelength $\lambda 21$ is commonly used in respective stages, and pumping light outputs are reset to P21 to P24, respectively. In this case, the pumping wavelength $\lambda 21$ becomes a shortest wavelength at the pumping light band width W21. When the pumping wavelength $\lambda 21$ becomes a shortest wavelength in a combination of stages, the pumping light output P21 of the pumping wavelength $\lambda 21$ at that point is reset to be the largest compared with the other pumping light outputs P22 to P24. Note that this second condition is applied to the case in which the amplification band is extended to the short wavelength side.

Figure 7:
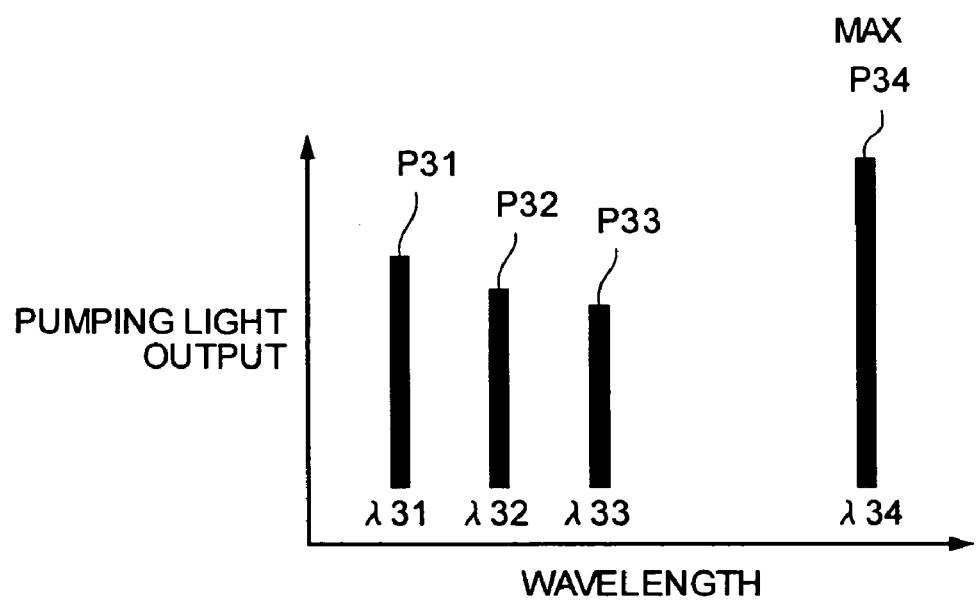
FIG. 7 is a schematic diagram for explaining a third condition.

The third condition means that a pumping light output of a longest pumping wavelength at each stage of band extension is the largest of respective pumping light outputs at the stage. FIG. 7 is a diagram schematically showing this third condition. In FIG. 7, pumping wavelengths $\lambda 31$ to $\lambda 34$ are combined wavelengths at certain stages and are reset such that a pumping light output P34 of the longest pumping wavelength $\lambda 34$ among the pumping wavelengths is the largest.

Figure 8:
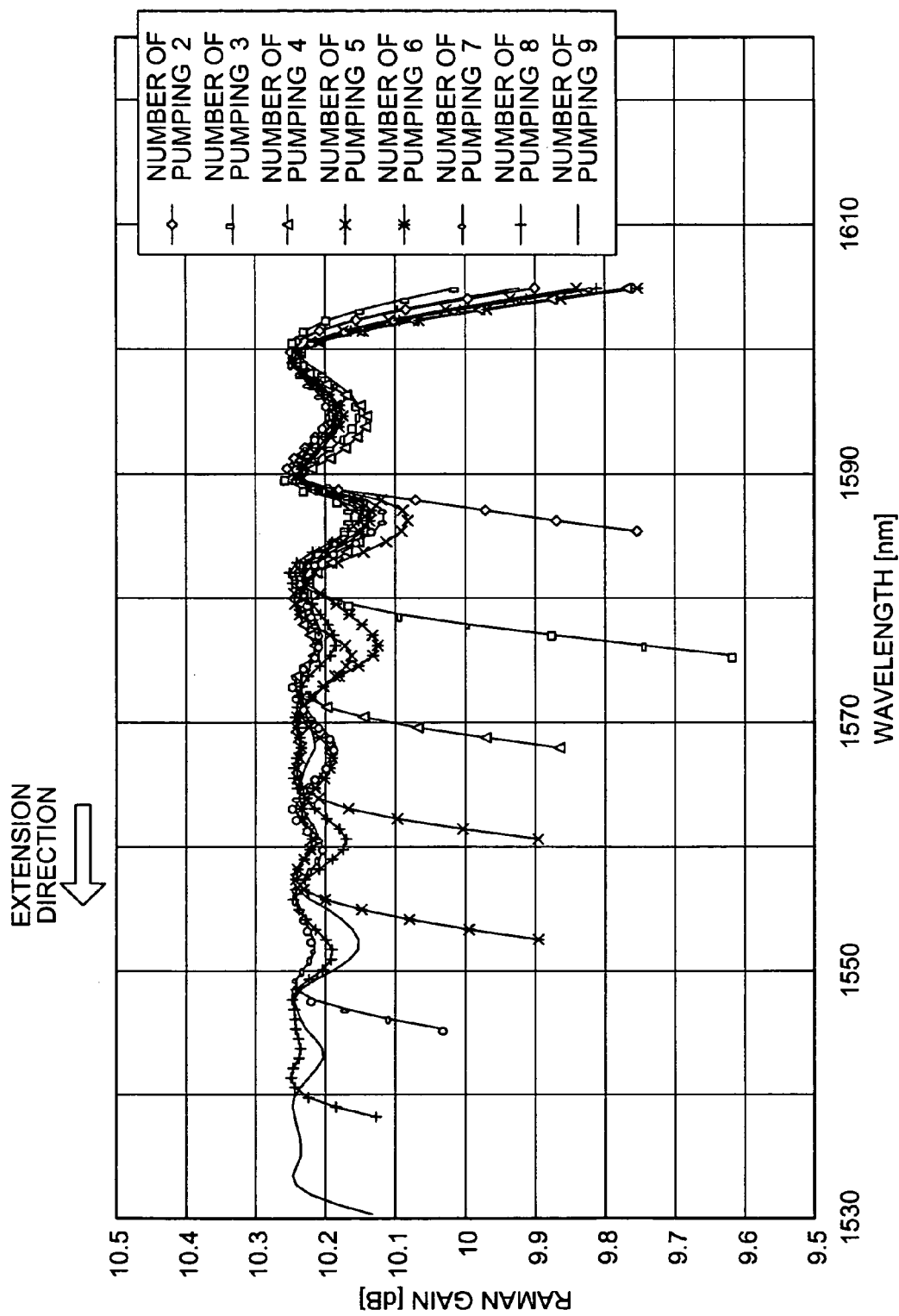
FIG. 8 is a graph for explaining a wavelength dependency of a Raman gain at the time when a pumping light frequency interval is 1 terahertz, a fiber for amplification is a True-Wave-RS, a Raman gain is about 10 decibels or less, and an amplification band is sequentially extended in a short wavelength direction.
Figure 9:
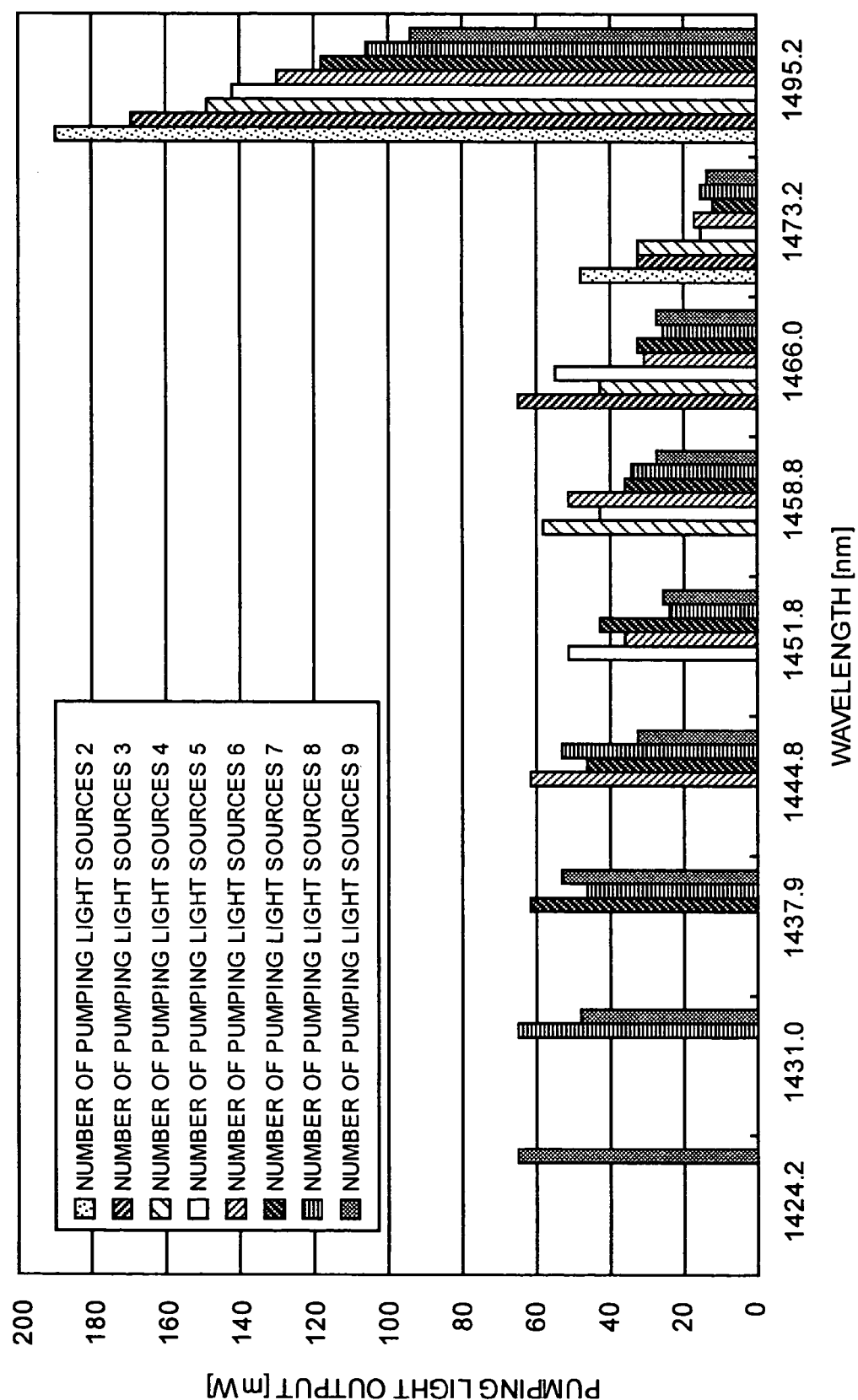
FIG. 9 is a graph for explaining pumping light outputs of respective pumping light sources, which are used for the extension of the amplification band shown in FIG. 8, by wavelength.
Figure 10:
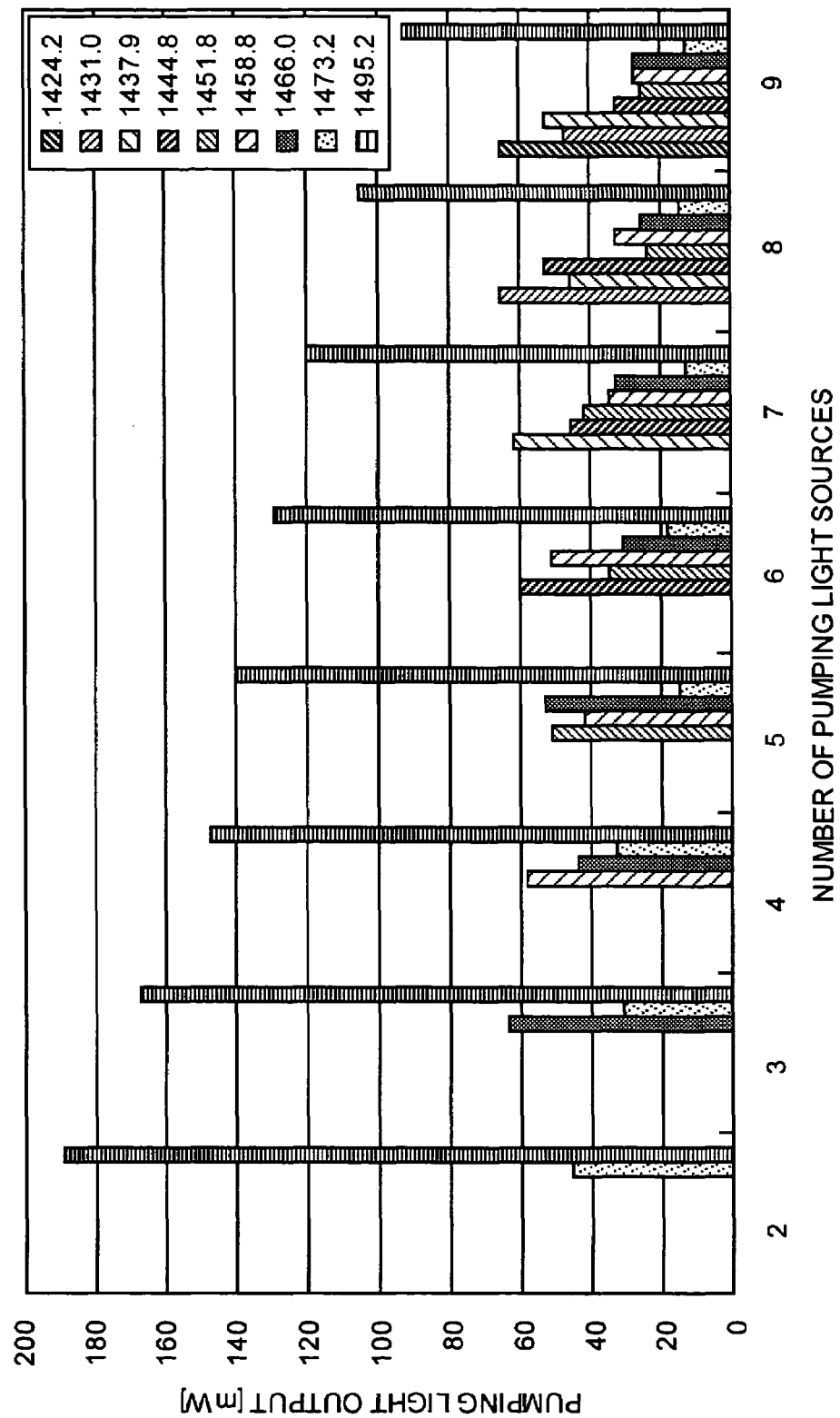
FIG. 10 is a graph for explaining pumping light outputs of the respective pumping light sources, which are used for the extension of the amplification band shown in FIG. 8, for each number of pumping light sources.

The resetting by the setting control unit 4 described above will be explained with reference to a specific example. Note that the fiber for amplification 13 used here is a TrueWave-RS® that is a non-zero dispersion shift fiber. The respective LD modules are semiconductor lasers with a fiber FBG. FIG. 8 is a graph for explaining a wavelength dependency of a Raman gain at the time when a pumping light frequency interval is 1 terahertz, a fiber for amplification is a True-Wave-RS, a Raman gain is about 10 decibels or less, and an amplification band is sequentially extended in a short wavelength direction. FIG. 9 is a graph for explaining pumping light outputs of respective pumping light sources, which are used for the extension of the amplification band shown in FIG. 8, by wavelength. FIG. 10 is a graph for explaining pumping light outputs of the respective pumping light sources, which are used for the extension of the amplification band shown in FIG. 8, for each number of pumping light sources. Note that, in FIG. 10, the respective pumping light source within the number of pumping light sources are arranged in an order of wavelengths, respectively.

As shown in FIGS. 8 and 9, the first condition is that a pumping light output required of a longest pumping wavelength 1495.2 nanometers at each stage of band extension decreases as a band width increases, and this condition is satisfied.

The second condition is that a pumping light output required of a certain pumping wavelength is the largest when the pumping wavelength is a shortest wavelength. In FIG. 9, for example, paying attention to a pumping wavelength 1444.8 nanometers, among the respective numbers of pumping light sources, the pumping wavelength 1444.8 nanometers is a shortest wavelength when the number of pumping light sources is six. Therefore, the second condition is set such that a pumping light output, which is required at the time when the number of pumping light sources is six and the pumping wavelength is 1444.8 nanometers, is the largest at the pumping wavelength 1444.8 nanometers.

The third condition is that a pumping light output of a longest pumping wavelength at each stage of band extension is the largest among respective pumping light outputs at the stage. In FIG. 10, for example, when the number of pumping light sources is five, the third condition is set such that a pumping light output at a pumping wavelength 1495.2 nanometers, which is a longest wavelength among wavelengths of five pumping lights, is the largest among pumping light outputs of the five pumping lights.

By satisfying the first to the third conditions, it is possible to maintain a flat amplification band shown in FIG. 8 at each stage of extension of an amplification band in a short wavelength direction.

Figure 11:
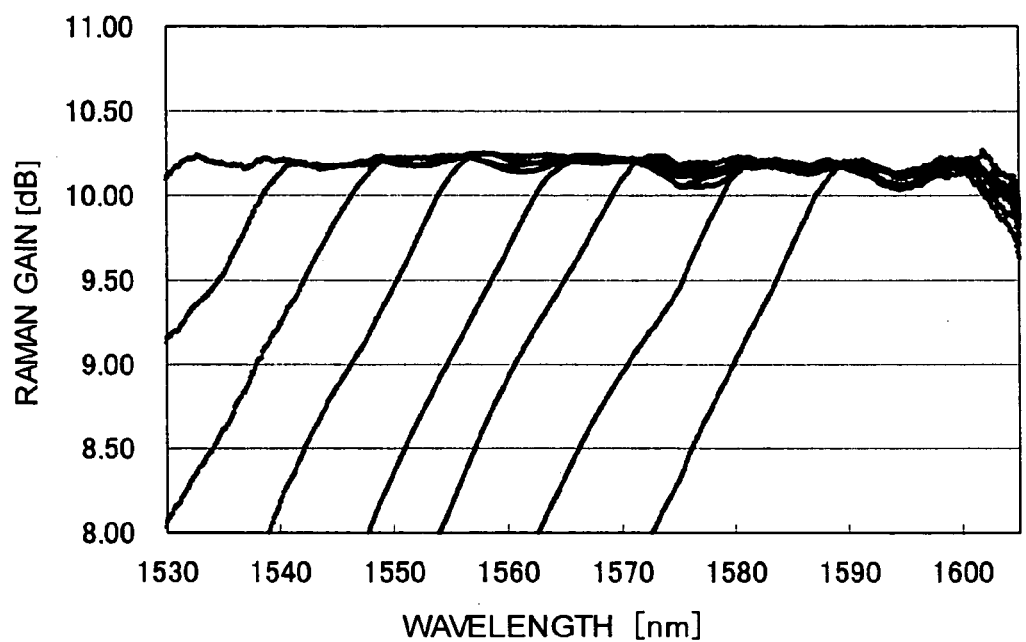
FIG. 11 is a graph for explaining an experimental result on a relation of a Raman gain to a wavelength at the time when the first embodiment is applied to the Raman amplifier shown in FIG. 1.
Figure 12:
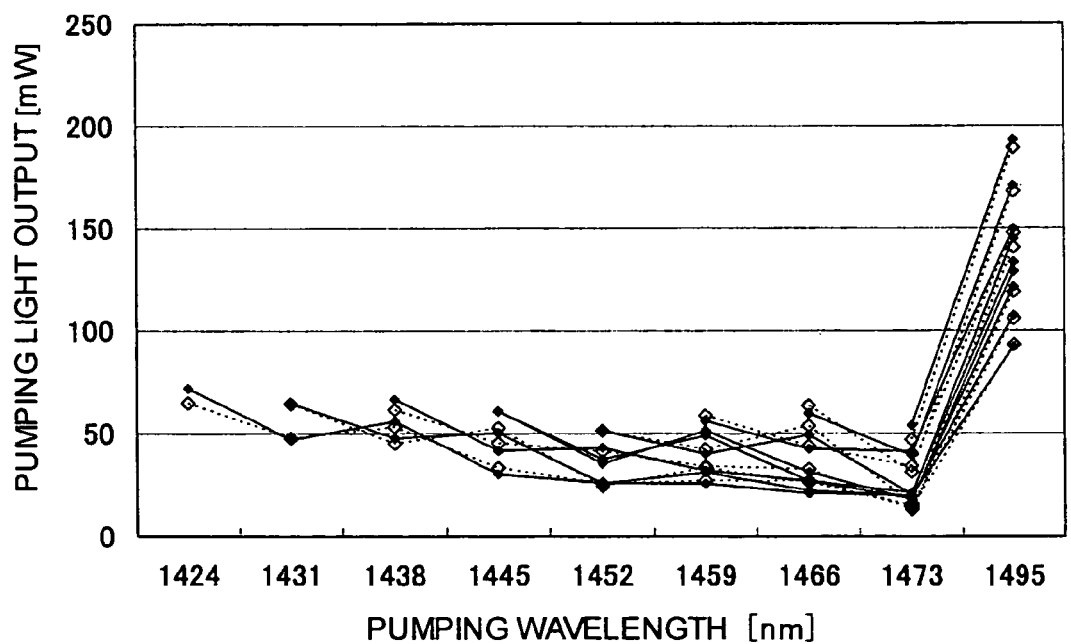
FIG. 12 is a graph comparing a simulation result and an experimental result on a relation of a pumping light output to a pumping wavelength at the time when the first embodiment is applied to the Raman amplifier shown in FIG. 1.

Note that the results shown in FIGS. 8 to 10 are simulation results. On the other hand, FIGS. 11 and 12 correspond to simulation results shown in FIGS. 8 to 10 and are graphs for explaining experimental results at the time when the first embodiment is applied to the Raman amplifier shown in FIG. 1. FIG. 11 corresponds to FIG. 8 and is a graph for explaining a relation of a Raman gain to a wavelength with respective steps of band extension as parameters. In addition, FIG. 12 is a graph for explaining a relation of respective pumping light outputs to pumping wavelength of respective pumping light sources with respective steps of band extension as parameters and is a graph comparing simulation results and experimental results. Note that simulation results are also indicated in second to fifth and seventh to twelfth embodiments to be described later.

In the experimental results shown in FIGS. 11 and 12, respective pumping light outputs obtained by the simulations shown in FIGS. 8 to 10 are set to initial values and, then, fine-tuned such that a Raman gain coincides with the experimental results. More specifically, the respective pumping light outputs are fine-tuned such that a Raman gain is uniformalized at 10.25 decibels as a highest value for the respective wavelengths. This result is a relation of a Raman gain to a wavelength shown in FIG. 11 and is a relation of a pumping light output to respective pumping wavelengths indicated by a solid line in FIG. 12. As shown in FIG. 12, the experimental result of the pumping light output to the respective pumping wavelengths satisfies the first to the third conditions and approximates to a simulation result indicated by a broken line. Note that this experimental result does not coincide with the simulation result completely but only has to be an experimental result that satisfies the first to the third conditions.

Although a Raman gain is set to about 10 decibels or less according to the first embodiment, a Raman gain is set to about 5 decibels or less according to a second embodiment of the present invention. Other elements are the same as those according to the first embodiment.

Figure 13:
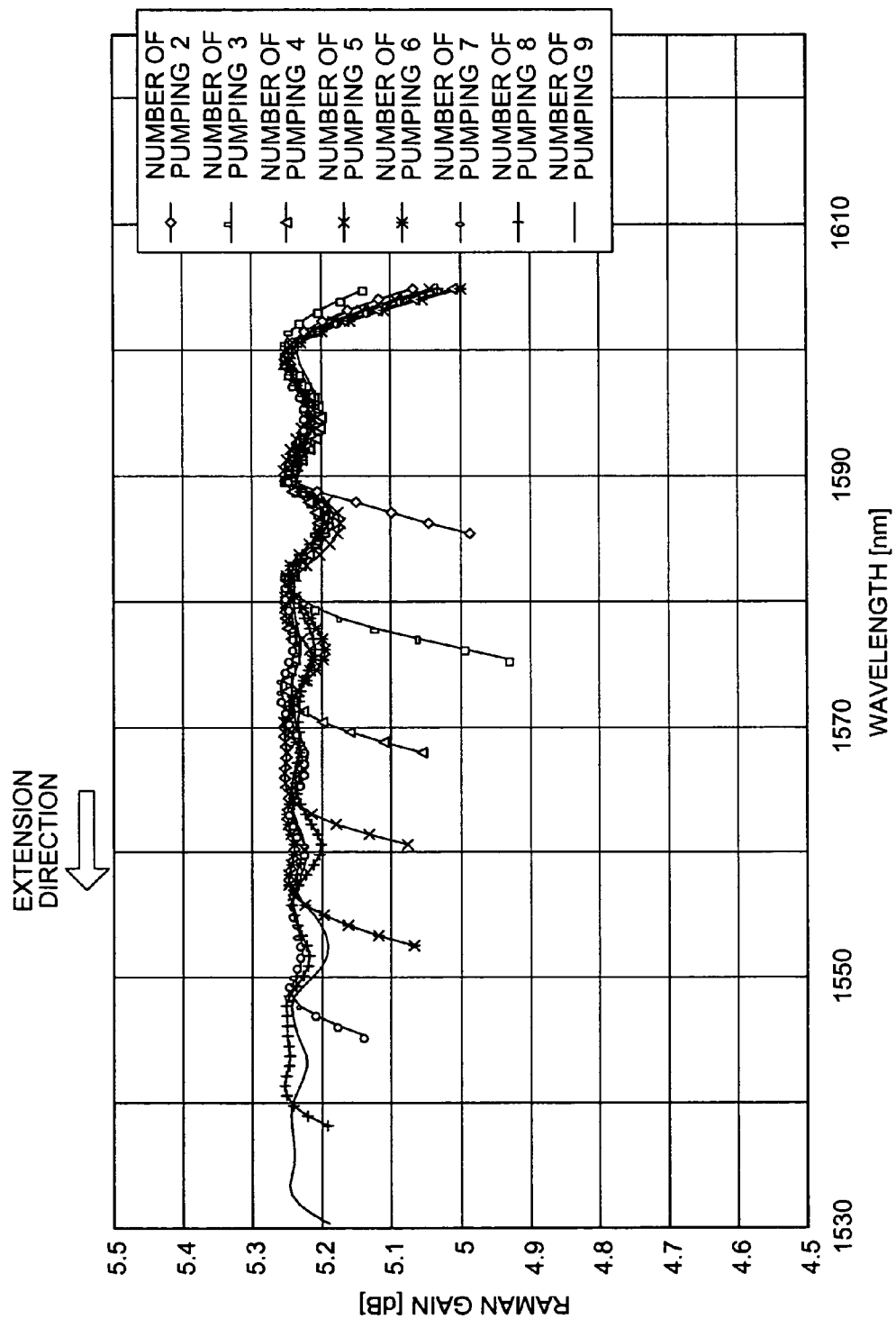
FIG. 13 is a graph for explaining wavelength dependency of a Raman gain at the time when a pumping light frequency interval is 1 terahertz, a fiber for amplification is a True-Wave-RS, a Raman gain is about 5 decibels or less, and an amplification band is sequentially extended in a short wavelength direction.
Figure 14:
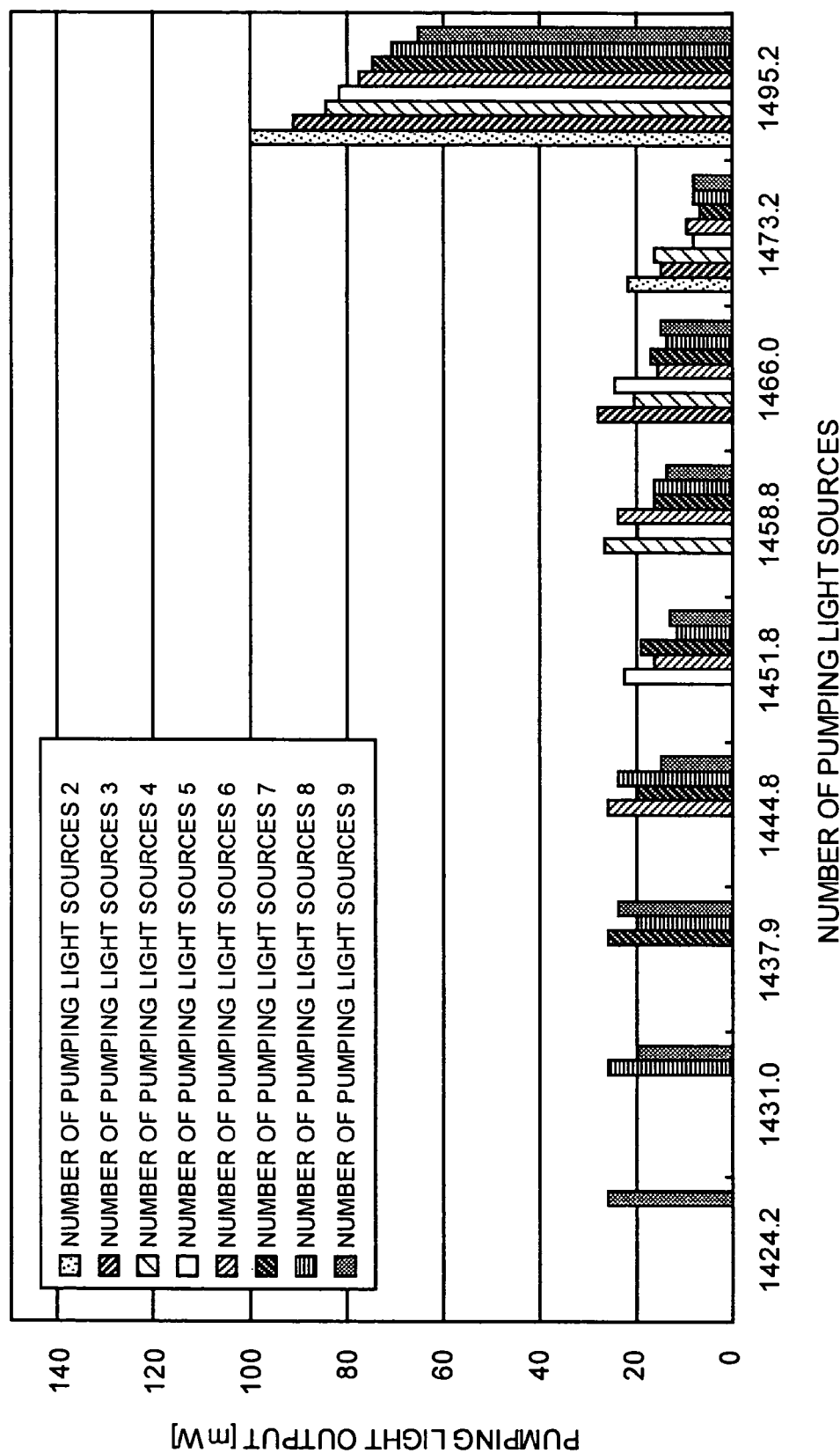
FIG. 14 is a graph for explaining pumping light outputs of respective pumping light sources, which are used for the extension of the amplification band shown in FIG. 13, by wavelength.
Figure 15:
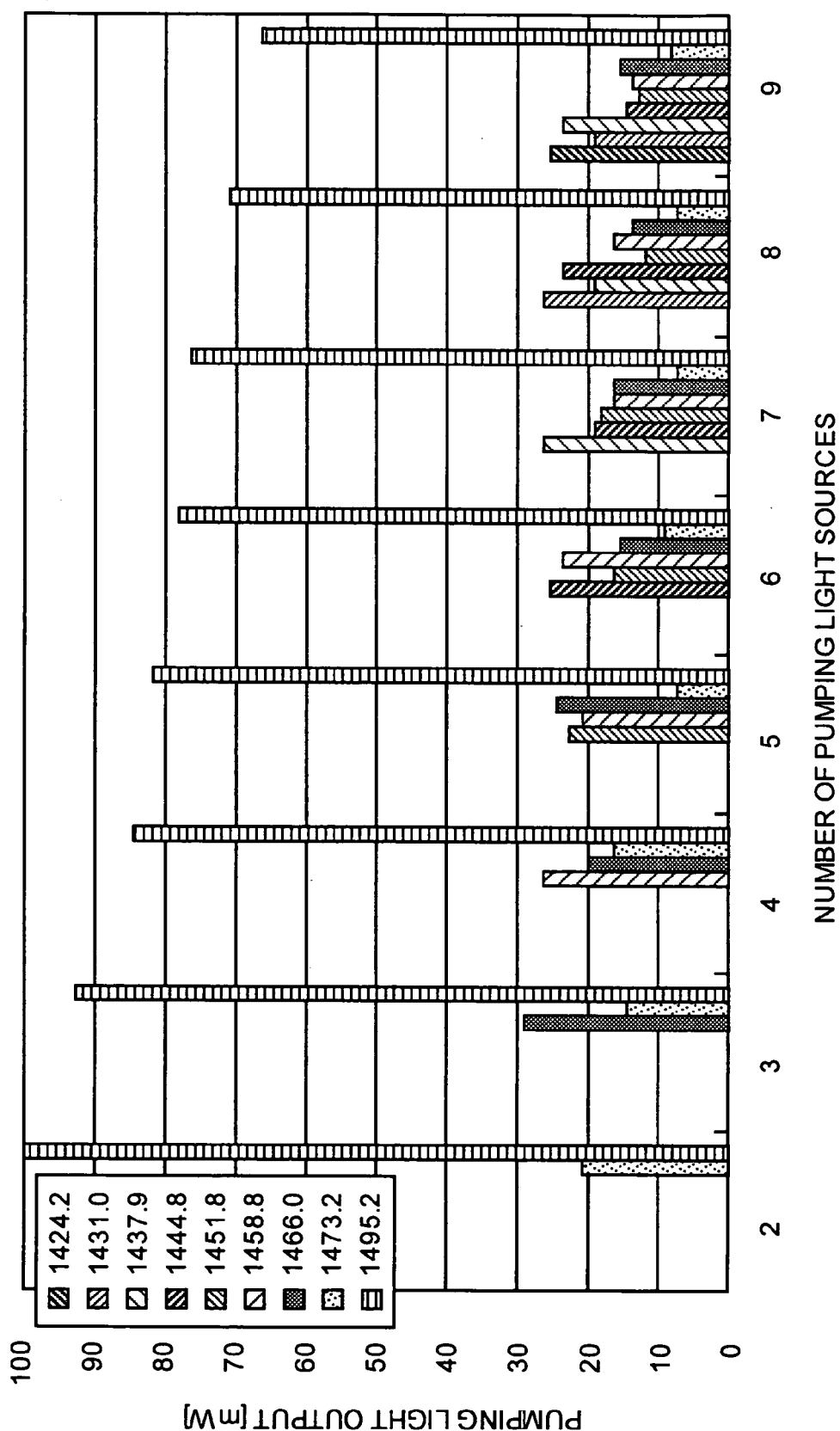
FIG. 15 is a graph for explaining pumping light outputs of the respective pumping light sources, which are used for the extension of the amplification band shown in FIG. 13, for each number of pumping light sources.

FIG. 13 is a graph for explaining wavelength dependency of a Raman gain at the time when a pumping light frequency interval is 1 terahertz, a fiber for amplification is a True-Wave-RS, a Raman gain is about 5 decibels or less, and an amplification band is sequentially extended in a short wavelength direction. FIG. 14 is a graph for explaining pumping light outputs of respective pumping light sources, which are used for the extension of the amplification band shown in FIG. 13, by wavelength. FIG. 15 is a graph for explaining pumping light outputs of the respective pumping light sources, which are used for the extension of the amplification band shown in FIG. 13, for each number of pumping light sources.

As shown in FIGS. 13 and 14, the first condition is that a pumping light output required of a longest pumping wavelength 1495.2 nanometers at each stage of band extension decreases as a band width increases, and this condition is satisfied.

The second condition is that a pumping light output required of a certain pumping wavelength is the largest when the pumping wavelength is a shortest wavelength. In FIG. 14, for example, paying attention to a pumping wavelength 1444.8 nanometers, among the respective numbers of pumping light sources, the pumping wavelength 1444.8 nanometers is a shortest wavelength when the number of pumping light sources is six. Therefore, the second condition is set such that a pumping light output, which is required at the time when the number of pumping light sources is six and the pumping wavelength is 1444.8 nanometers, is the largest at the pumping wavelength 1444.8 nanometers.

The third condition is that a pumping light output of a longest pumping wavelength at each stage of band extension is the largest among respective pumping light outputs at the stage. In FIG. 15, for example, when the number of pumping light sources is five, the third condition is set such that a pumping light output at a pumping wavelength 1495.2 nanometers, which is a longest wavelength among wavelengths of five pumping lights, is the largest among pumping light outputs of the five pumping lights.

According to the second embodiment, as according to the first embodiment, by satisfying such first to third conditions, it is possible to maintain a flat amplification band shown in FIG. 13 at each stage of extension of an amplification band in a short wavelength direction.

Although a Raman gain is set to about 10 decibels or less according to the first embodiment, and set to about 5 decibels or less according to the second embodiment, a Raman gain is set to about 15 decibels or less according to a third embodiment of the present invention. Other elements are the same as those in the first and the second embodiments.

Figure 16:
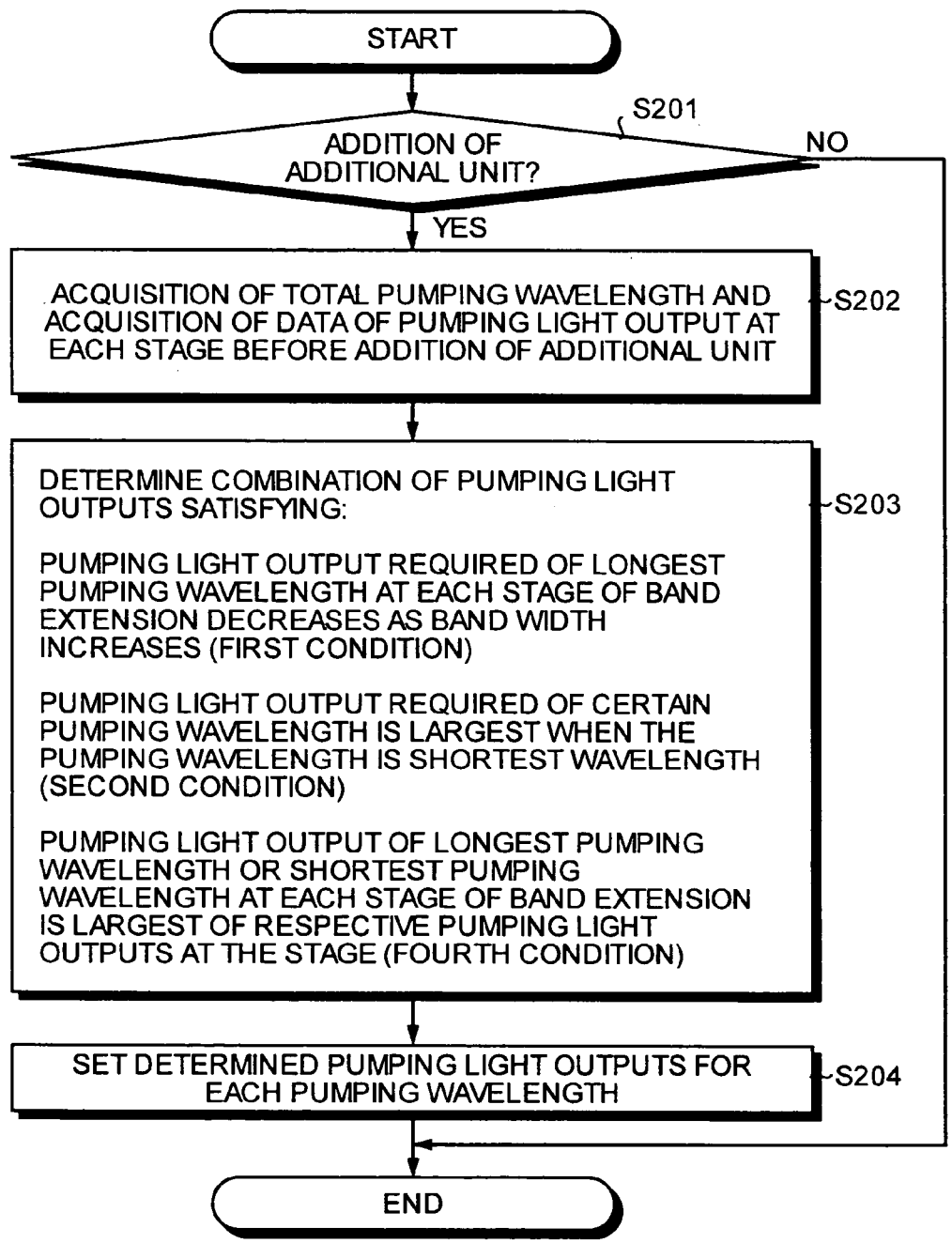
FIG. 16 is a flowchart of a setting control processing procedure by a setting control unit according to a third embodiment of the present invention.

However, the setting control unit 4 performs setting control processing according to a flowchart shown in FIG. 16. Steps S201, S202, and S204 are the same as steps S101, S102, and S104 shown in FIG. 3. Step S203 corresponds to step S103. At step S203, the setting control unit 4 determines combinations of pumping light outputs of respective pumping light sources. However, the setting control unit 4 determines the combinations using a fourth condition to be described below instead of the third condition used at step S103.

The third condition is that a pumping light output of a longest pumping wavelength at each stage of band extension is the largest among respective pumping light outputs at the stage. Instead of this third condition, the fourth condition is that a pumping light output of a longest pumping wavelength or a shortest pumping wavelength at each stage of band extension is the largest among respective pumping light outputs at the stage. The fourth condition is moderate compared with the third condition.

Figure 17:
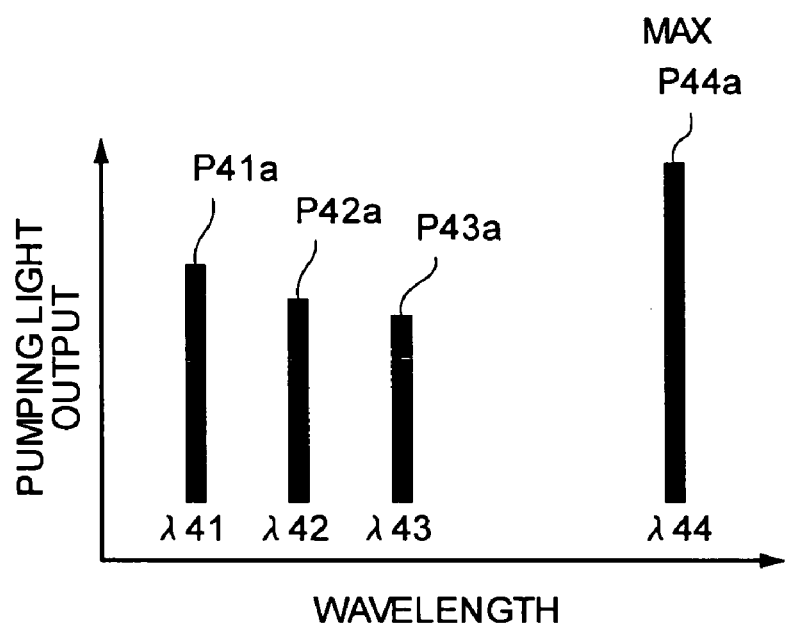
FIG. 17 is a schematic diagram for explaining a fourth condition.
Figure 18:
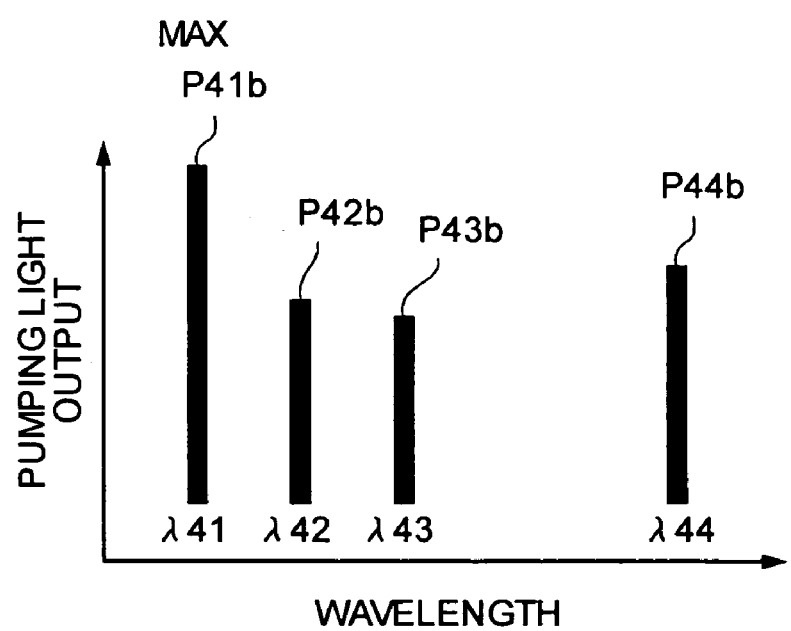
FIG. 18 is a schematic diagram for explaining another fourth condition.

FIGS. 17 and 18 are schematic diagrams explaining the fourth condition. FIG. 17 is a diagram explaining the same condition as the third condition. FIG. 18 is a diagram explaining a fourth condition. In FIG. 18, pumping wavelengths λ41 to λ44 are combined wavelengths at certain stages and are reset such that a pumping light output P41b of the longest pumping wavelength λ41 among the pumping wavelengths is the largest.

Figure 19:
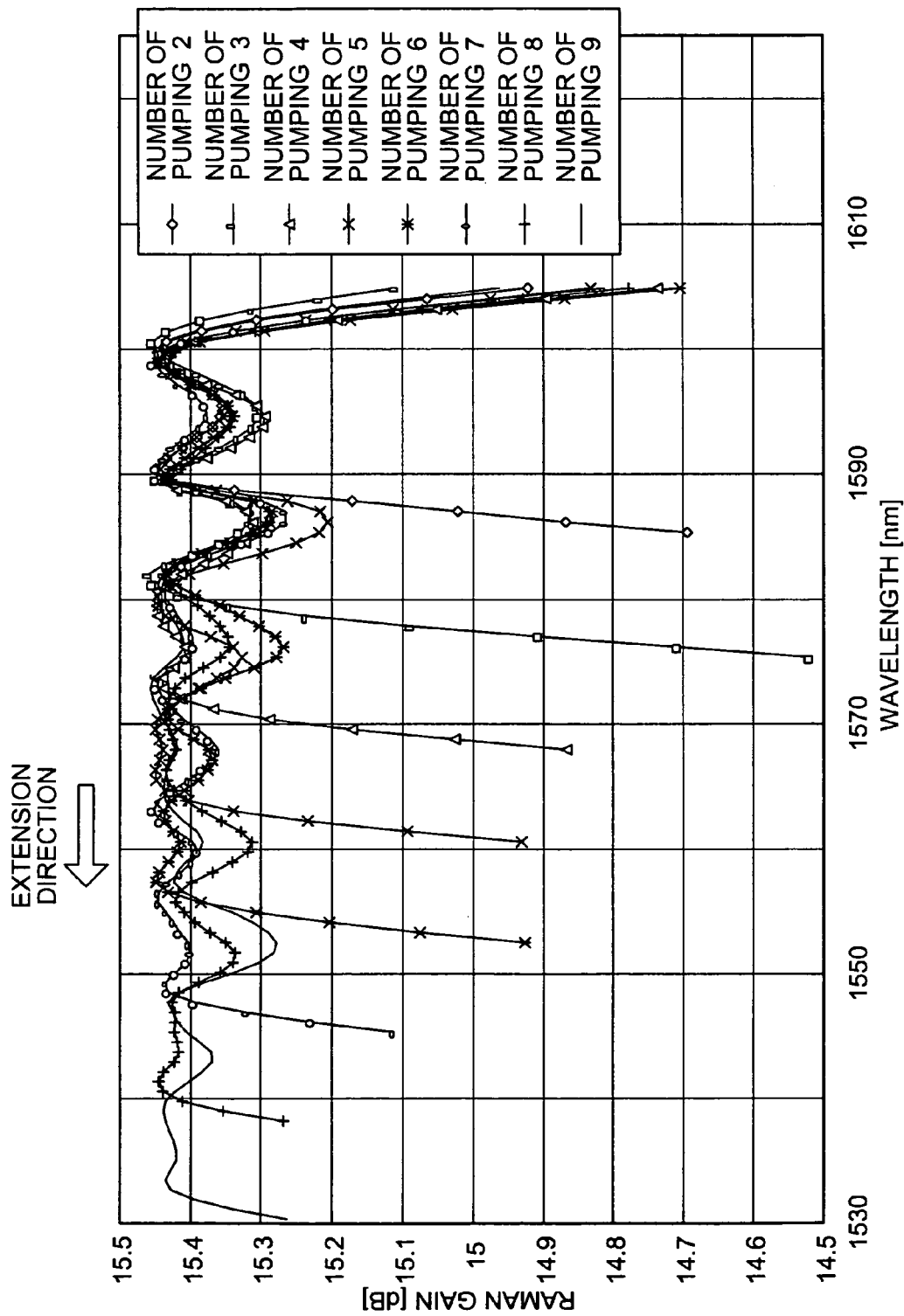
FIG. 19 is a graph for explaining wavelength dependency of a Raman gain at the time when a pumping light frequency interval is 1 terahertz, a fiber for amplification is a True-Wave-RS, a Raman gain is about 15 decibels or less, and an amplification band is sequentially extended in a short wavelength direction.
Figure 20:
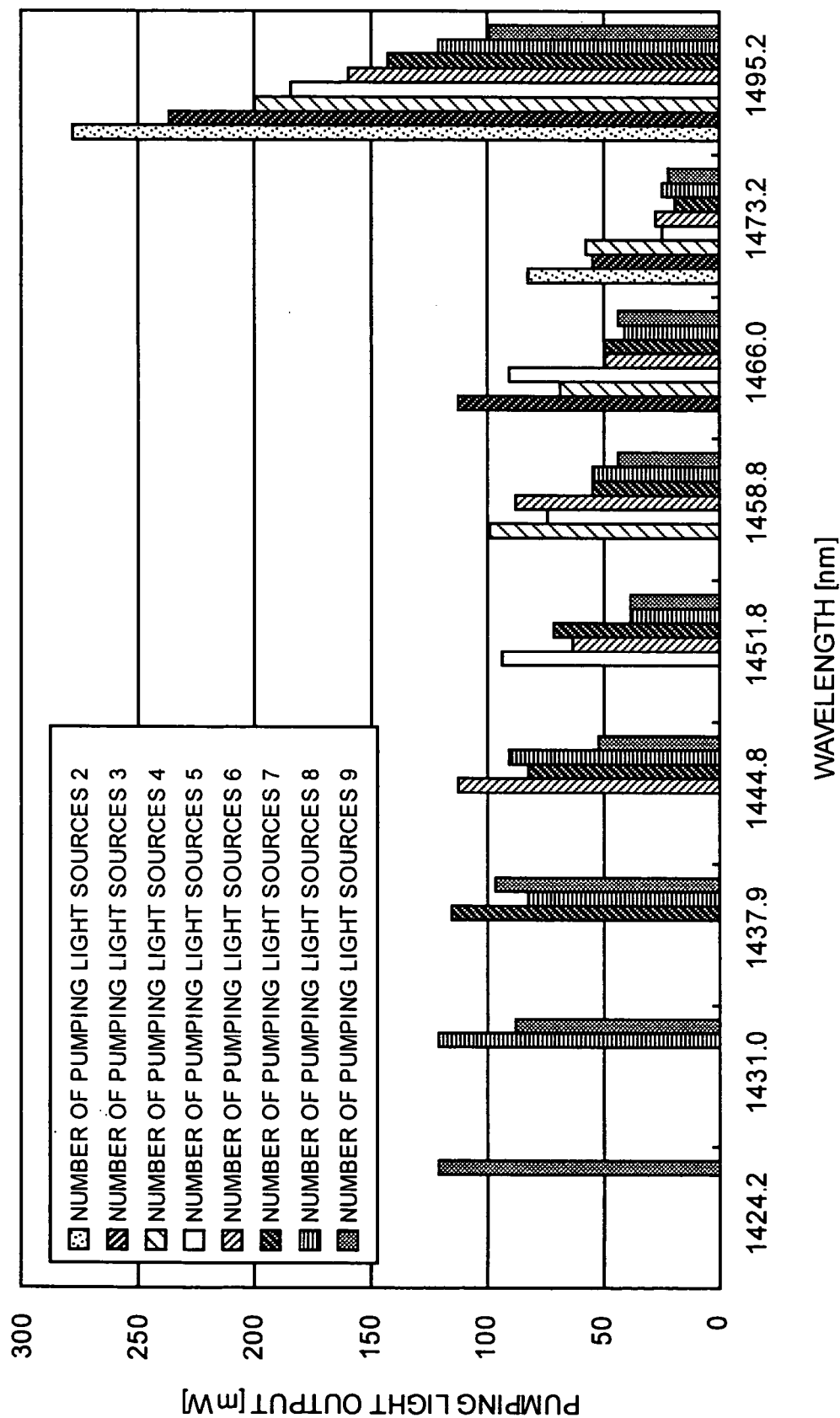
FIG. 20 is a graph for explaining pumping light outputs of respective pumping light sources, which are used for the extension of the amplification band shown in FIG. 19, by wavelength.
Figure 21:
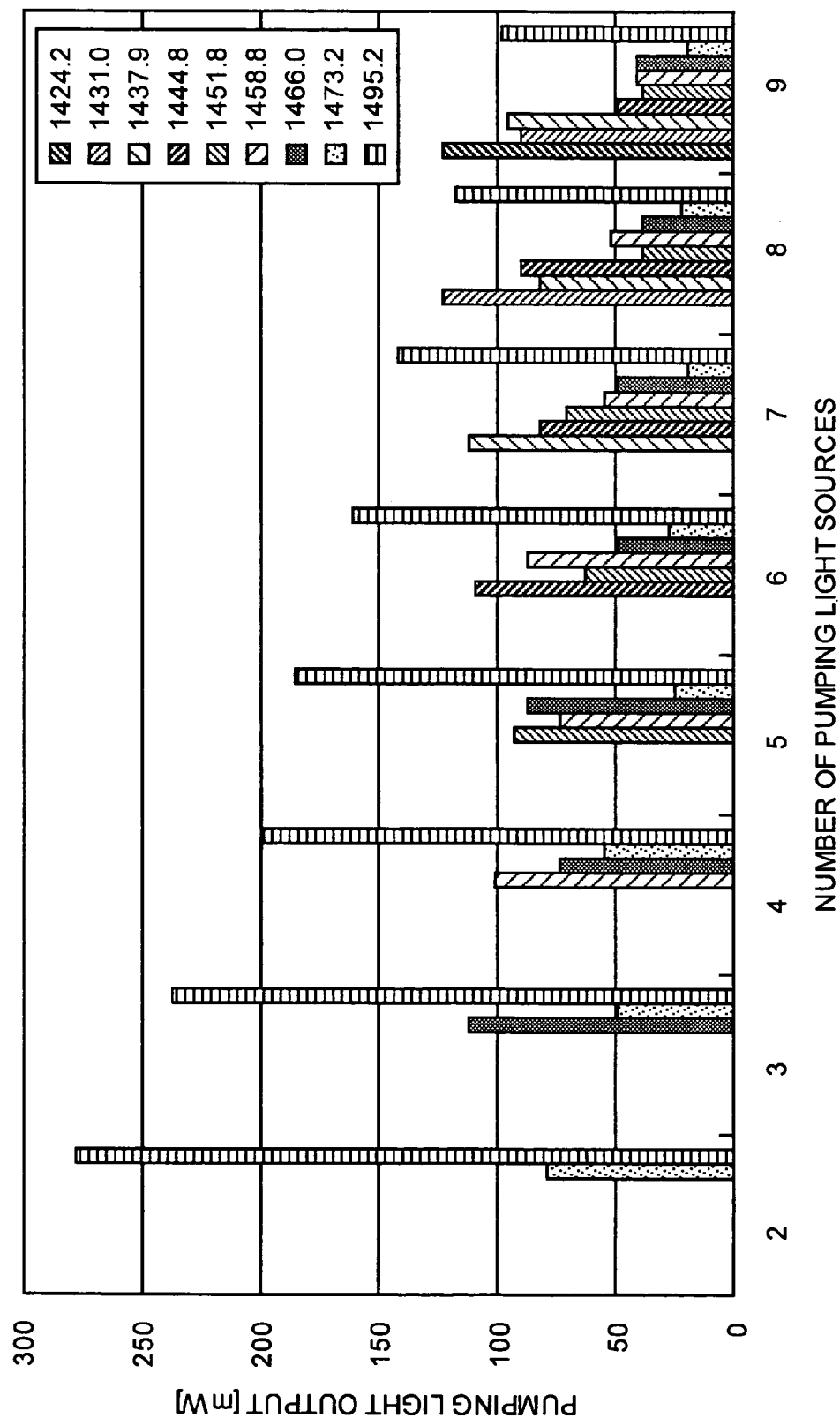
FIG. 21 is a graph for explaining pumping light outputs of the respective light sources, which are used for the extension of the amplification band shown in FIG. 19, for each number of pumping light sources.

FIG. 19 is a graph for explaining wavelength dependency of a Raman gain at the time when a pumping light frequency interval is 1 terahertz, a fiber for amplification is a True-Wave-RS, a Raman gain is about 15 decibels or less, and an amplification band is sequentially extended in a short wavelength direction. FIG. 20 is a graph for explaining pumping light outputs of respective pumping light sources, which are used for the extension of the amplification band shown in FIG. 19, by wavelength. FIG. 21 is a graph for explaining pumping light outputs of the respective light sources, which are used for the extension of the amplification band shown in FIG. 19, for each number of pumping light sources.

As shown in FIGS. 19 and 20, the first condition is that a pumping light output required of a longest pumping wavelength 1495.2 nanometers at each stage of band extension decreases as a band width increases, and this condition is satisfied.

The second condition is that a pumping light output required of a certain pumping wavelength is the largest when the pumping wavelength is a shortest wavelength. In FIG. 20, for example, paying attention to a pumping wavelength 1444.8 nanometers, among the respective numbers of pumping light sources, the pumping wavelength 1444.8 nanometers is a shortest wavelength when the number of pumping light sources is six. Therefore, the second condition is set such that a pumping light output, which is required at the time when the number of pumping light sources is six and the pumping wavelength is 1444.8 nanometers, is the largest at the pumping wavelength 1444.8 nanometers.

The fourth condition is that a pumping light output of a longest pumping wavelength or a shortest pumping wavelength at each stage of band extension is the largest among respective pumping light outputs at the stage. In FIG. 21, for example, when the number of pumping light sources is five, the fourth condition is set such that a pumping light output at a pumping wavelength 1495.2 nanometers, which is a longest wavelength among wavelengths of five pumping lights, or a pumping wavelength 1451.8 nanometers, which is a shortest wavelength among wavelengths of five pumping lights, is the largest among pumping light outputs of the five pumping lights. In FIGS. 19 to 21, a pumping light output at the longest pumping wavelength 1495.2 nanometers is set to be the largest. Similarly, when the number of pumping light sources is nine, the fourth condition is set such that a pumping light output at a pumping wavelength 1495.2 nanometers, which is a longest wavelength among wavelengths of nine pumping lights, or a pumping wavelength 1424.2 nanometers, which is a shortest wavelength among wavelengths of nine pumping lights, is the largest among pumping light outputs of the nine pumping lights. In FIGS. 19 to 21, a pumping light output at the shortest pumping wavelength 1424.2 nanometers is set to be the largest.

According to the third embodiment, among the first to the third conditions indicated in the first and the second embodiments, the third condition is changed to the moderate fourth condition serving as a determination condition. By satisfying these conditions, it is possible to maintain a flat amplification band shown in FIG. 19 at each stage of extension of an amplification band in a short wavelength direction.

Although the True-Wave-RS is used as a fiber for amplification according to the first embodiment, an SMF is used according to a forth embodiment of the present invention. Other elements are the same as those according to the first embodiment.

Figure 22:
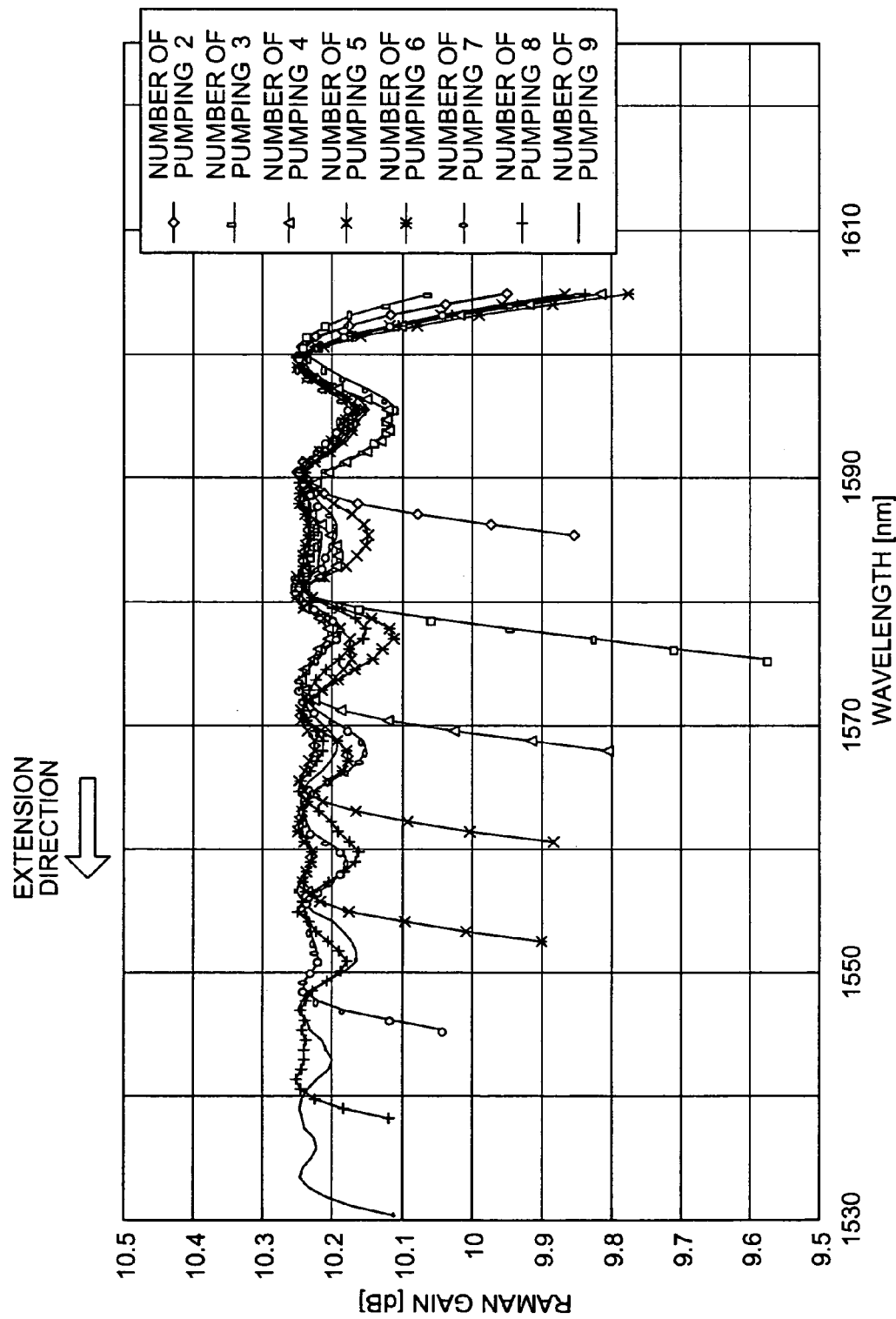
FIG. 22 is a graph for explaining wavelength dependency of a Raman gain at the time when a pumping light frequency interval is 1 terahertz, a fiber for amplification is an SMF, a Raman gain is about 10 decibels or less, and an amplification band is sequentially extended in a short wavelength direction.
Figure 23:
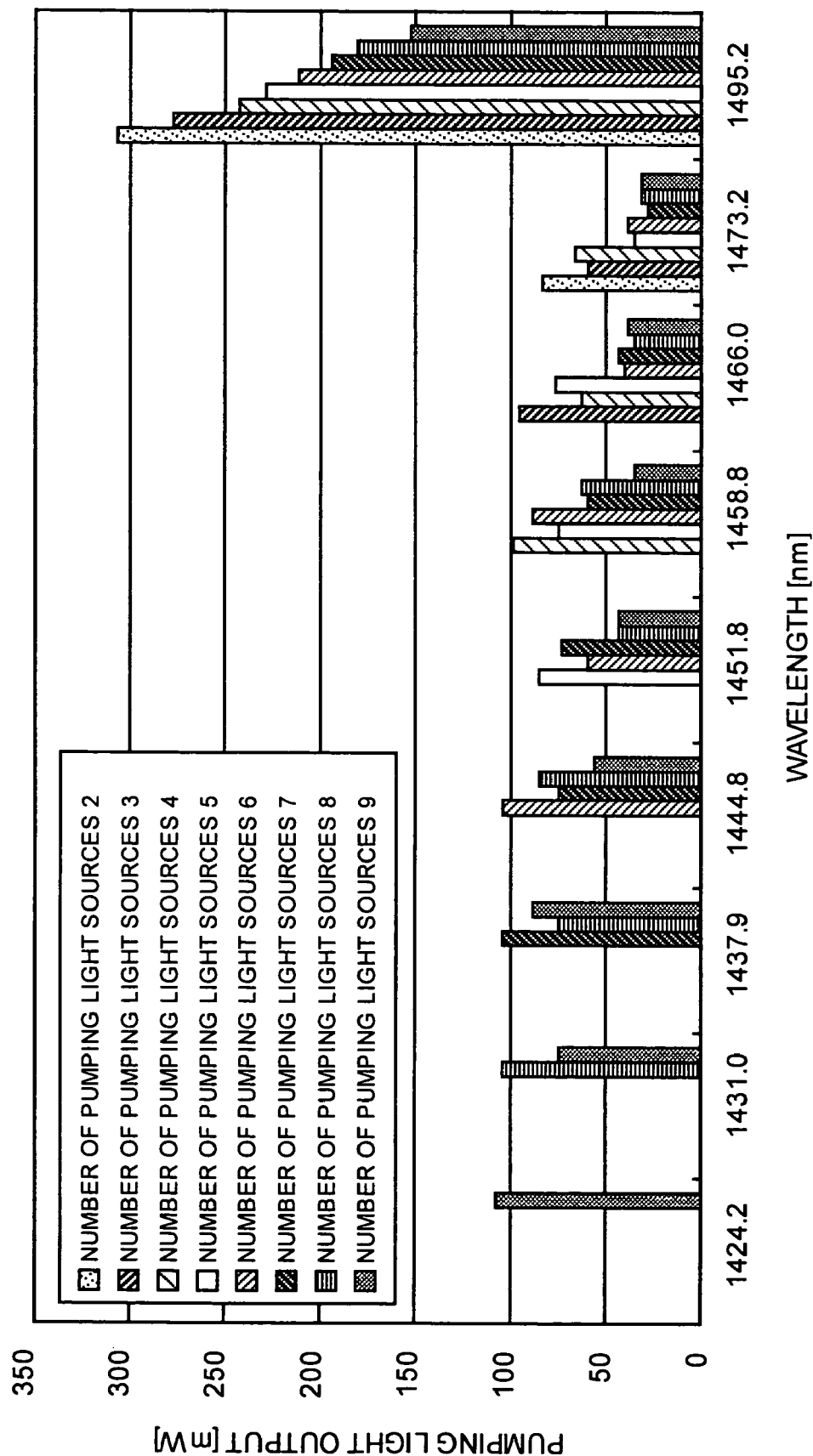
FIG. 23 is a graph for explaining pumping light outputs of respective pumping light sources, which are used for the extension of the amplification band shown in FIG. 22, by wavelength.
Figure 24:
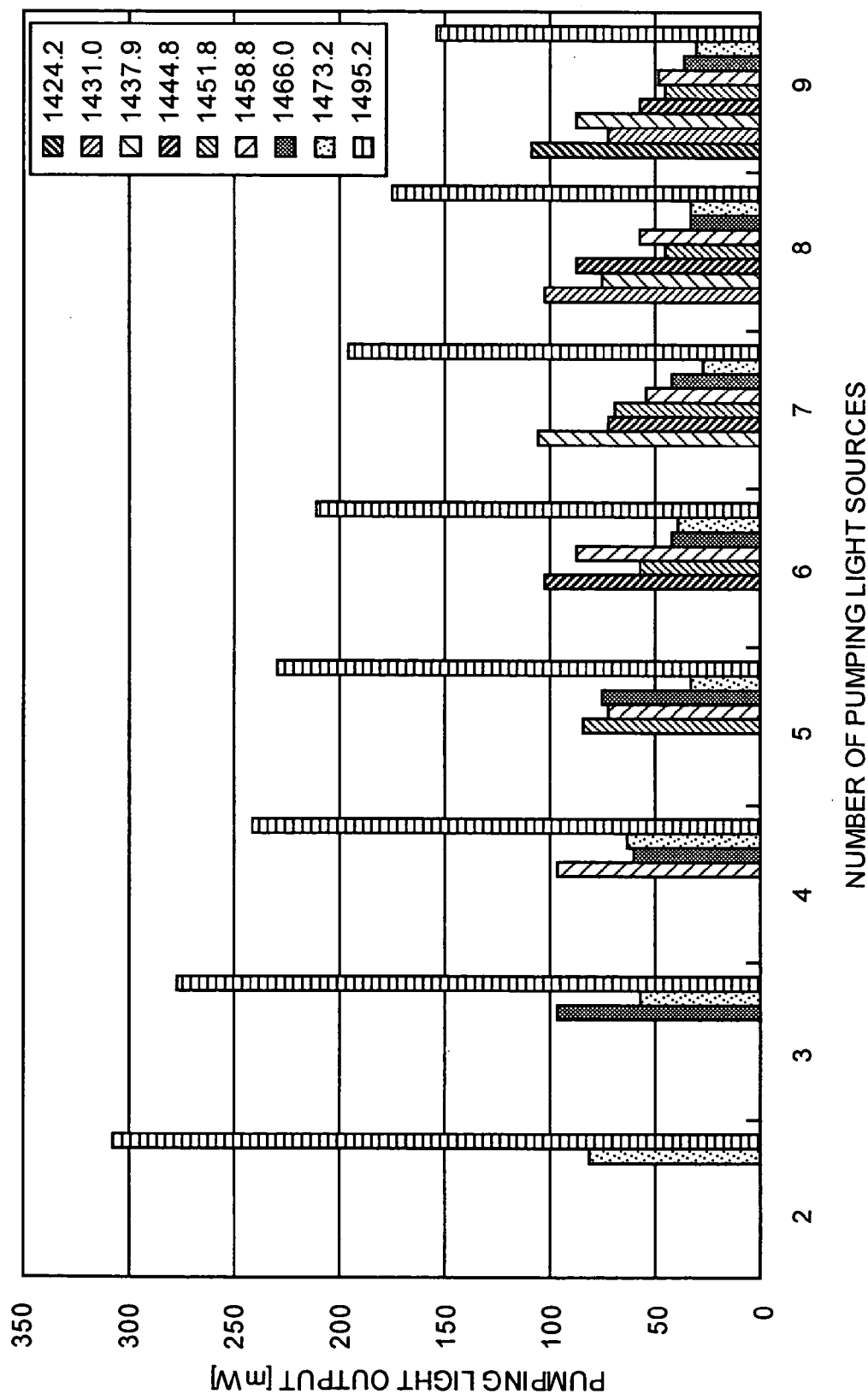
FIG. 24 is a graph for explaining pumping light outputs of the respective pumping light sources, which are used for the extension of the amplification band shown in FIG. 22, for each number of pumping light sources.

FIG. 22 is a graph for explaining wavelength dependency of a Raman gain at the time when a pumping light frequency interval is 1 terahertz, a fiber for amplification is an SMF, a Raman gain is about 10 decibels or less, and an amplification band is sequentially extended in a short wavelength direction. FIG. 23 is a graph for explaining pumping light outputs of respective pumping light sources, which are used for the extension of the amplification band shown in FIG. 22, by wavelength. FIG. 24 is a graph for explaining pumping light outputs of the respective pumping light sources, which are used for the extension of the amplification band shown in FIG. 22, for each number of pumping light sources.

As shown in FIGS. 22 and 23, the first condition is that a pumping light output required of a longest pumping wavelength 1495.2 nanometers at each stage of band extension decreases as a band width increases, and this condition is satisfied.

The second condition is that a pumping light output required of a certain pumping wavelength is the largest when the pumping wavelength is a shortest wavelength. In FIG. 23, for example, paying attention to a pumping wavelength 1444.8 nanometers, among the respective numbers of pumping light sources, the pumping wavelength 1444.8 nanometers is a shortest wavelength when the number of pumping light sources is six. Therefore, the second condition is set such that a pumping light output, which is required at the time when the number of pumping light sources is six and the pumping wavelength is 1444.8 nanometers, is the largest at the pumping wavelength 1444.8 nanometers.

The third condition is that a pumping light output of a longest pumping wavelength at each stage of band extension is the largest among respective pumping light outputs at the stage. In FIG. 24, for example, when the number of pumping light sources is five, the third condition is set such that a pumping light output at a pumping wavelength 1495.2 nanometers, which is a longest wavelength among wavelengths of five pumping lights, is the largest among pumping light outputs of the five pumping lights.

According to the fourth embodiment, by satisfying the first to the third conditions, it is possible to maintain a flat amplification band shown in FIG. 22 at each stage of extension of an amplification band in a short wavelength direction even if the SMF is used.

Although a direction of extension of an amplification band is a short wavelength direction according to the first to the fourth embodiments, an amplification band is extended stepwise in a long wavelength direction according to a fifth embodiment of the present invention. Other elements are the same as those according to the first embodiment.

Figure 25:
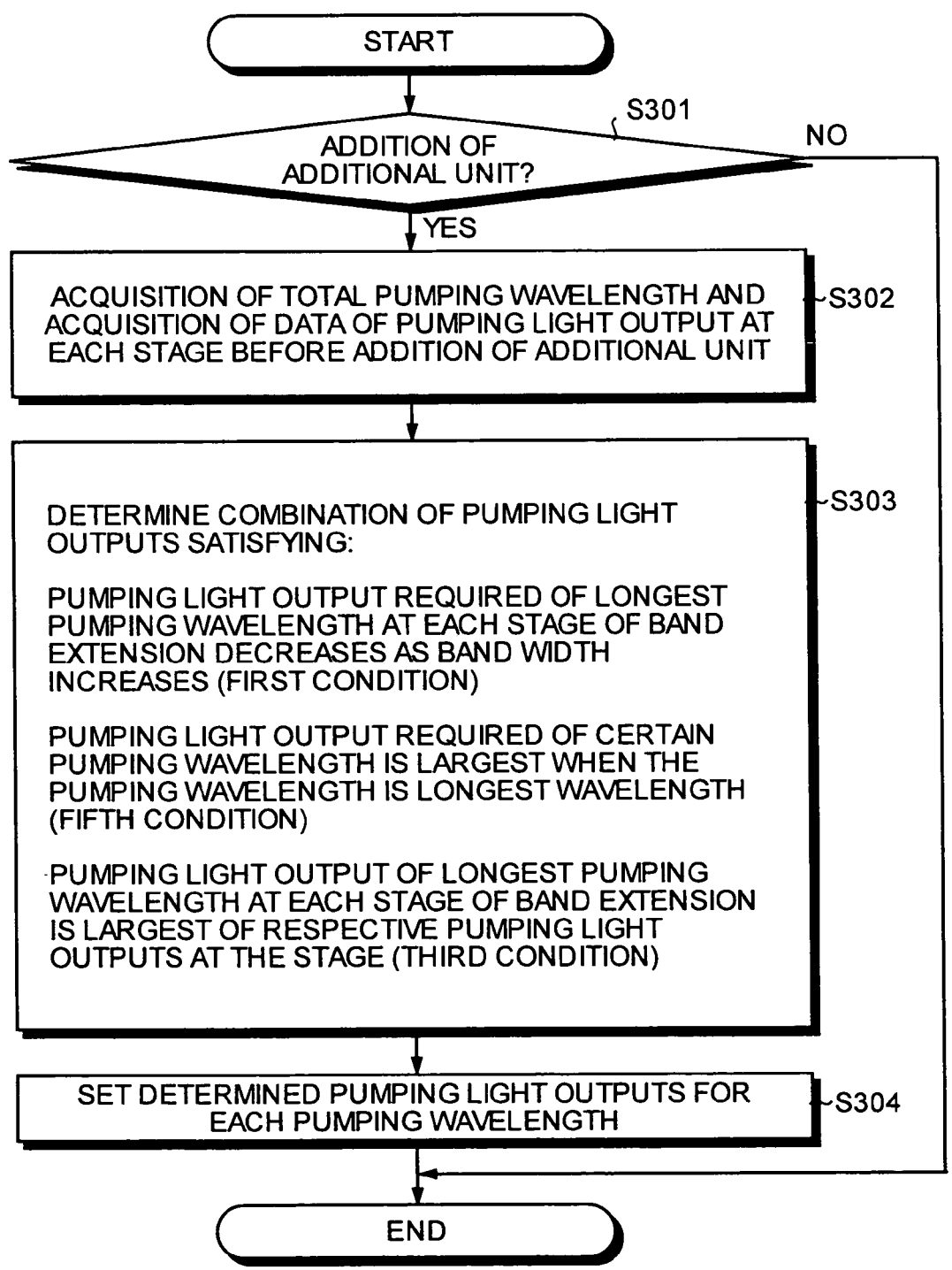
FIG. 25 is a flowchart of a setting control processing procedure by a setting control unit according to a fifth embodiment of the present invention.

However, the setting control unit 4 performs setting control processing according to a flowchart shown in FIG. 25. Steps S301, S302, and S304 are the same as steps S101, S102, and S104 shown in FIG. 3. Step S303 corresponds to step S103. At step S303, the setting control unit 4 determines combinations of pumping light outputs of respective pumping light sources. However, the setting control unit 4 determines the combinations using a fifth condition to be described below instead of the second condition used at step S103.

The fifth condition is that a pumping light output of a certain pumping wavelength is the largest when the pumping wavelength of a longest wavelength. It can be said that this corresponds to the fact that the direction of extension of an amplification band is the long wavelength direction.

Figure 26:
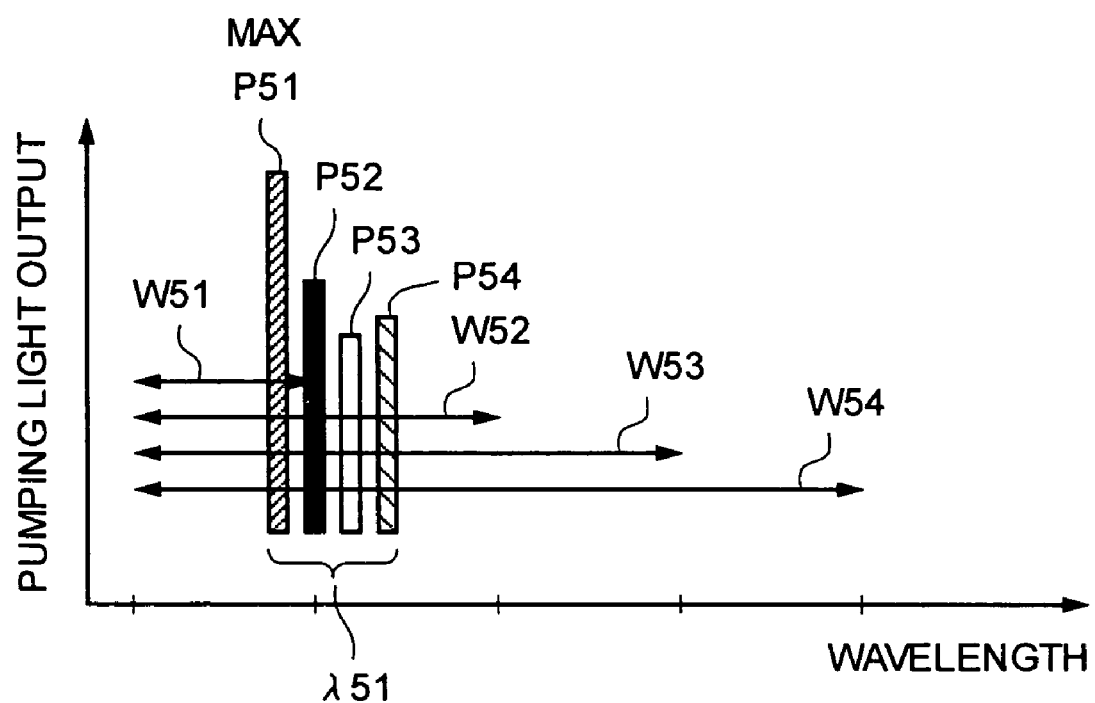
FIG. 26 is a schematic diagram for explaining a fifth condition.

FIG. 26 is a schematic diagram for explaining a fifth condition. In FIG. 26, when an amplification band is extended to pumping light bandwidths W51 to W54 according to amplification band extension, a certain pumping wavelength λ51 is commonly used in respective stages, and pumping light outputs are reset to P51 to P54, respectively. In this case, the pumping wavelength λ51 becomes a longest wavelength at the pumping light band width W51. When the pumping wavelength λ51 becomes a longest wavelength in a combination of stages, the pumping light output P51 of the pumping wavelength λ51 at that point is reset to be the largest compared with the other pumping light outputs P52 to P54.

Figure 27:
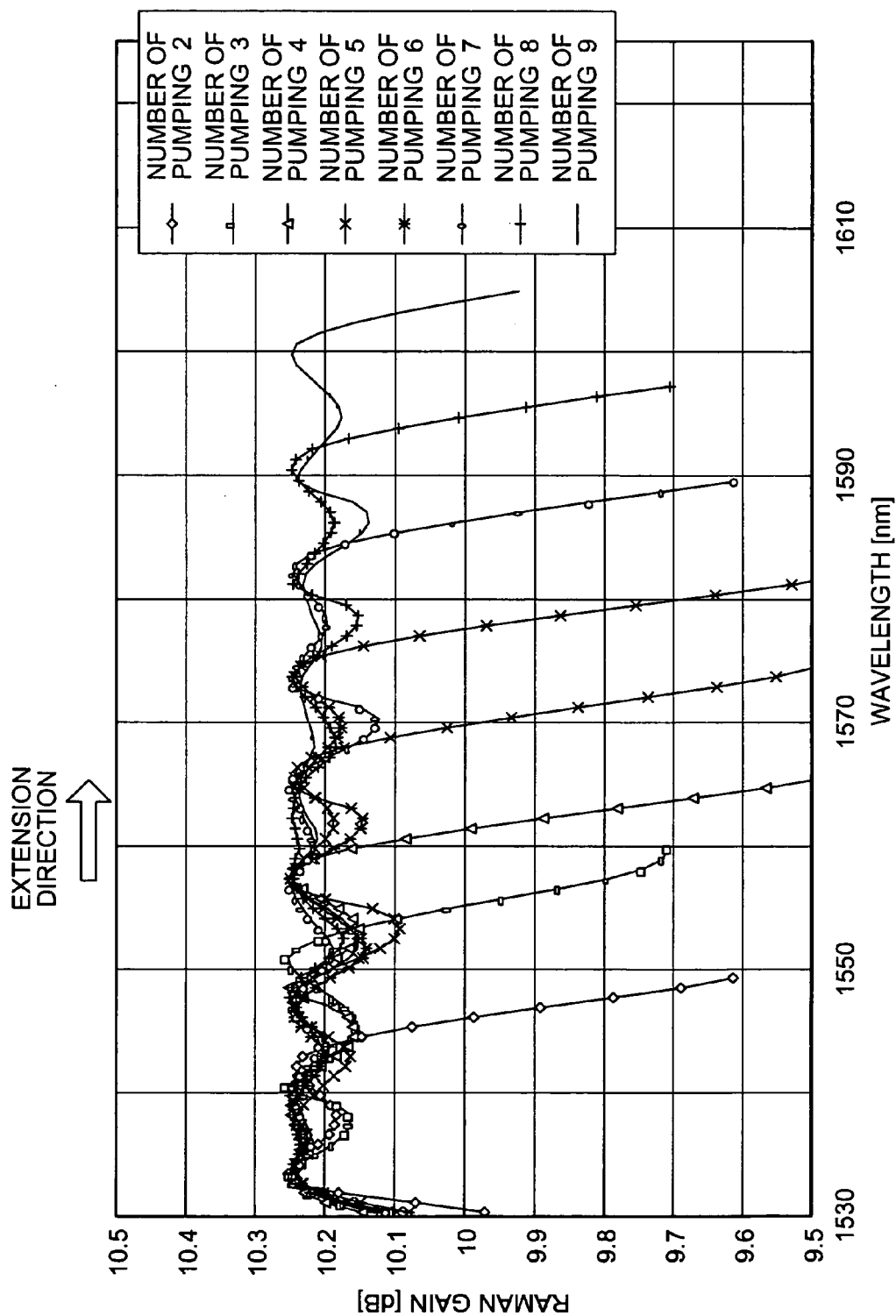
FIG. 27 is a graph for explaining wavelength dependency of a Raman gain at the time when a pumping light frequency interval is 1 terahertz, a fiber for amplification is a True-Wave-RS, a Raman gain is about 10 decibels or less, and an amplification band is sequentially extended in a long wavelength direction.
Figure 28:
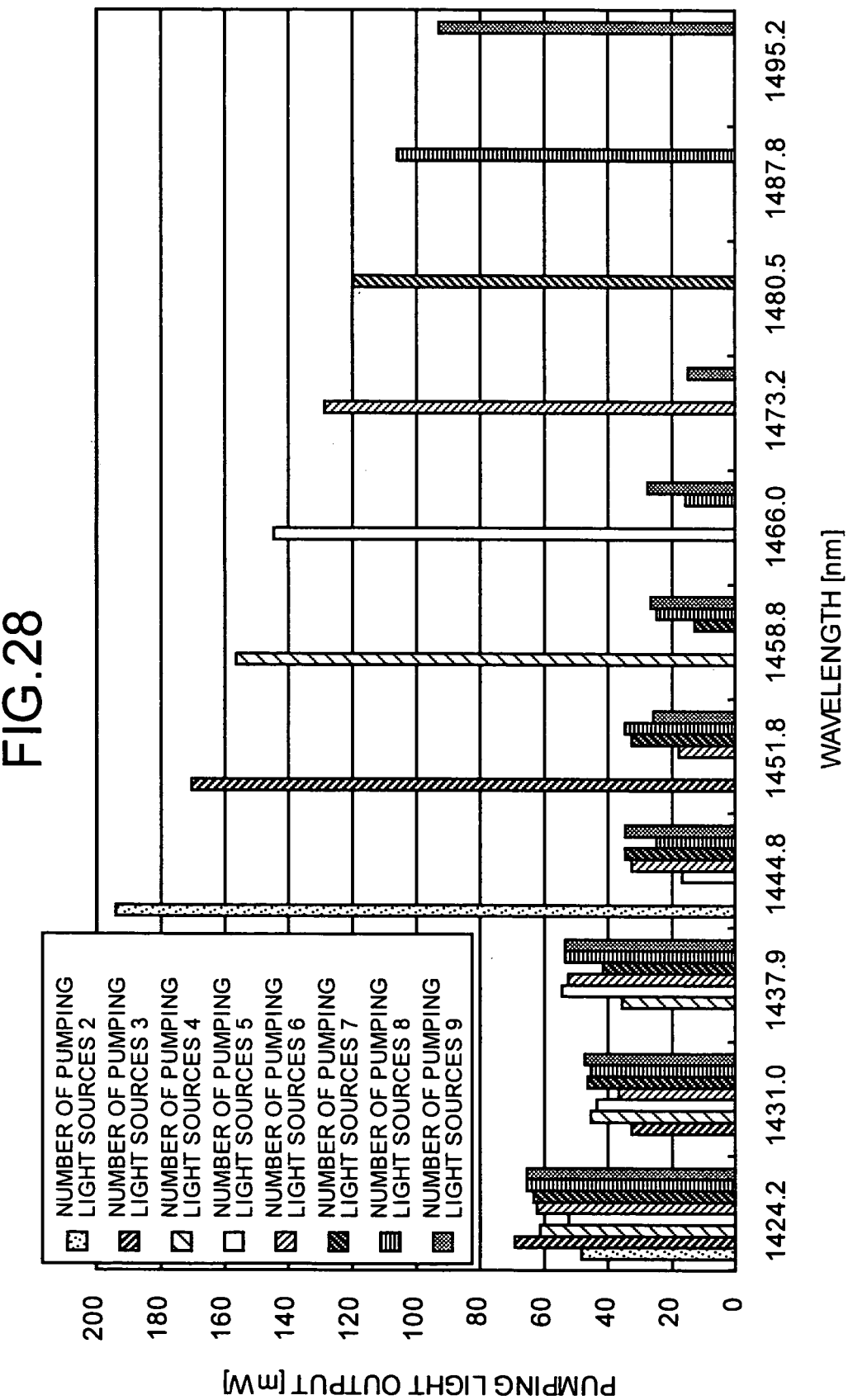
FIG. 28 is a graph for explaining pumping light outputs of respective pumping light sources, which are used for the extension of the amplification band shown in FIG. 27, by wavelength.
Figure 29:
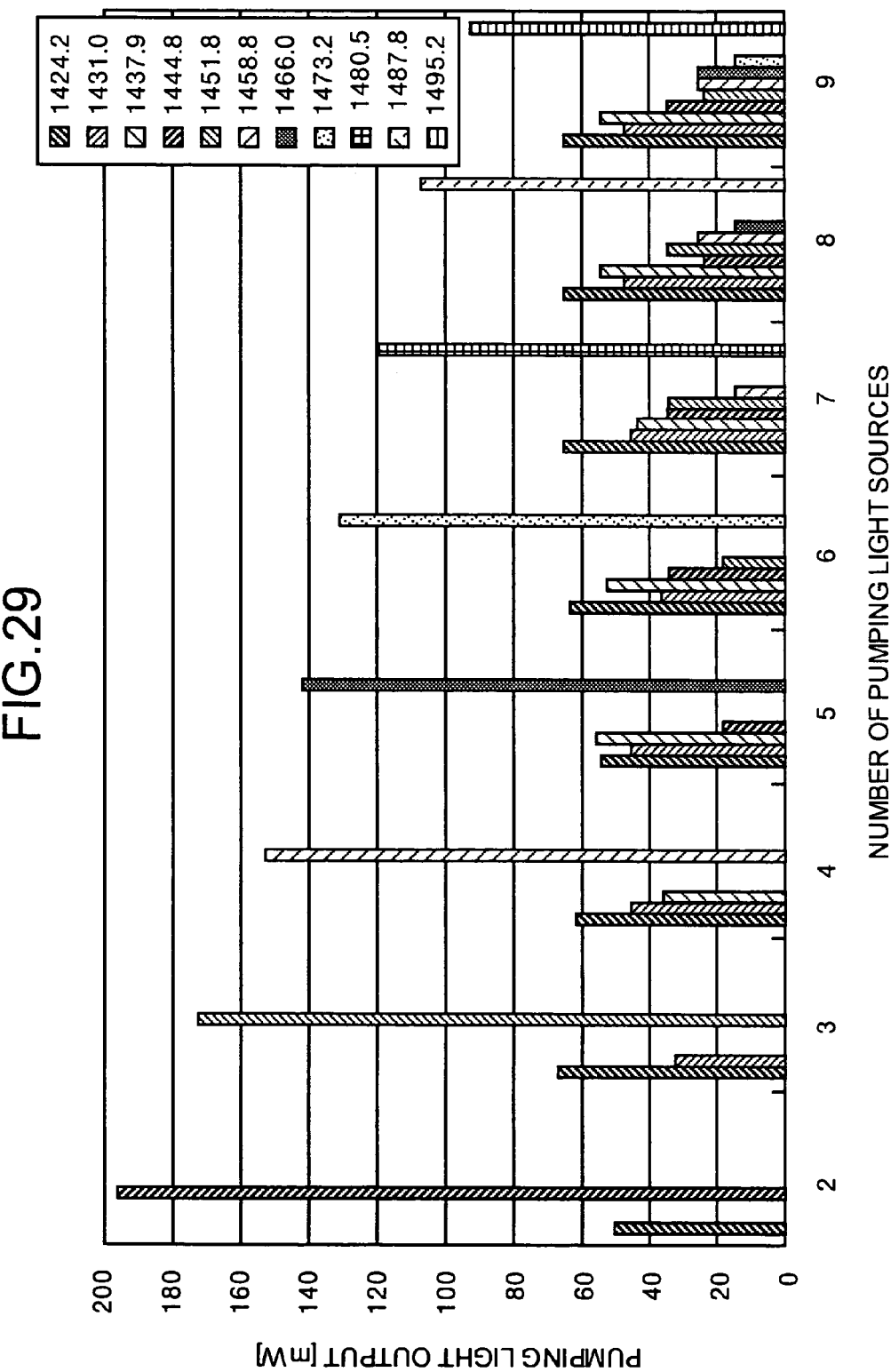
FIG. 29 is a graph for explaining pumping light outputs of the respective pumping light sources, which are used for the extension of the amplification band shown in FIG. 27, for each number of pumping light sources.

FIG. 27 is a graph for explaining wavelength dependency of a Raman gain at the time when a pumping light frequency interval is 1 terahertz, a fiber for amplification is a True-Wave-RS, a Raman gain is about 10 decibels or less, and an amplification band is sequentially extended in a long wavelength direction. FIG. 28 is a graph for explaining pumping light outputs of respective pumping light sources, which are used for the extension of the amplification band shown in FIG. 27, by wavelength. FIG. 29 is a graph for explaining pumping light outputs of the respective pumping light sources, which are used for the extension of the amplification band shown in FIG. 27, for each number of pumping light sources.

The first condition is that a pumping light output required of a longest pumping wavelength at each stage of band extension decreases as a band width increases. In FIGS. 28 and 29, for example, a band width increases compared with a pumping light output required of a longest pumping wavelength 1444.8 nanometers among light sources, which are used when the number of pumping light sources is two, and a pumping light output required of a longest pumping wavelength 1451.8 nanometers among pumping light sources, which are used when the number of pumping light sources is three, is reduced. In FIGS. 28 and 29, this condition is satisfied.

The fifth condition is that a pumping light output required of a certain pumping wavelength is the largest when the pumping wavelength is a longest wavelength. In FIG. 28, for example, paying attention to a pumping wavelength 1451.8 nanometers, among the respective numbers of pumping light sources, the pumping wavelength 1451.8 nanometers is a longest wavelength when the number of pumping light sources is three. Therefore, the fifth condition is set such that a pumping light output, which is required at the time when the number of pumping light sources is three and the pumping wavelength is 1451.8 nanometers, is the largest at the pumping wavelength 1451.8 nanometers.

The third condition is that a pumping light output of a longest pumping wavelength at each stage of band extension is the largest among respective pumping light outputs at the stage. In FIG. 29, for example, when the number of pumping light sources is five, the third condition is set such that a pumping light output at a pumping wavelength 1466.0 nanometers, which is a longest wavelength among wavelengths of five pumping lights, is the largest among pumping light outputs of the five pumping lights.

According to the fifth embodiment, among the first to the third conditions indicated according to the first embodiment, the second condition is replaced with the fifth condition. By satisfying these conditions, it is possible to maintain a flat amplification band shown in FIG. 27 at each stage of extension of an amplification band in a long wavelength direction.

According to a sixth embodiment of the present invention, the results indicated in the first to the fifth embodiments are summarized and a new condition at the time of band extension is found from a relation between the number of pumping wavelengths and a total pumping light output at each stage of the band extension.

Figure 30:
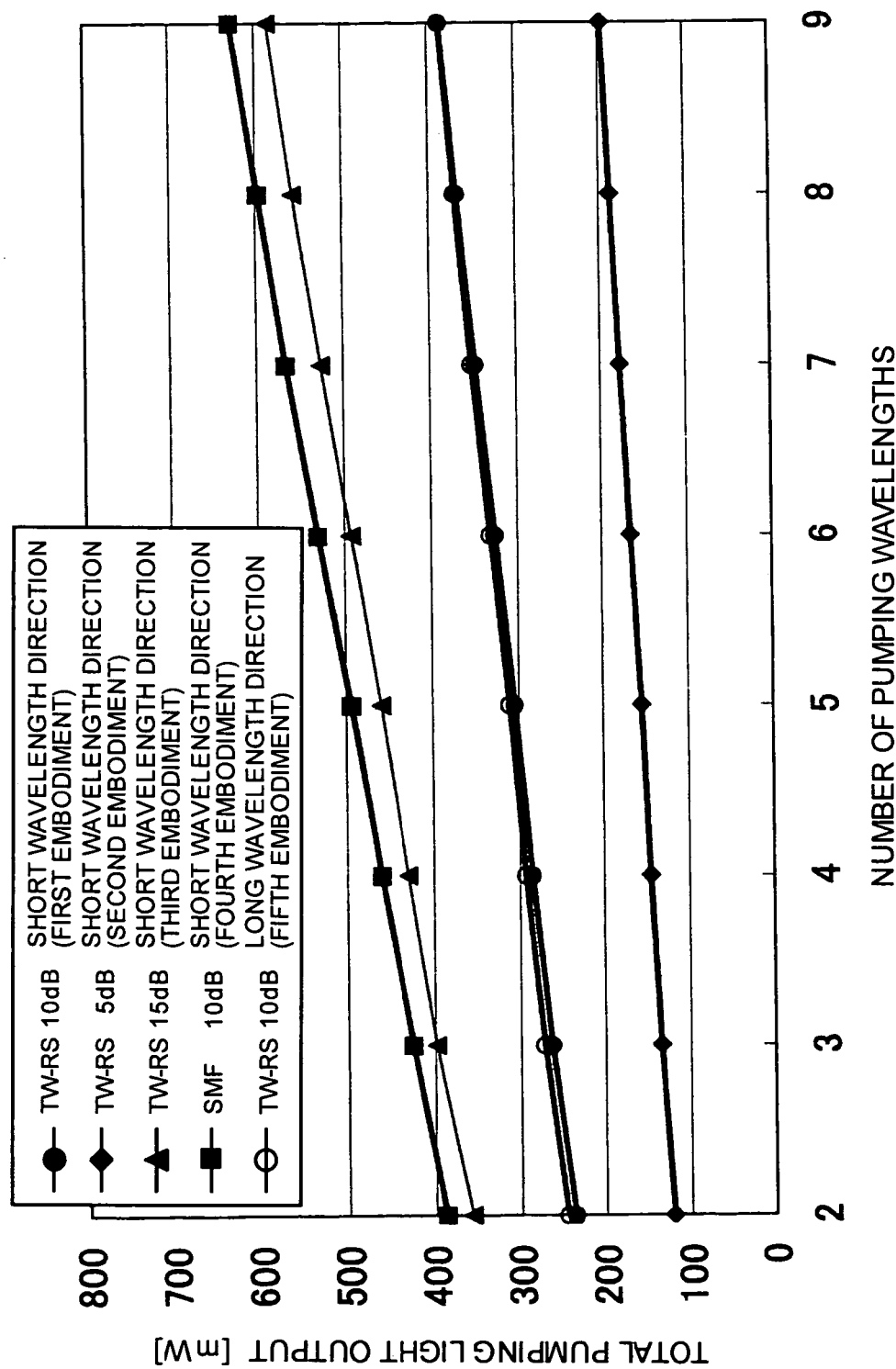
FIG. 30 is a graph for explaining a relation of a total pumping light output to the number of pumping wavelengths according to the first to the fifth embodiments.

FIG. 30 is a graph for explaining a relation of a total pumping light output to the number of pumping wavelengths at each stage of band extension for each of the first to the fifth embodiments. As shown in FIG. 30, a total pumping light output at each stage corresponding to each of the first to the fifth embodiments linearly increases according to an increase in the number of pumping wavelengths and has a proportional relation to the number of pumping wavelengths. Here, since the number of pumping wavelengths is proportional to the amplification band, the total pumping light output is proportional to the amplification band. In other words, this proportional relation sets a limitation that the total pumping light output at each stage of the band extension has to be proportional to the number of pumping wavelengths.

Figure 31:
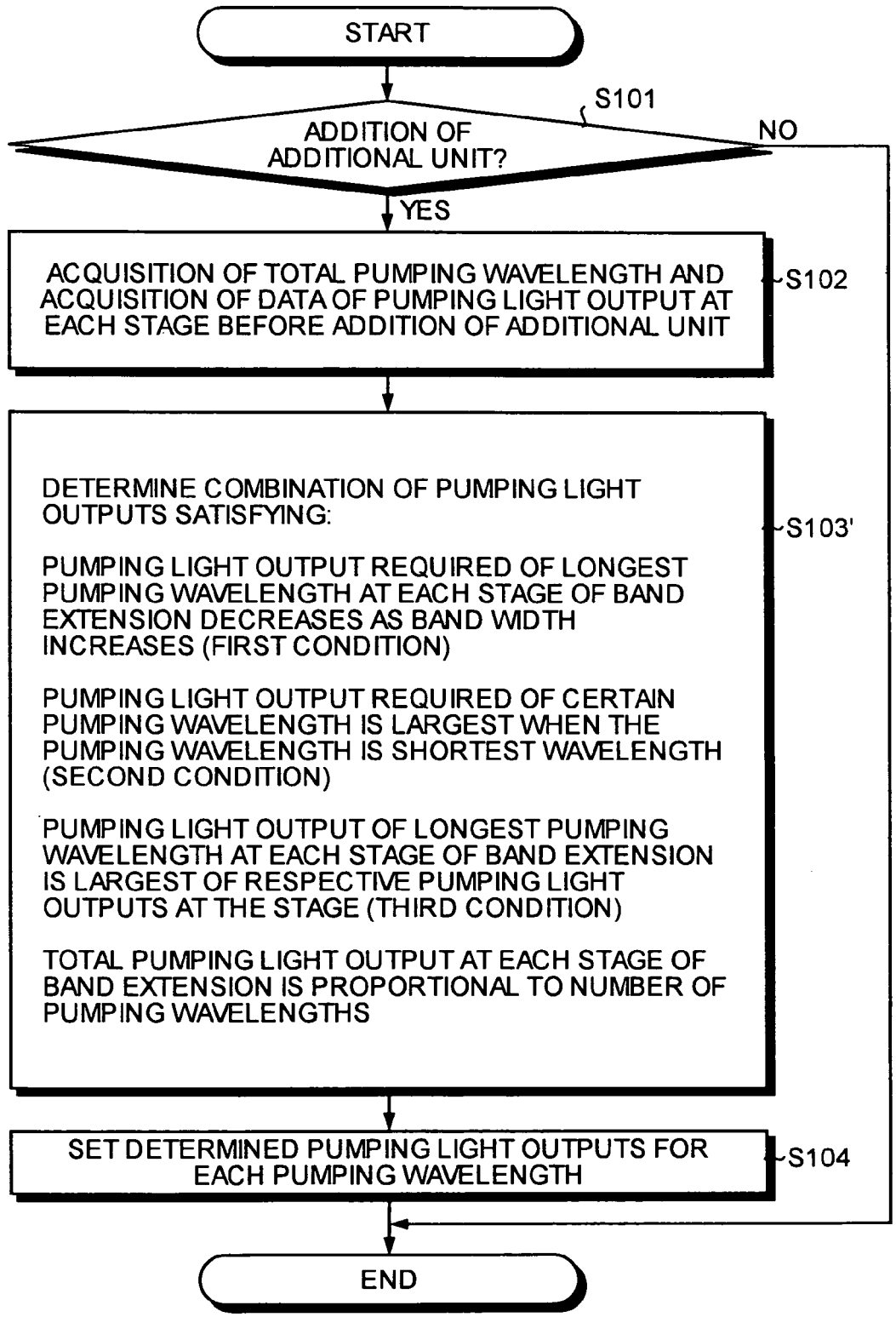
FIG. 31 is a flowchart of a setting control processing procedure by a setting control unit according to a sixth embodiment of the present invention.

Therefore, as shown in FIG. 31, for example, when processing for determining a pumping light output for each pumping wavelength corresponding to the first embodiment is performed, as indicated at step S103', it is possible to add a condition that a total pumping light output at each stage of band extension is proportional to the number of pumping wavelengths to the first to the third conditions as a new condition to determine a pumping light output for each pumping wavelength. In this case, since the new condition is added, it is possible to narrow down a value of a pumping light output for each pumping wavelength and perform prompt and accurate determination processing. Note that, at step S103', it is possible to exclude the first to the third conditions and determine a pumping light output for each pumping wavelength according to only this new condition. Moreover, this new condition may be combined with an arbitrary condition for defining a pumping light output, which is not inconsistent with but completely different from the new condition itself, other than the conditions of the present invention.

When a total pumping light output (mW) is defined as "P", the number of pumping wavelengths is defined as "n", a Raman gain (dB) is defined as "G", and constants set for each Raman amplifier shown in FIG. 1 are defined as "C1" and "C2", the total pumping light output P can be represented by the following expression (1).

$$P = (C1 \cdot n + C2)G \quad (1)$$

Here, FIG. 32 indicates values of the constants C1 and C2 at the time when the expression (1) is applied to the first to the fifth embodiments. As shown in FIG. 32, in the first to the third embodiments, the constants C1 and C2 have substantially the same values and can be used as common constants. The constants C1 and C2 according to the fifth embodiment have values approximate to the constants C1 and C2 in the first to the third embodiments. Note that the constants C1 and C2 according to the fourth embodiment have slightly different values compared with the constants C1 and C2 in the first to the third and the fifth embodiments. However, in the case of the fourth embodiment, the constants C1 and C2 according to the fourth embodiment only have to be used.

In FIG. 32, when a type of a fiber is the same as those in the first to the third and the fifth embodiments, it is possible to use substantially the same values for the constants C1 and C2 in the first to the third and the fifth embodiments. In addition, it is possible to apply the expression (1) regardless of a direction of band extension (a long wavelength direction or a short wavelength direction).

Figure 33:
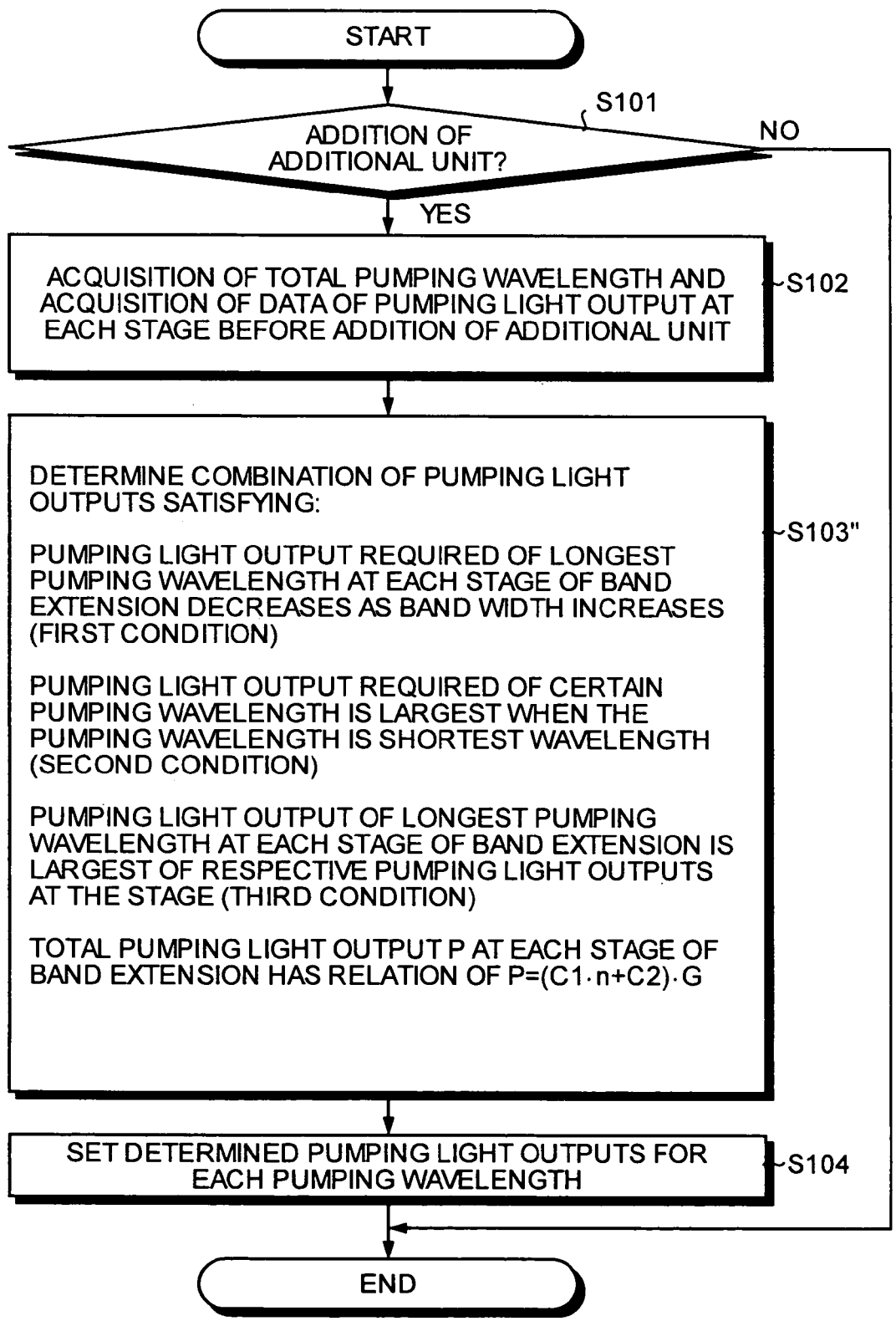
FIG. 33 is a flowchart of a setting control processing procedure by a setting control unit according to a modification of the sixth embodiment.

Therefore, as shown in FIG. 33, for example, when processing for determining a pumping light output for each pumping wavelength corresponding to the first embodiment is performed, as indicated at step S103", it is possible to add a condition that the relation of the expression (1) is established to the first to the third conditions as a new condition to determine a pumping light output for each pumping wavelength. In this case, since the new condition is added, it is possible to narrow down a value of a pumping light output for each pumping wavelength and perform prompt and accurate determination processing. Note that, at step S103", it is possible to exclude the first to the third conditions and determine a pumping light output for each pumping wavelength according to only this new condition.

Note that, when the constants C1 and C2 of the expression (1) are set, it is possible to estimate a total pumping light output easily even if the Raman gain G changes.

Although a pumping light frequency interval is 1 terahertz according to the first embodiment, a pumping light frequency interval is set to 2 terahertz according to a seventh embodiment of the present invention. Other elements are the same as those according to the first embodiment. Setting control by the setting control unit 4 is the same as that according to the third embodiment.

Figure 34:
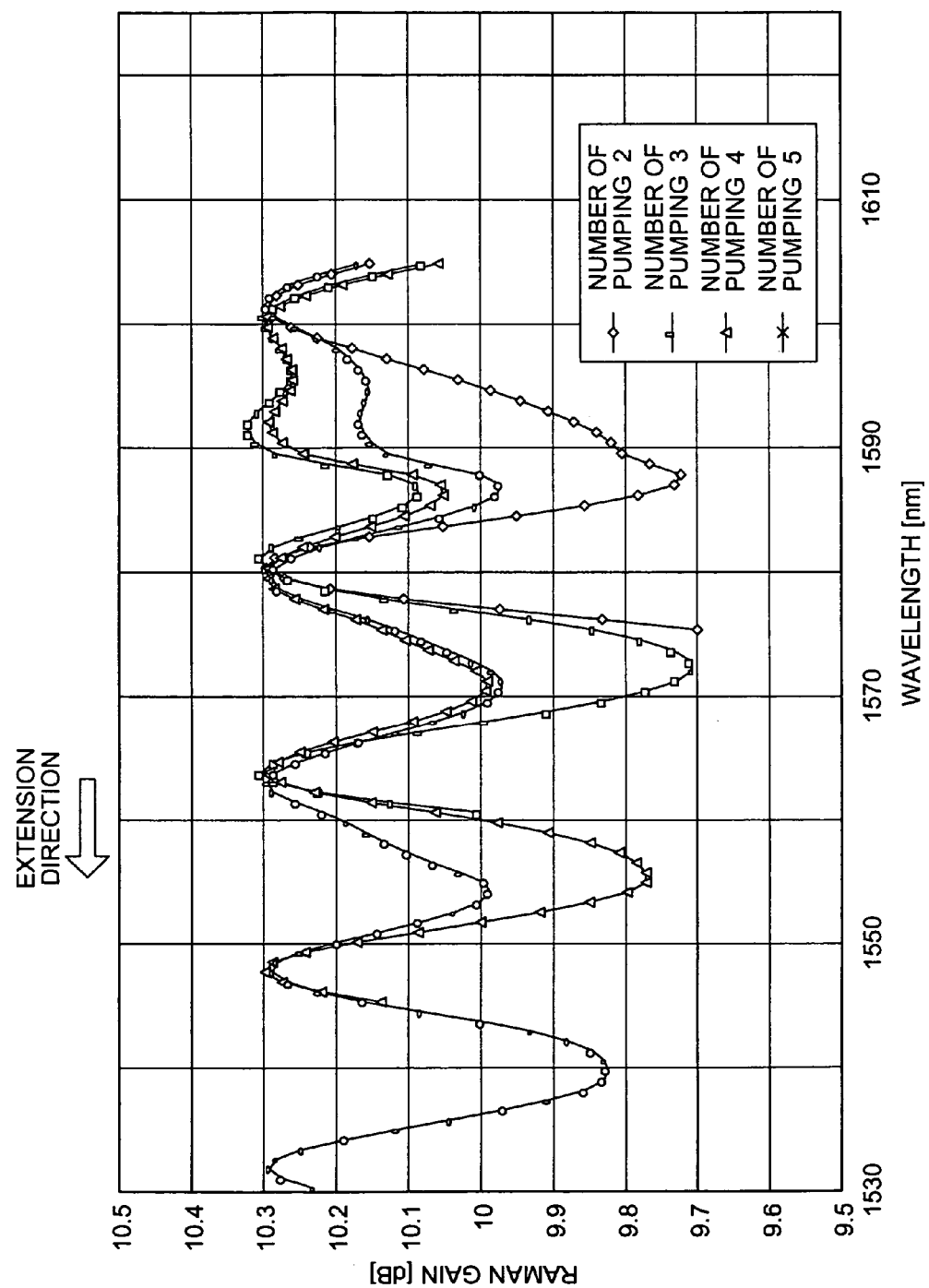
FIG. 34 is a graph for explaining wavelength dependency of a Raman gain at the time when a pumping light frequency interval is 2 terahertz, a fiber for amplification is a True-Wave-RS, a Raman gain is about 10 decibels or less, and an amplification band is sequentially extended in a short wavelength direction.
Figure 35:
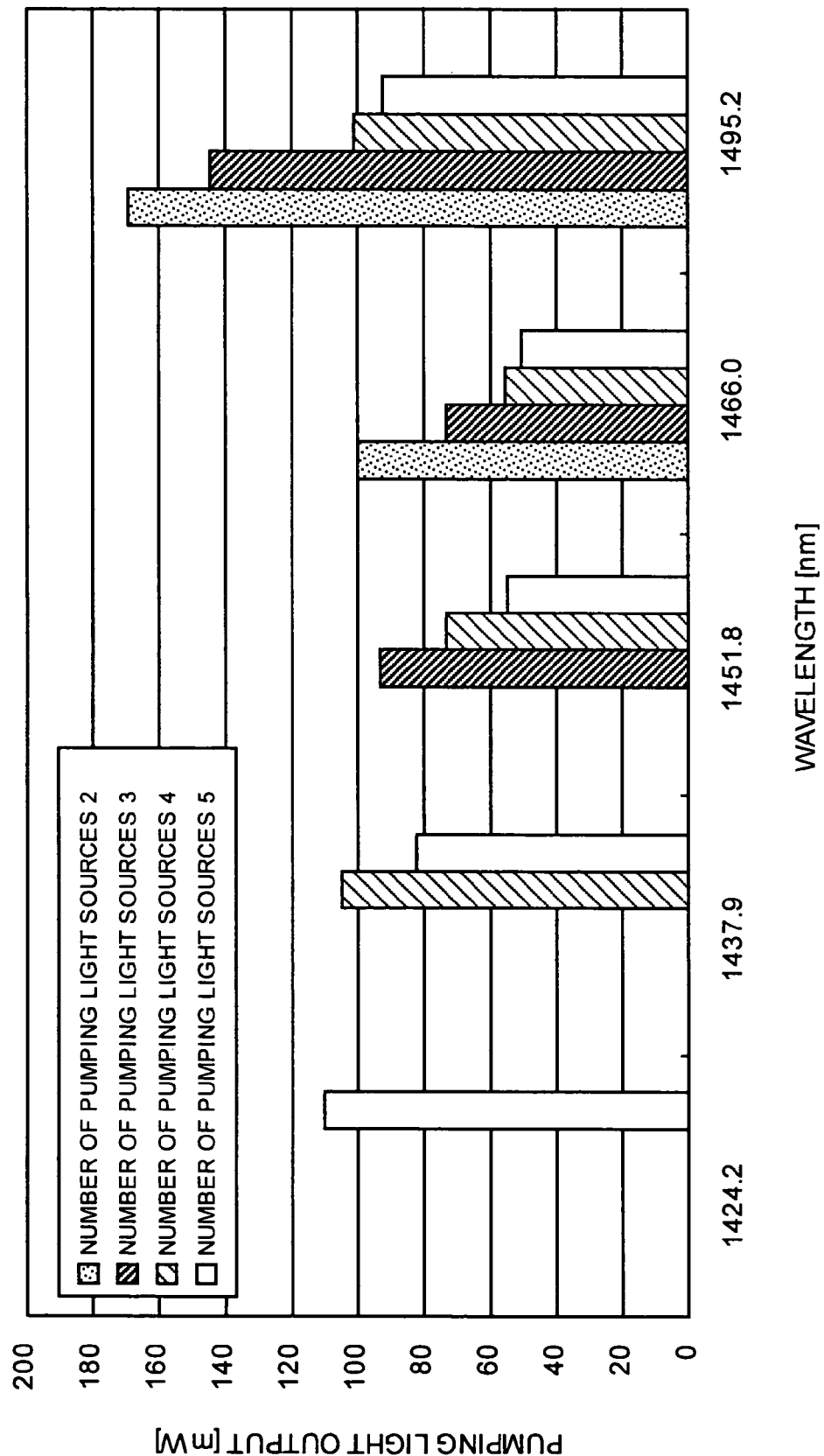
FIG. 35 is a graph for explaining pumping light outputs of respective pumping light sources, which are used for the extension of the amplification band shown in FIG. 34, by wavelength.
Figure 36:
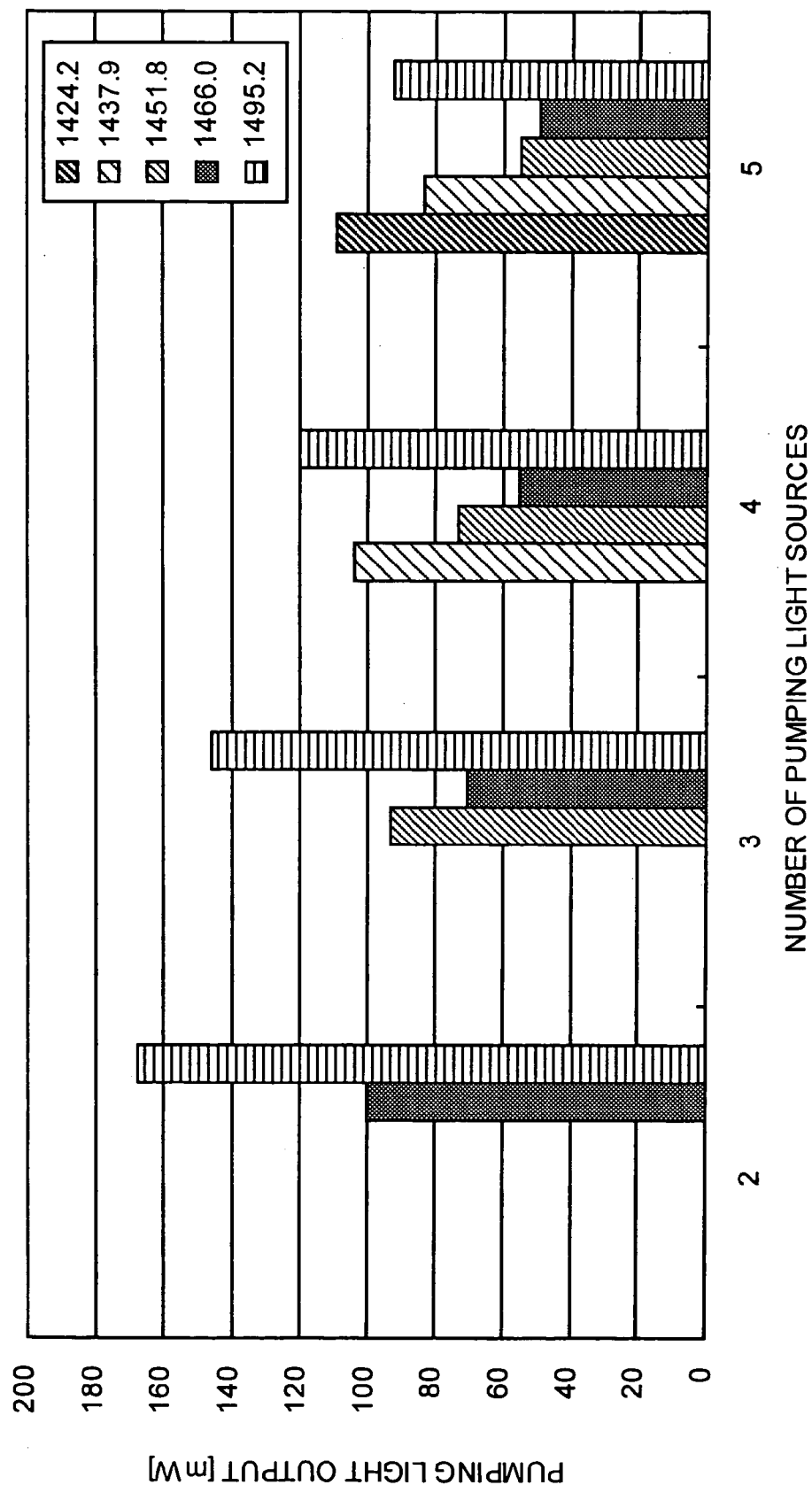
FIG. 36 is a graph for explaining pumping light outputs of the respective pumping light sources, which are used for the extension of the amplification band shown in FIG. 34, for each number of pumping light sources.

FIG. 34 is a graph for explaining wavelength dependency of a Raman gain at the time when a pumping light frequency interval is 2 terahertz, a fiber for amplification is a True-Wave-RS, a Raman gain is about 10 decibels or less, and an amplification band is sequentially extended in a short wavelength direction. FIG. 35 is a graph for explaining pumping light outputs of respective pumping light sources, which are used for the extension of the amplification band shown in FIG. 34, by wavelength. FIG. 36 is a graph for explaining pumping light outputs of the respective pumping light sources, which are used for the extension of the amplification band shown in FIG. 34, for each number of pumping light sources.

The first condition is that a pumping light output required of a longest pumping wavelength 1495.2 nanometers at each stage of band extension decreases as a band width increases. As shown in FIG. 35, this condition is satisfied.

The second condition is that a pumping light output required of a certain pumping wavelength is the largest when the pumping wavelength is a shortest wavelength. In FIG. 35, for example, paying attention to a pumping wavelength 1451.8 nanometers, among the respective numbers of pumping light sources, the pumping wavelength 1451.8 nanometers is a shortest wavelength when the number of pumping light sources is three. Therefore, the second condition is set such that a pumping light output, which is required at the time when the number of pumping light sources is three and the pumping wavelength is 1451.8 nanometers, is the largest at the pumping wavelength 1451.8 nanometers.

The fourth condition is that a pumping light output of a longest pumping wavelength or a shortest pumping wavelength at each stage of band extension is the largest among respective pumping light outputs at the stage. In FIG. 36, for example, when the number of pumping light sources is five, the fourth condition is set such that a pumping light output at a pumping wavelength 1495.2 nanometers, which is a longest wavelength among wavelengths of five pumping lights, or a pumping wavelength 1424.2 nanometers, which is a shortest wavelength among wavelengths of five pumping lights, is the largest among pumping light outputs of the five pumping lights. In FIGS. 34 to 36, a pumping light output at the shortest pumping wavelength 1424.2 nanometers is set to be the largest. Similarly, when the number of pumping light sources is four, the fourth condition is set such that a pumping light output at a pumping wavelength 1495.2 nanometers, which is a longest wavelength among wavelengths of four pumping lights, or a pumping wavelength 1437.9 nanometers, which is a shortest wavelength among wavelengths of four pumping lights, is the largest among pumping light outputs of the four pumping lights. In FIGS. 34 to 36, a pumping light output at the longest pumping wavelength 1495.2 nanometers is set to be the largest.

According to the seventh embodiment, among the first to the third conditions indicated according to the first embodiment, the third condition is changed to the moderate fourth condition serving as a determination condition. By satisfying these conditions, it is possible to maintain a flat amplification band shown in FIG. 34 at each stage of extension of an amplification band in a short wavelength direction even at the time when a pumping light frequency interval is 2 terahertz.

Figure 37:
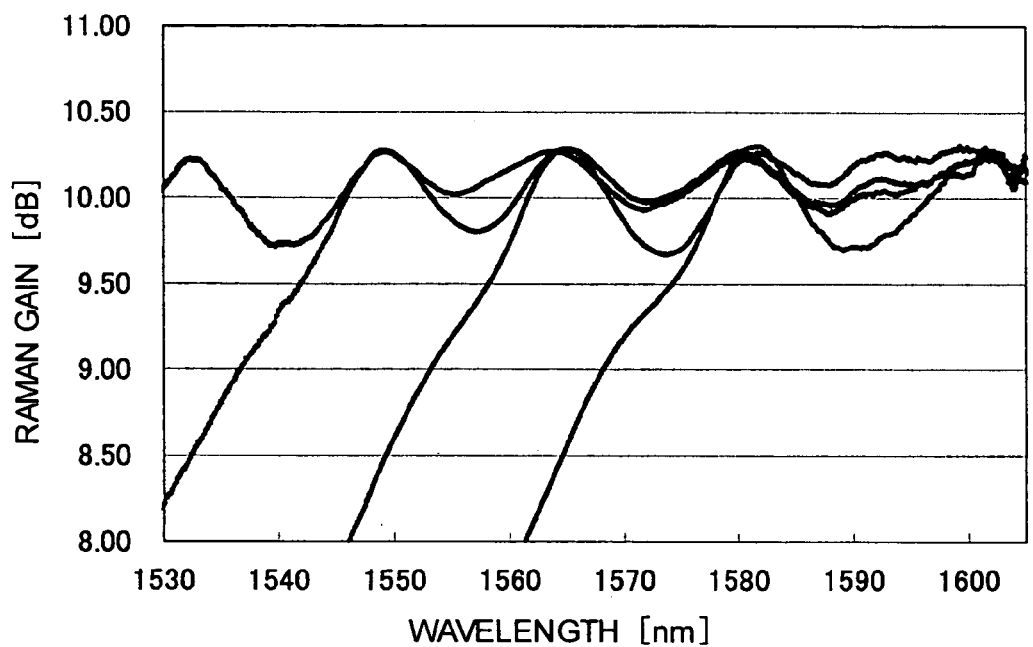
FIG. 37 is a graph for explaining an experimental result on a relation of a Raman gain to a wavelength at the time when a seventh embodiment is applied to the Raman amplifier shown in FIG. 1.

Note that the results shown in FIGS. 34 to 36 are simulation results. On the other hand, FIGS. 37 and 38 correspond to simulation results shown in FIGS. 34 to 36 and are graphs for explaining experimental results at the time when the seventh embodiment is applied to the Raman amplifier shown in FIG. 1. FIG. 37 corresponds to FIG. 34 and is a graph for explaining a relation of a Raman gain to a wavelength with respective steps of band extension as parameters. In addition, FIG. 38 is a graph for explaining a relation of respective pumping light outputs to pumping wavelength of respective pumping light sources with respective steps of band extension as parameters and is a graph comparing simulation results and experimental results.

Figure 38:
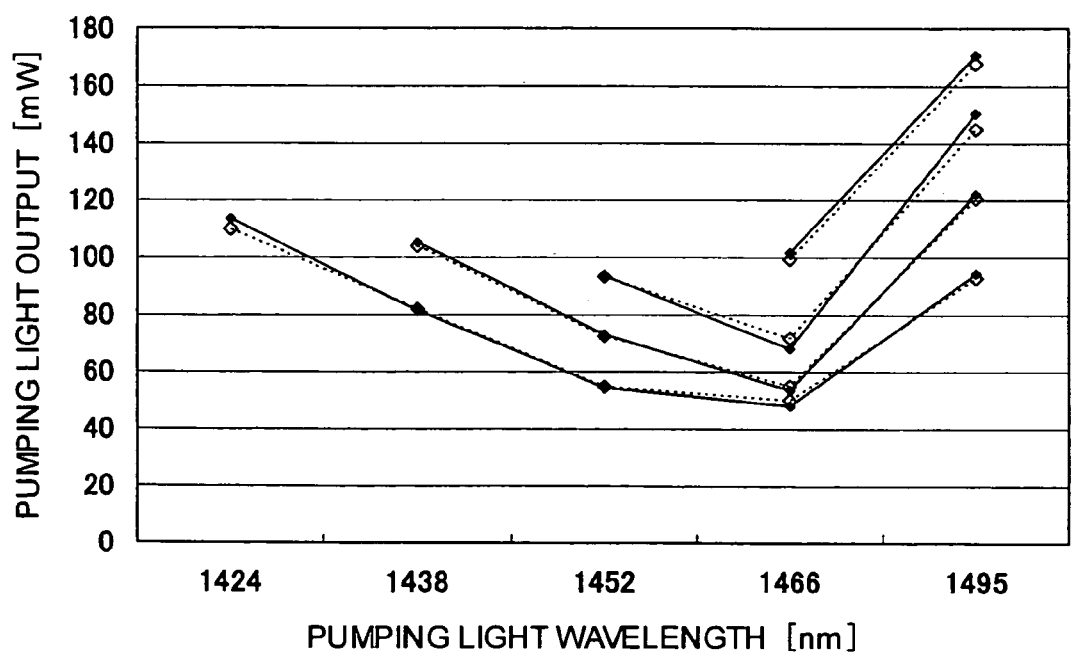
FIG. 38 is a graph comparing a simulation result and an experimental result on a relation of a pumping light output to a pumping wavelength at the time when the seventh embodiment is applied to the Raman amplifier shown in FIG. 1.

In the experimental results shown in FIGS. 37 and 38, respective pumping light outputs obtained by the simulations shown in FIGS. 34 to 36 are set to initial values and, then, fine-tuned such that a Raman gain coincides with the experimental results. More specifically, the respective pumping light outputs are fine-tuned such that a Raman gain is uniformalized at 10.30 decibels as a highest value for the respective wavelengths. This result is a relation of a Raman gain to a wavelength shown in FIG. 37 and is a relation of a pumping light output to respective pumping wavelengths indicated by a solid line in FIG. 38. As shown in FIG. 38, the experimental result of the pumping light output to the respective pumping wavelengths satisfies the first, the second, and the fourth conditions and approximates to a simulation result indicated by a broken line. Note that this experimental result does not coincide with the simulation result completely but only has to be an experimental result that satisfies the first, the second, and the fourth conditions.

Although a pumping light frequency interval is 1 terahertz according to the second embodiment, a pumping light frequency interval is set to 2 terahertz according to an eighth embodiment of the present invention. Other elements are the same as those according to the second embodiment. Setting control by the setting control unit 4 is the same as that according to the first embodiment.

Figure 39:
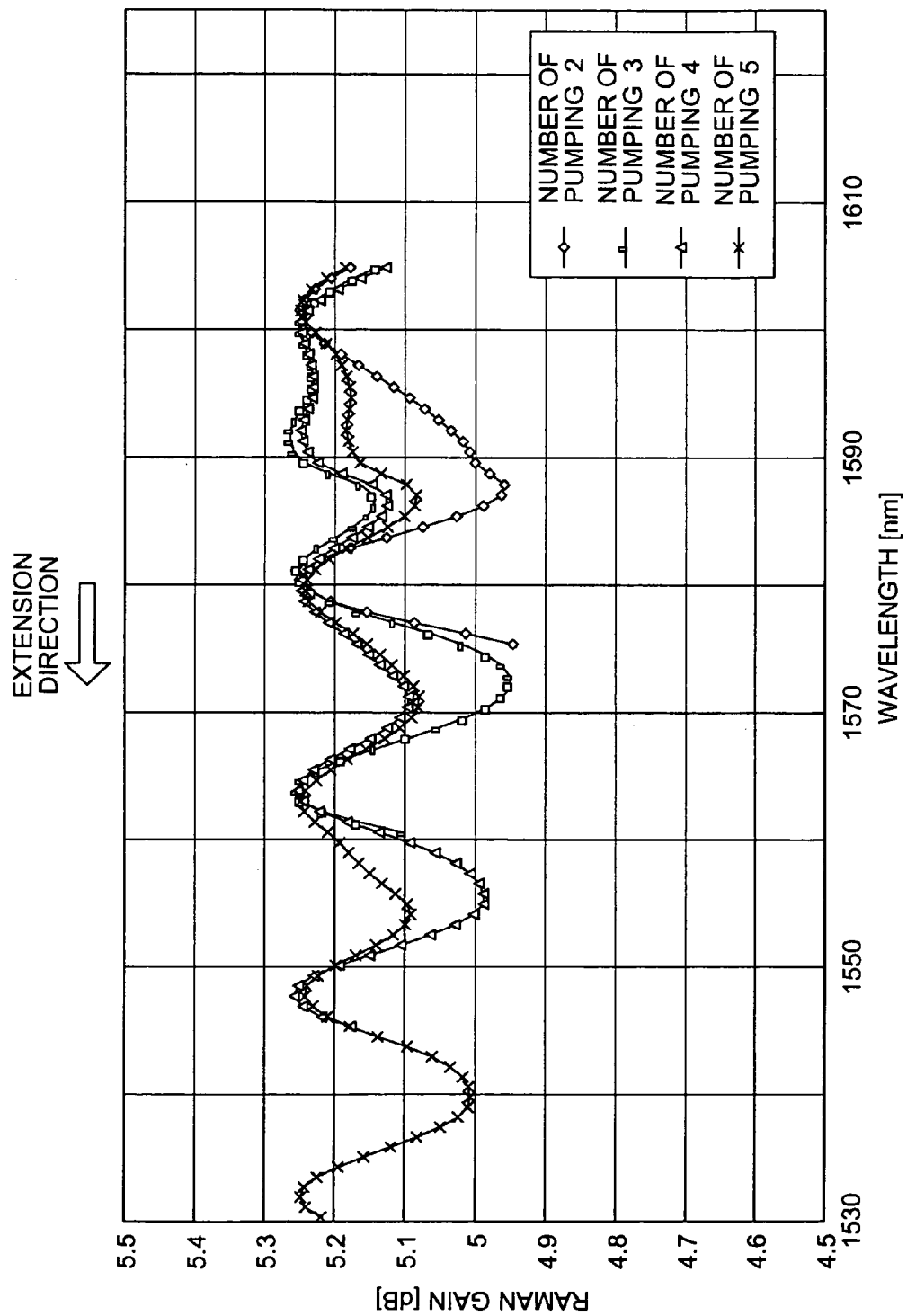
FIG. 39 is a graph for explaining wavelength dependency of a Raman gain at the time when a pumping light frequency interval is 2 terahertz, a fiber for amplification is a True-Wave-RS, a Raman gain is about 5 decibels or less, and an amplification band is sequentially extended in a short wavelength direction.
Figure 40:
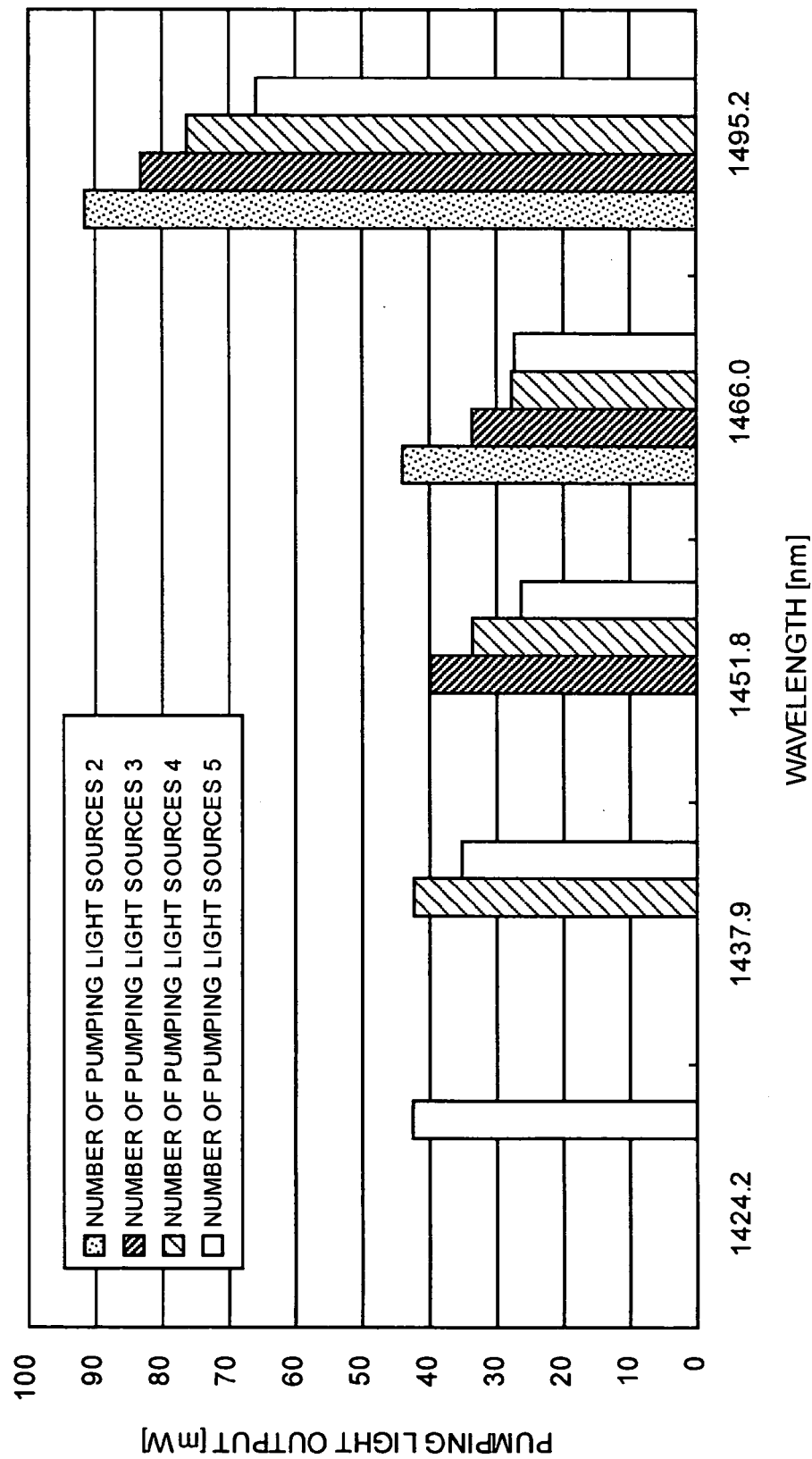
FIG. 40 is a graph for explaining pumping light outputs of respective pumping light sources, which are used for the extension of the amplification band shown in FIG. 39, by wavelength.
Figure 41:
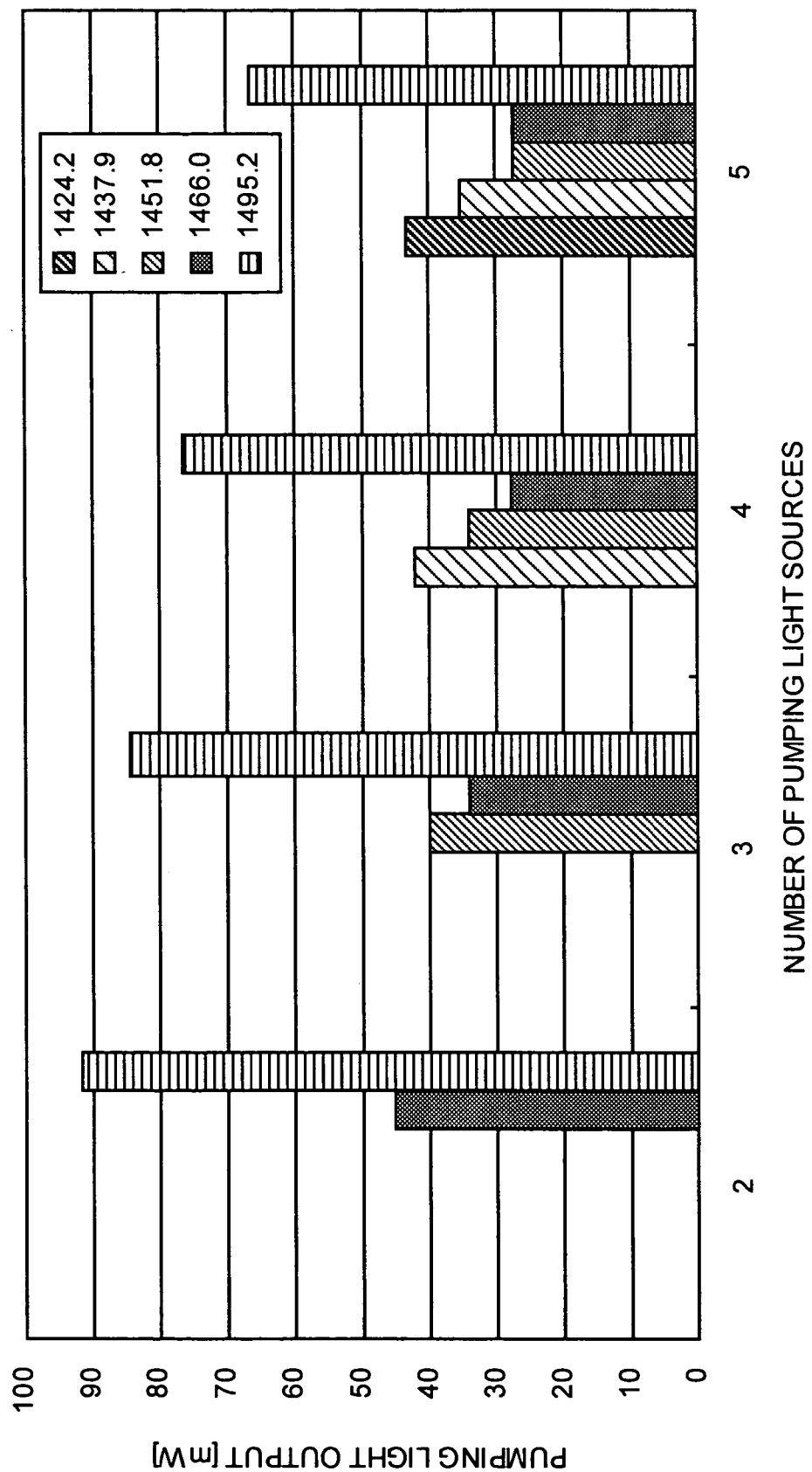
FIG. 41 is a graph for explaining pumping light outputs of the respective pumping light sources, which are used for the extension of the amplification band shown in FIG. 39, for each number of pumping light sources.

FIG. 39 is a graph for explaining wavelength dependency of a Raman gain at the time when a pumping light frequency interval is 2 terahertz, a fiber for amplification is a True-Wave-RS, a Raman gain is about 5 decibels or less, and an amplification band is sequentially extended in a short wavelength direction. FIG. 40 is a graph for explaining pumping light outputs of respective pumping light sources, which are used for the extension of the amplification band shown in FIG. 39, by wavelength. FIG. 41 is a graph for explaining pumping light outputs of the respective pumping light sources, which are used for the extension of the amplification band shown in FIG. 39, for each number of pumping light sources.

The first condition is that a pumping light output required of a longest pumping wavelength 1495.2 nanometers at each stage of band extension decreases as a band width increases. As shown in FIG. 40, this condition is satisfied.

The second condition is that a pumping light output required of a certain pumping wavelength is the largest when the pumping wavelength is a shortest wavelength. In FIG. 40, for example, paying attention to a pumping wavelength 1466.0 nanometers, among the respective numbers of pumping light sources, the pumping wavelength 1466.0 nanometers is a shortest wavelength when the number of pumping light sources is two. Therefore, the second condition is set such that a pumping light output, which is required at the time when the number of pumping light sources is two and the pumping wavelength is 1466.0 nanometers, is the largest at the pumping wavelength 1466.0 nanometers.

The third condition is that a pumping light output of a longest pumping wavelength at each stage of band extension is the largest among respective pumping light outputs at the stage. In FIG. 41, for example, when the number of pumping light sources is five, the third condition is set such that a pumping light output at a pumping wavelength 1495.2 nanometers, which is a longest wavelength among wavelengths of five pumping lights, is the largest among pumping light outputs of the five pumping lights.

According to the eighth embodiment, the first to the third conditions indicated according to the second embodiment are set as determination conditions. By satisfying these conditions, it is possible to maintain a flat amplification band with a Raman gain of about 5 decibels or less shown in FIG. 39 at each stage of extension of an amplification band in a short wavelength direction even at the time when a pumping light frequency interval is 2 terahertz.

Although a pumping light frequency interval is 1 terahertz according to the third embodiment, a pumping light frequency interval is set to 2 terahertz according to a ninth embodiment of the present invention. Other elements are the same as those according to the ninth embodiment.

Figure 42:
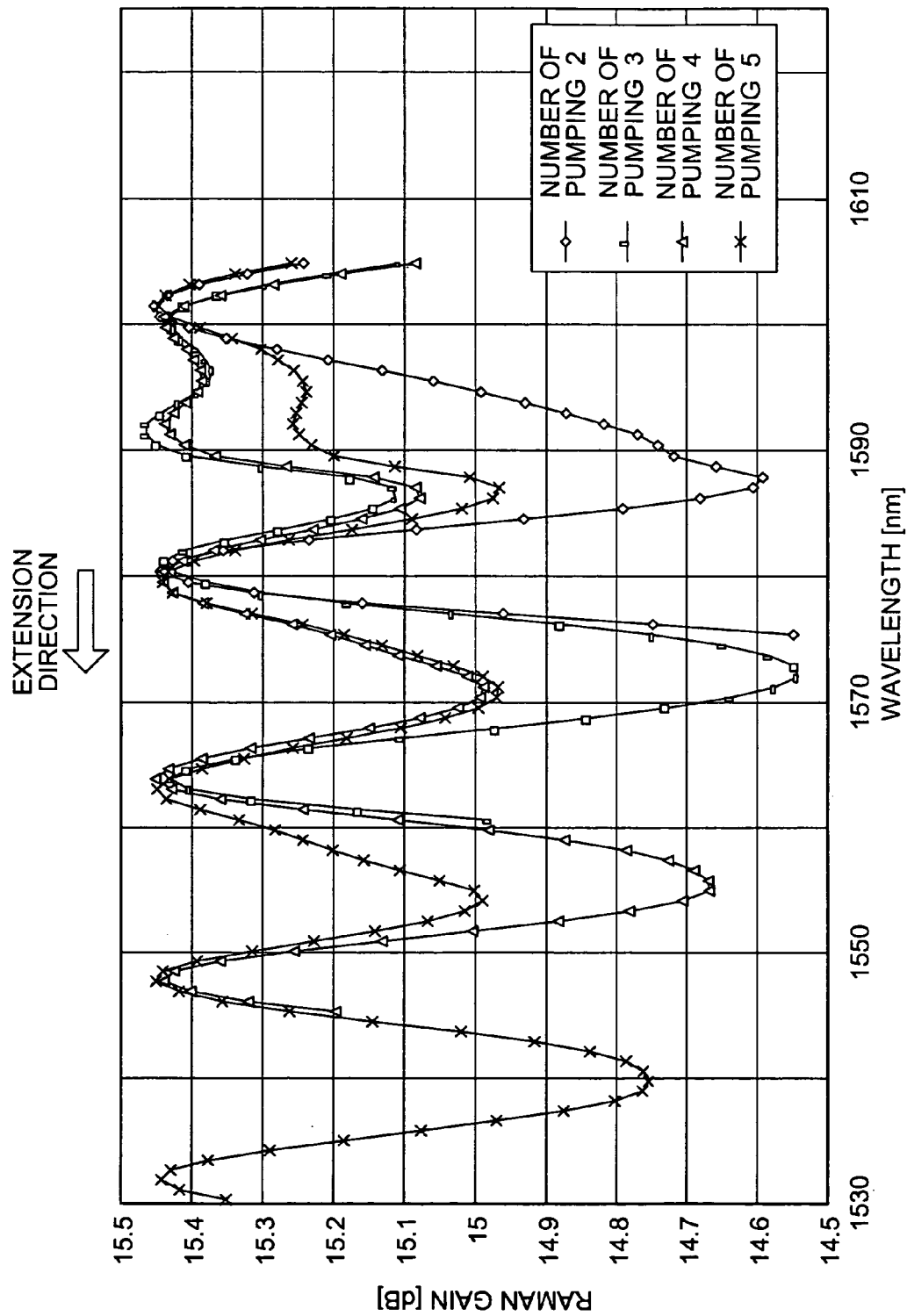
FIG. 42 is a graph for explaining wavelength dependency of a Raman gain at the time when a pumping light frequency interval is 2 terahertz, a fiber for amplification is True-Wave-RS, a Raman gain is about 15 decibels or less, and an amplification band is sequentially extended in a short wavelength direction.
Figure 43:
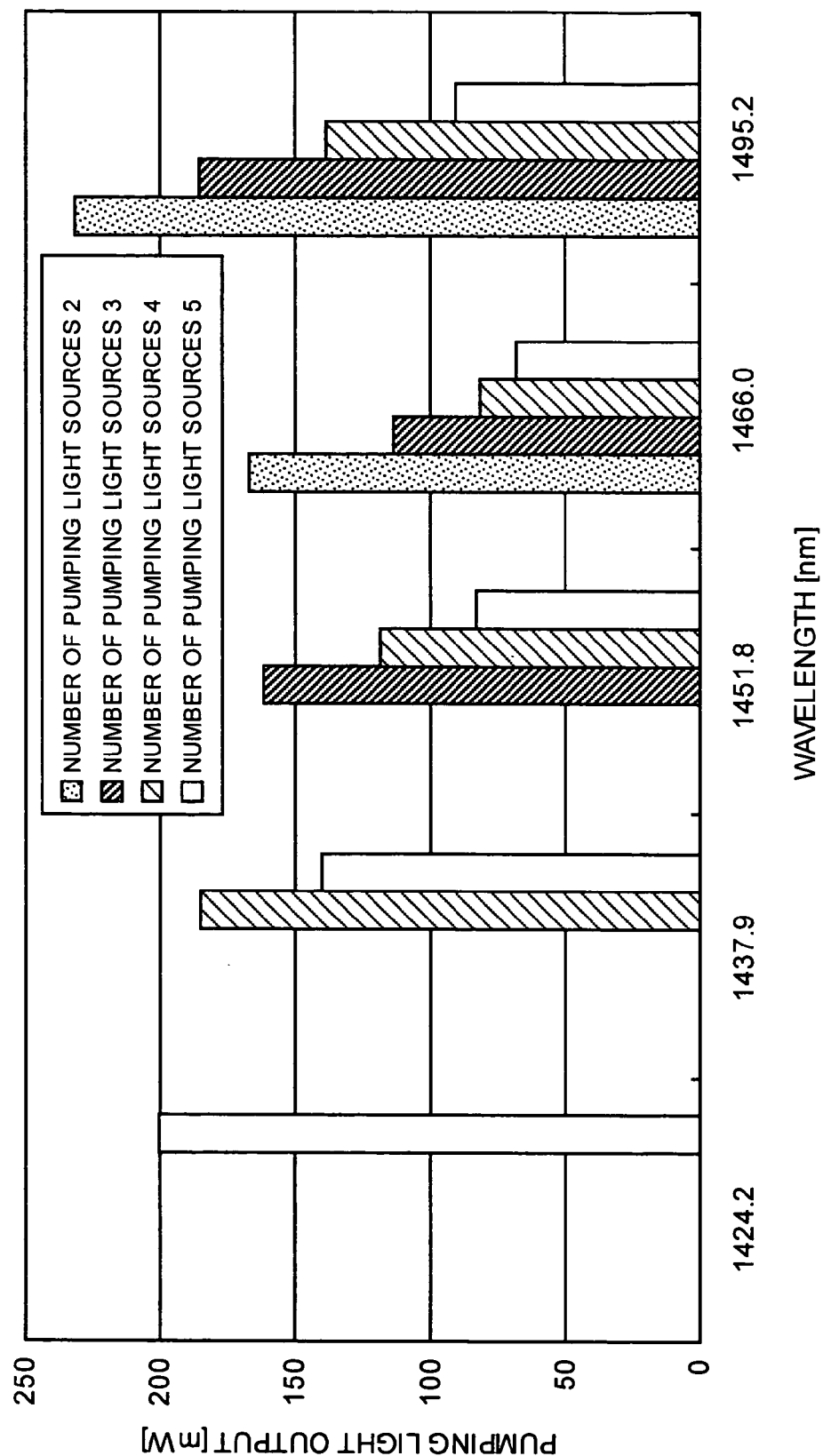
FIG. 43 is a graph for explaining pumping light outputs of respective pumping light sources, which are used for the extension of the amplification band shown in FIG. 42, by wavelength.
Figure 44:
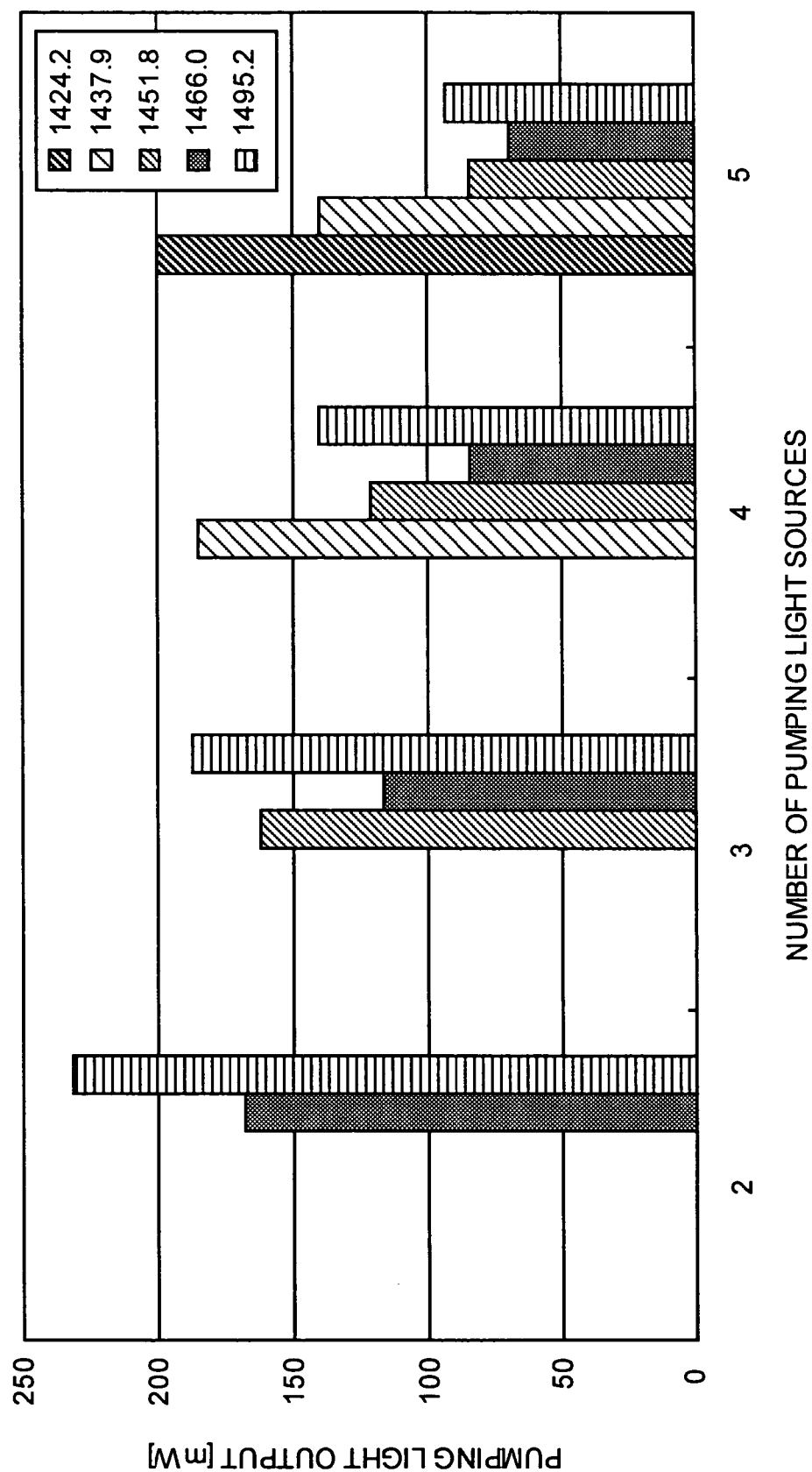
FIG. 44 is a graph for explaining pumping light outputs of the respective pumping light sources, which are used for the extension of the amplification band shown in FIG. 42, for each number of pumping light sources.

FIG. 42 is a graph for explaining wavelength dependency of a Raman gain at the time when a pumping light frequency interval is 2 terahertz, a fiber for amplification is a True-Wave-RS, a Raman gain is about 15 decibels or less, and an amplification band is sequentially extended in a short wavelength direction. FIG. 43 is a graph for explaining pumping light outputs of respective pumping light sources, which are used for the extension of the amplification band shown in FIG. 42, by wavelength. FIG. 44 is a graph for explaining pumping light outputs of the respective pumping light sources, which are used for the extension of the amplification band shown in FIG. 42, for each number of pumping light sources.

The first condition is that a pumping light output required of a longest pumping wavelength 1495.2 nanometers at each stage of band extension decreases as a band width increases. As shown in FIG. 43, this condition is satisfied.

The second condition is that a pumping light output required of a certain pumping wavelength is the largest when the pumping wavelength is a shortest wavelength. In FIG. 43, for example, paying attention to a pumping wavelength 1466.0 nanometers, among the respective numbers of pumping light sources, the pumping wavelength 1466.0 nanometers is a shortest wavelength when the number of pumping light sources is two. Therefore, the second condition is set such that a pumping light output, which is required at the time when the number of pumping light sources is two and the pumping wavelength is 1466.0 nanometers, is the largest at the pumping wavelength 1466.0 nanometers.

The fourth condition is that a pumping light output of a longest pumping wavelength or a shortest pumping wavelength at each stage of band extension is the largest among respective pumping light outputs at the stage. In FIG. 44, for example, when the number of pumping light sources is five, the fourth condition is set such that a pumping light output at a pumping wavelength 1495.2 nanometers, which is a longest wavelength among wavelengths of five pumping lights, or a pumping wavelength 1424.2 nanometers, which is a shortest wavelength among wavelengths of five pumping lights, is the largest among pumping light outputs of the five pumping lights. In FIGS. 42 to 44, a pumping light output at the shortest pumping wavelength 1424.2 nanometers is set to be the largest. Similarly, when the number of pumping light sources is three, the fourth condition is set such that a pumping light output at a pumping wavelength 1495.2 nanometers, which is a longest wavelength among wavelengths of three pumping lights, or a pumping wavelength 1451.8 nanometers, which is a shortest wavelength among wavelengths of three pumping lights, is the largest among pumping light outputs of the three pumping lights. In FIGS. 42 to 44, a pumping light output at the longest pumping wavelength 1495.2 nanometers is set to be the largest.

According to the ninth embodiment, the first, the second, and the fourth conditions indicated according to the third embodiment are set as determination conditions. By satisfying these conditions, it is possible to maintain a flat amplification band with a Raman gain of about 15 decibels or less shown in FIG. 42 at each stage of extension of an amplification band in a short wavelength direction even at the time when a pumping light frequency interval is 2 terahertz.

Although a pumping light frequency interval is 1 terahertz according to the fourth embodiment, a pumping light frequency interval is set to 2 terahertz according to a tenth embodiment of the present invention. Other elements are the same as those according to the fourth embodiment. Setting control by the setting control unit 4 is the same as that according to the third embodiment.

Figure 45:
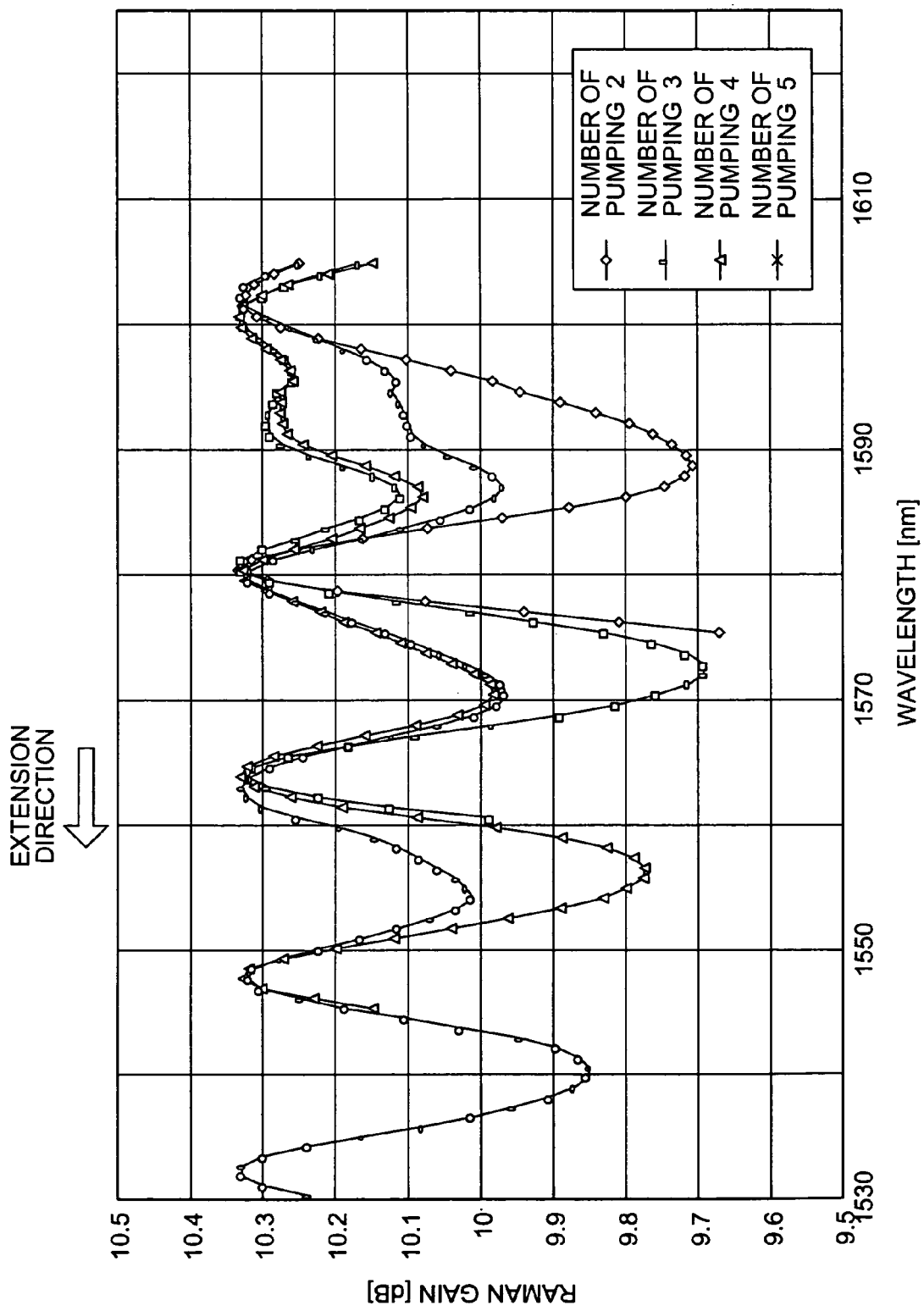
FIG. 45 is a graph for explaining wavelength dependency of a Raman gain at the time when a pumping light frequency interval is 2 terahertz, a fiber for amplification is an SMF, a Raman gain is about 10 decibels or less, and an amplification band is sequentially extended in a short wavelength direction.
Figure 46:
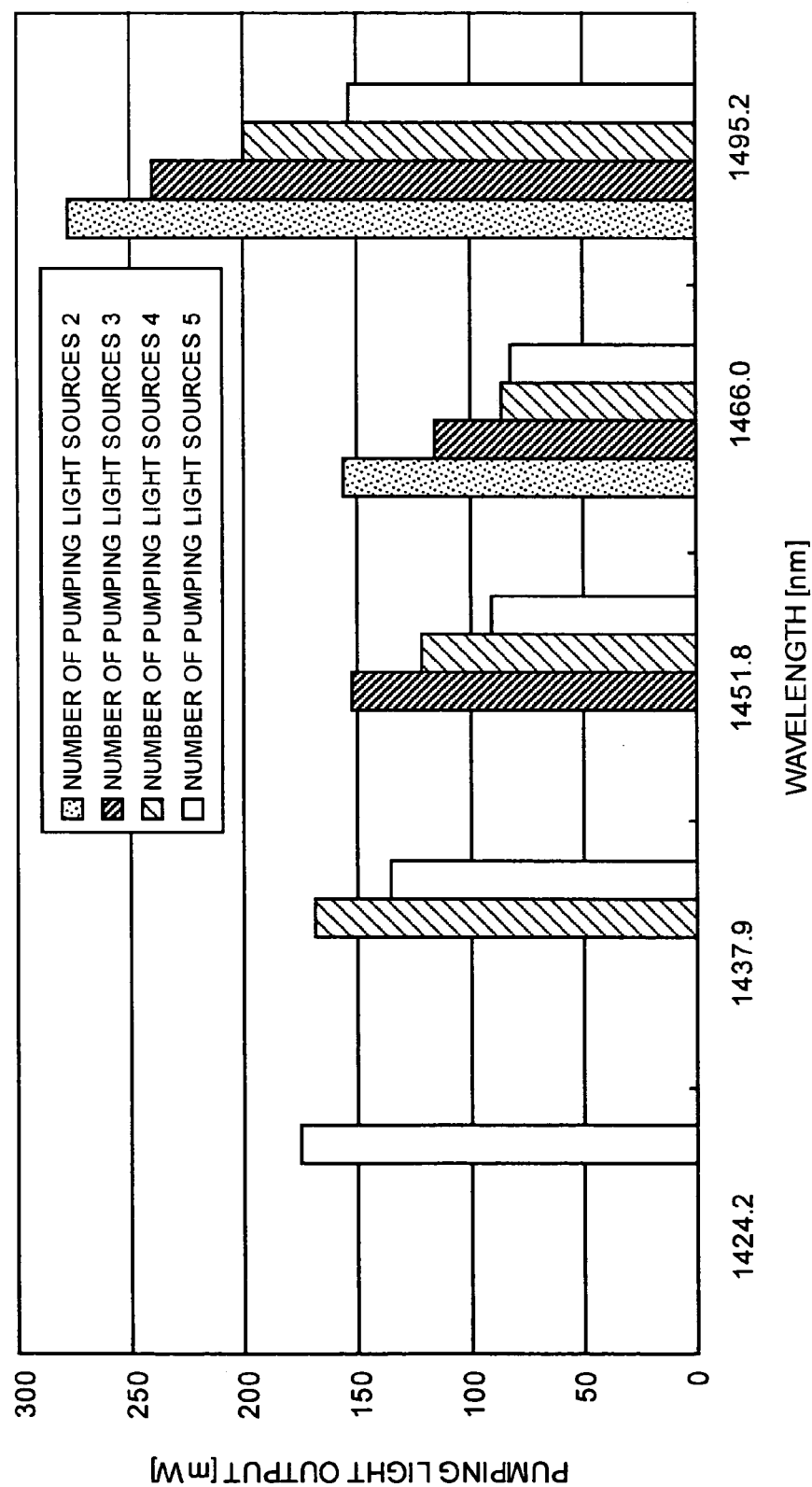
FIG. 46 is a graph for explaining pumping light outputs of respective pumping light sources, which are used for the extension of the amplification band shown in FIG. 45, by wavelength.
Figure 47:
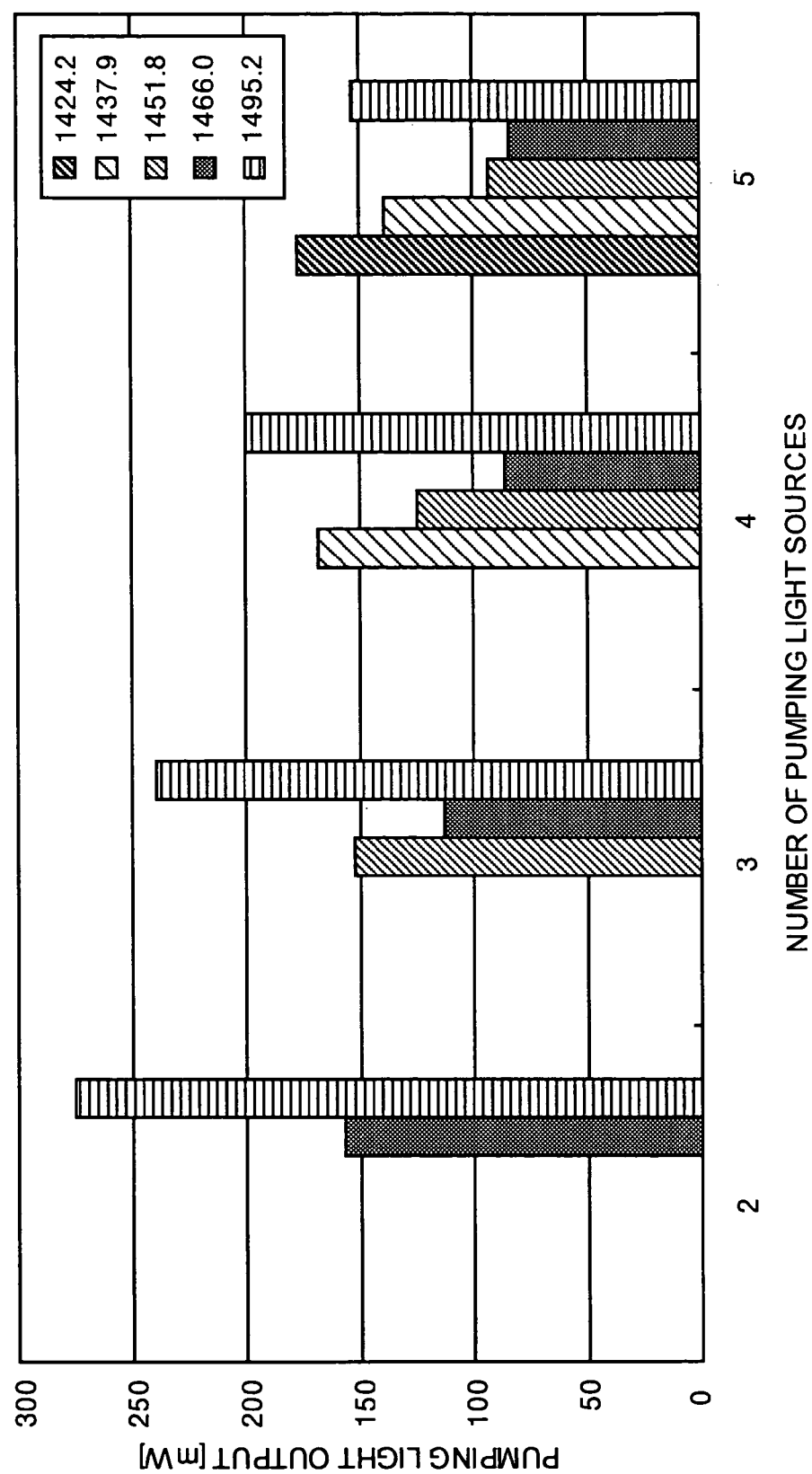
FIG. 47 is a graph for explaining pumping light outputs of the respective pumping light sources, which are used for the extension of the amplification band shown in FIG. 45, for each number of pumping light sources.

FIG. 45 is a graph for explaining wavelength dependency of a Raman gain at the time when a pumping light frequency interval is 2 terahertz, a fiber for amplification is an SMF, a Raman gain is about 10 decibels or less, and an amplification band is sequentially extended in a short wavelength direction. FIG. 46 is a graph for explaining pumping light outputs of respective pumping light sources, which are used for the extension of the amplification band shown in FIG. 45, by wavelength. FIG. 47 is a graph for explaining pumping light outputs of the respective pumping light sources, which are used for the extension of the amplification band shown in FIG. 45, for each number of pumping light sources.

The first condition is that a pumping light output required of a longest pumping wavelength 1495.2 nanometers at each stage of band extension decreases as a band width increases. As shown in FIG. 46, this condition is satisfied.

The second condition is that a pumping light output required of a certain pumping wavelength is the largest when the pumping wavelength is a shortest wavelength. In FIG. 46, for example, paying attention to a pumping wavelength 1466.0 nanometers, among the respective numbers of pumping light sources, the pumping wavelength 1466.0 nanometers is a shortest wavelength when the number of pumping light sources is two. Therefore, the second condition is set such that a pumping light output, which is required at the time when the number of pumping light sources is two and the pumping wavelength is 1466.0 nanometers, is the largest at the pumping wavelength 1466.0 nanometers.

The fourth condition is that a pumping light output of a longest pumping wavelength or a shortest pumping wavelength at each stage of band extension is the largest among respective pumping light outputs at the stage. In FIG. 47, for example, when the number of pumping light sources is five, the fourth condition is set such that a pumping light output at a pumping wavelength 1495.2 nanometers, which is a longest wavelength among wavelengths of five pumping lights, or a pumping wavelength 1424.2 nanometers, which is a shortest wavelength among wavelengths of five pumping lights, is the largest among pumping light outputs of the five pumping lights. In FIGS. 45 to 47, a pumping light output at the shortest pumping wavelength 1424.2 nanometers is set to be the largest. Similarly, when the number of pumping light sources is three, the fourth condition is set such that a pumping light output at a pumping wavelength 1495.2 nanometers, which is a longest wavelength among wavelengths of three pumping lights, or a pumping wavelength 1451.8 nanometers, which is a shortest wavelength among wavelengths of three pumping lights, is the largest among pumping light outputs of the three pumping lights. In FIGS. 45 to 47, a pumping light output at the longest pumping wavelength 1495.2 nanometers is set to be the largest.

According to the tenth embodiment, the same result as the seventh embodiment is obtained even if a fiber for amplification is an SMF. Among the first to the third conditions indicated according to the fourth embodiment, the third condition is changed to the moderate fourth condition serving as a determination condition. By satisfying these conditions, it is possible to maintain a flat amplification band with a Raman gain of about 10 decibels or less shown in FIG. 45 at each stage of extension of an amplification band in a short wavelength direction even at the time when a pumping light frequency interval is 2 terahertz.

Although a pumping frequency interval is 1 terahertz according to the fifth embodiment, a pumping frequency interval is set to 2 terahertz according to an eleventh embodiment of the present invention. Other elements are the same as those according to the fifth embodiment.

Figure 48:
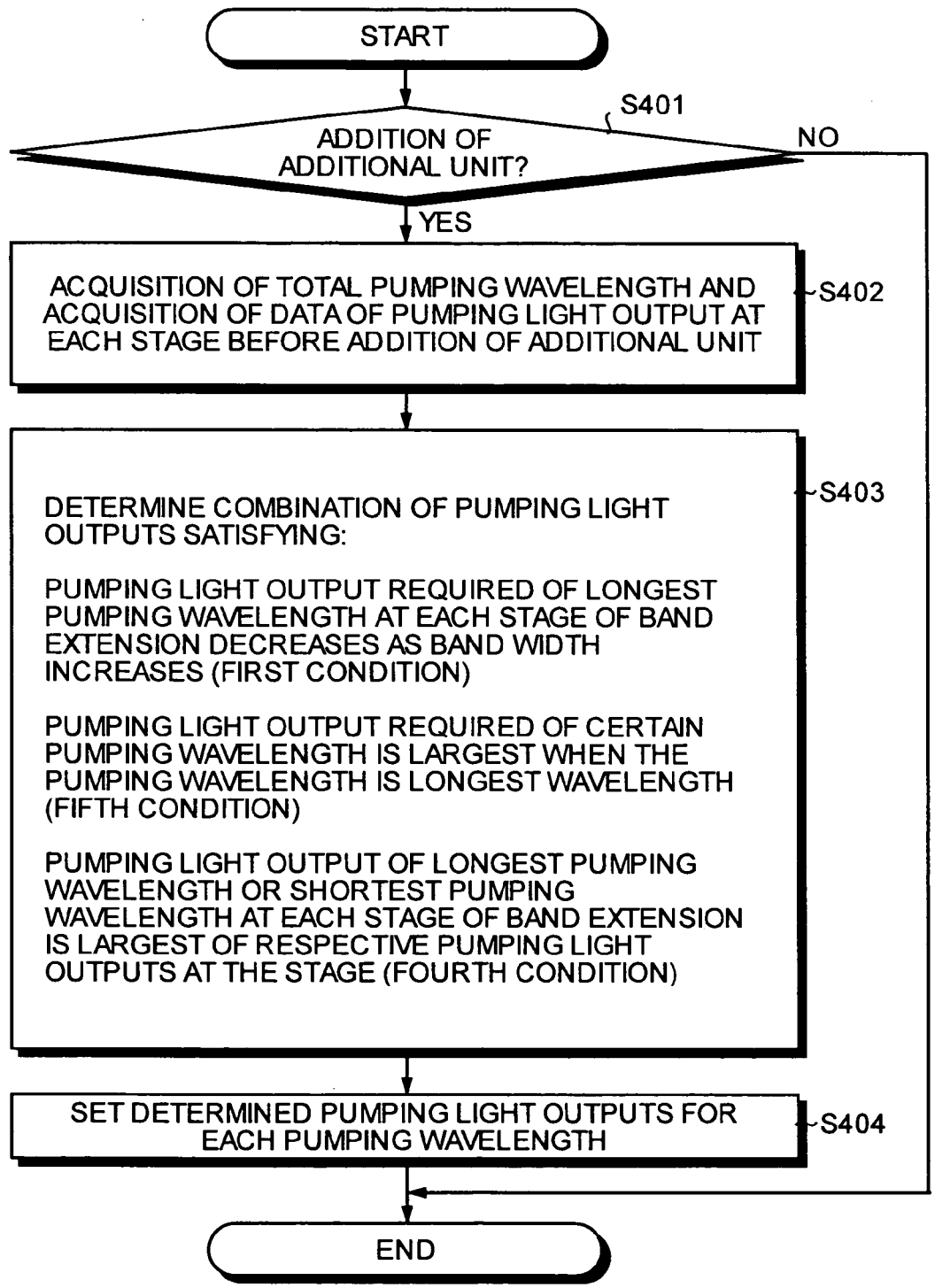
FIG. 48 is a flowchart of a setting control processing procedure by a setting control unit according to an eleventh embodiment of the present invention.

However, the setting control unit 4 performs setting control processing according to a flowchart shown in FIG. 48. Steps S401, S402, and S404 are the same as steps S201, S202, and S204 shown in FIG. 16. Step S403 corresponds to step S203. At step S403, the setting control unit 4 determines combinations of pumping light outputs of respective pumping light sources. However, the setting control unit 4 determines the combinations using a fifth condition to be described below instead of the second condition used at step S203.

The fifth condition is that a pumping light output of a certain pumping wavelength is the largest when the pumping wavelength is a longest wavelength. It can be said that this corresponds to the fact that the direction of extension of an amplification band is the long wavelength direction.

Figure 49:
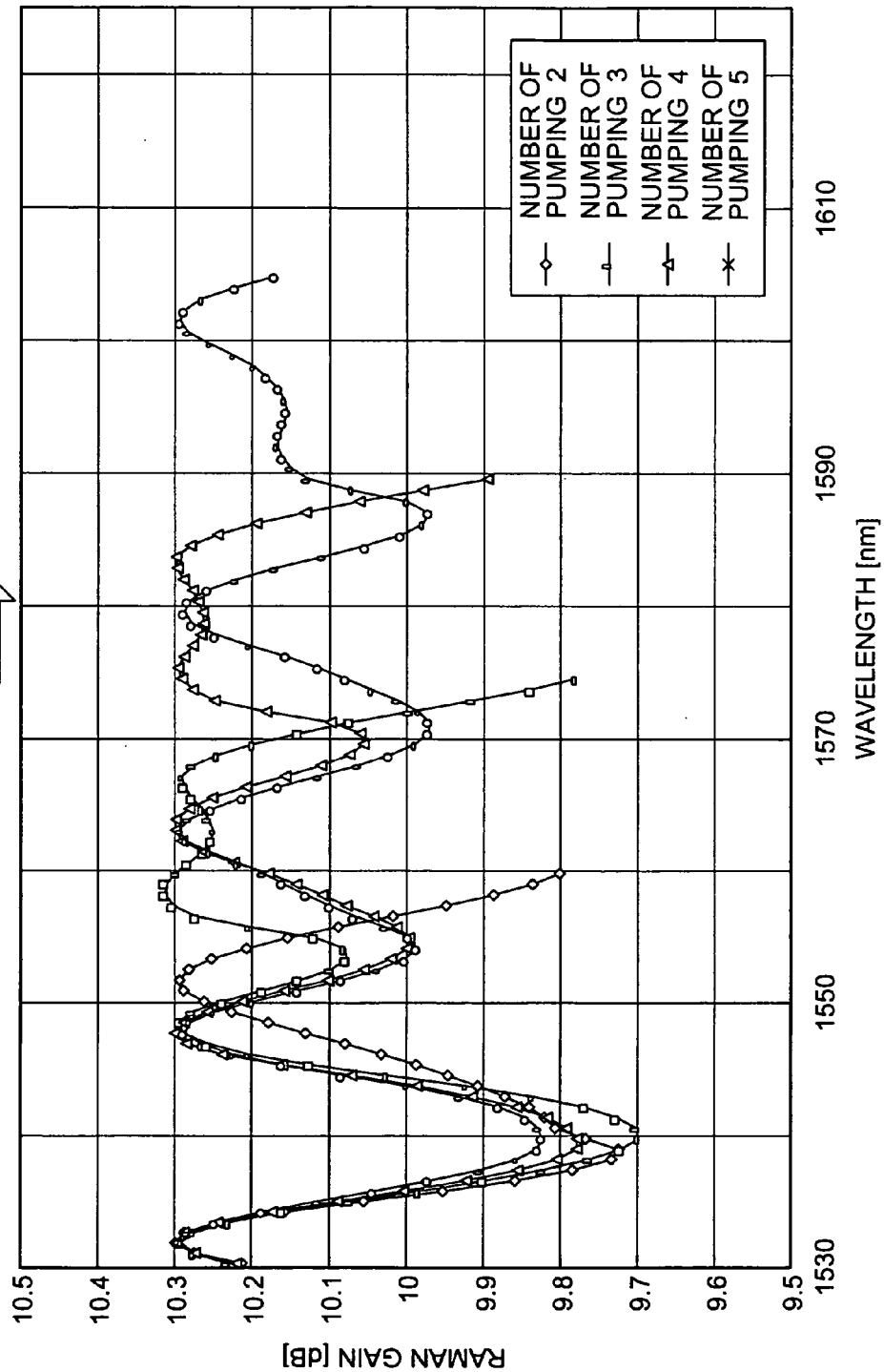
FIG. 49 is a graph for explaining wavelength dependency of a Raman gain at the time when a pumping light frequency interval is 2 terahertz, a fiber for amplification is a True-Wave-RS, a Raman gain is about 10 dB or less, and an amplification band is sequentially extended in a long wavelength direction.
Figure 50:
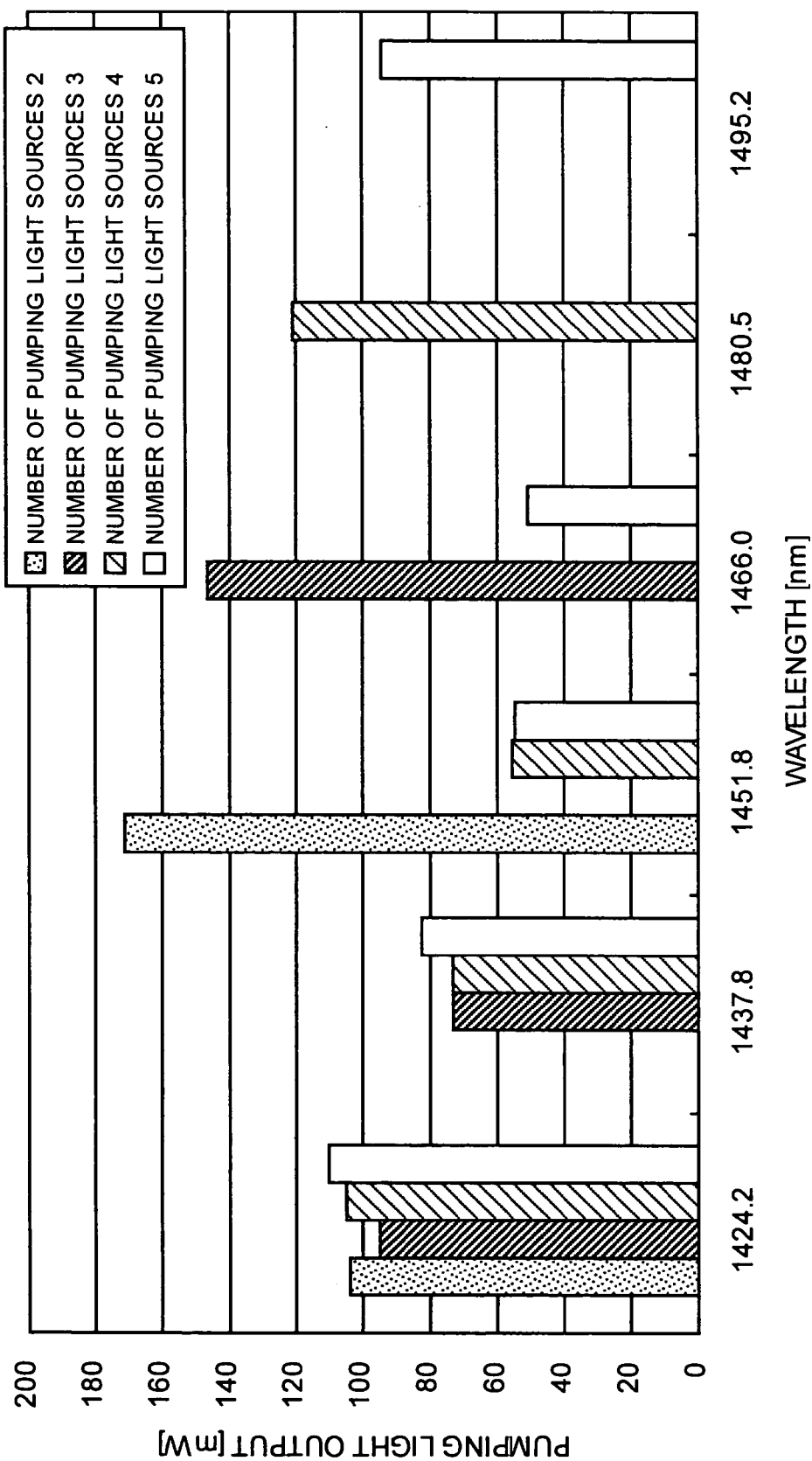
FIG. 50 is a graph for explaining pumping light outputs of respective pumping light sources, which are used for the extension of the amplification band shown in FIG. 49, by wavelength.
Figure 51:
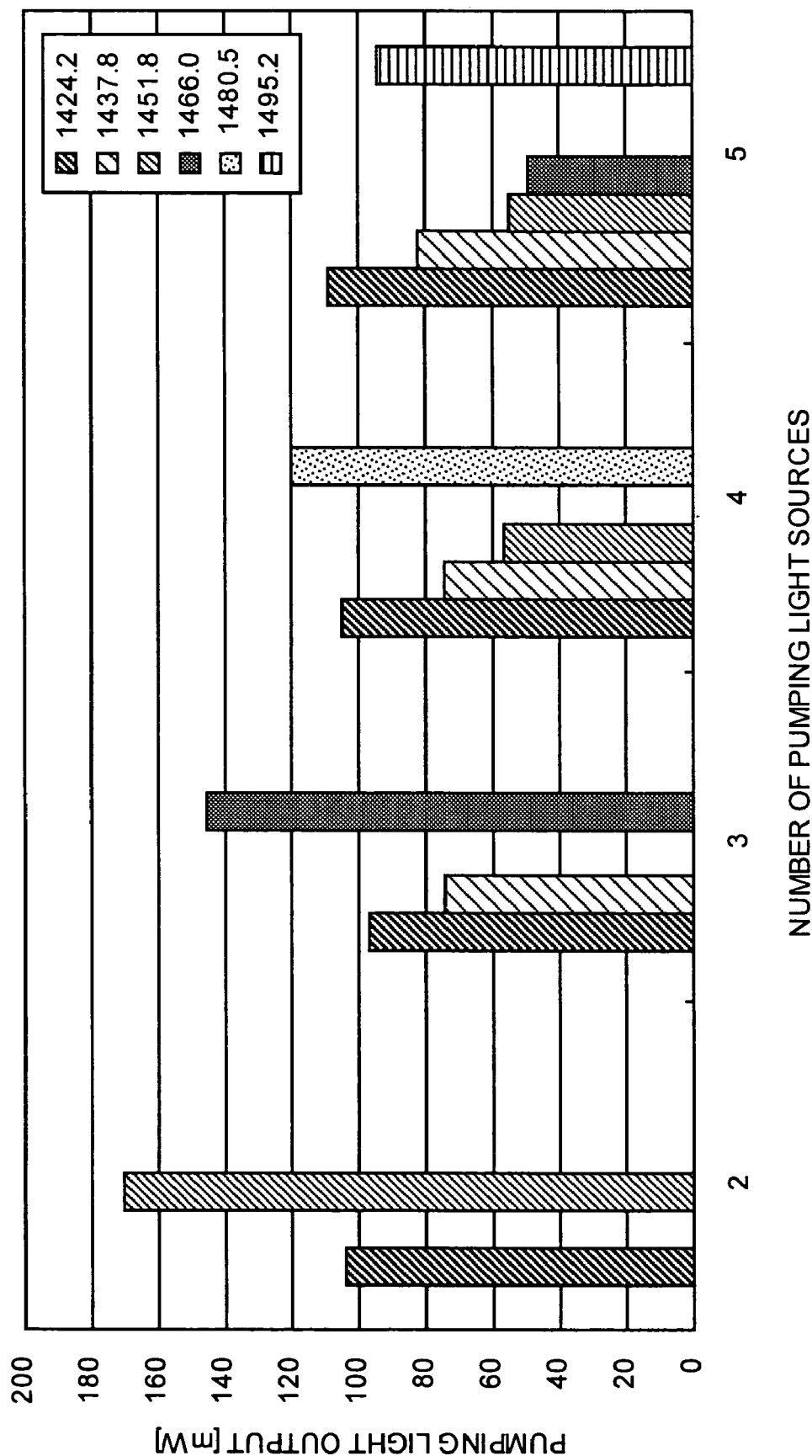
FIG. 51 is a graph for explaining pumping light outputs of the respective pumping light sources, which are used for the extension of the amplification band shown in FIG. 49, for each number of pumping light sources.

FIG. 49 is a graph for explaining wavelength dependency of a Raman gain at the time when a pumping light frequency interval is 2 terahertz, a fiber for amplification is a True-Wave-RS, a Raman gain is about 10 dB or less, and an amplification band is sequentially extended in a long wavelength direction. FIG. 50 is a graph for explaining pumping light outputs of respective pumping light sources, which are used for the extension of the amplification band shown in FIG. 49, by wavelength. FIG. 51 is a graph for explaining pumping light outputs of the respective pumping light sources, which are used for the extension of the amplification band shown in FIG. 49, for each number of pumping light sources.

The first condition is that a pumping light output required of a longest pumping wavelength at each stage of band extension decreases as a band width increases. In FIG. 50, for example, a band width increases compared with a pumping light output required of a longest pumping wavelength 1451.8 nanometers among light sources, which are used when the number of pumping light sources is two, and a pumping light output required of a longest pumping wavelength 1466.0 nanometers among pumping light sources, which are used when the number of pumping light sources is three, is reduced. In FIG. 50, this condition is satisfied.

The fifth condition is that a pumping light output required of a certain pumping wavelength is the largest when the pumping wavelength is a longest wavelength. In FIG. 50, for example, paying attention to a pumping wavelength 1466.0 nanometers, among the respective numbers of pumping light sources, the pumping wavelength 1466.0 nanometers is a longest wavelength when the number of pumping light sources is three. Therefore, the fifth condition is set such that a pumping light output, which is required at the time when the number of pumping light sources is three and the pumping wavelength is 1466.0 nanometers, is the largest at the pumping wavelength 1466.0 nanometers.

The fourth condition is that a pumping light output of a longest pumping wavelength or a shortest pumping wavelength at each stage of band extension is the largest among respective pumping light outputs at the stage. In FIG. 50, for example, when the number of pumping light sources is five, the fourth condition is set such that a pumping light output at a pumping wavelength 1495.2 nanometers, which is a longest wavelength among wavelengths of five pumping lights, or a pumping wavelength 1424.2 nanometers, which is a shortest wavelength among wavelengths of five pumping lights, is the largest among pumping light outputs of the five pumping lights. In FIGS. 49 to 51, a pumping light output at the shortest pumping wavelength 1424.2 nanometers is set to be the largest. Similarly, when the number of pumping light sources is four, the fourth condition is set such that a pumping light output at a pumping wavelength 1480.5 nanometers, which is a longest wavelength among wavelengths of four pumping lights, or a pumping wavelength 1424.2 nanometers, which is a shortest wavelength among wavelengths of four pumping lights, is the largest among pumping light outputs of the four pumping lights. In FIGS. 49 to 51, a pumping light output at the longest pumping wavelength 1480.5 nanometers is set to be the largest.

According to the eleventh embodiment, among the first, the third, and the fifth conditions indicated according to the fifth embodiment, the third condition is changed to the moderate fourth condition serving as a determination condition. By satisfying these conditions, it is possible to maintain a flat amplification band with a Raman amplitude of about 10 decibels or less shown in FIG. 49 at each stage of extension of an amplification band in a long wavelength direction.

According to a twelfth embodiment of the present invention, in Raman amplification, a pumping light frequency interval is 2 terahertz, a fiber for amplification is a True-Wave-RS, a net gain is about −7 decibels or less, and an amplification band is sequentially extended in a short wave length direction.

Figure 52:
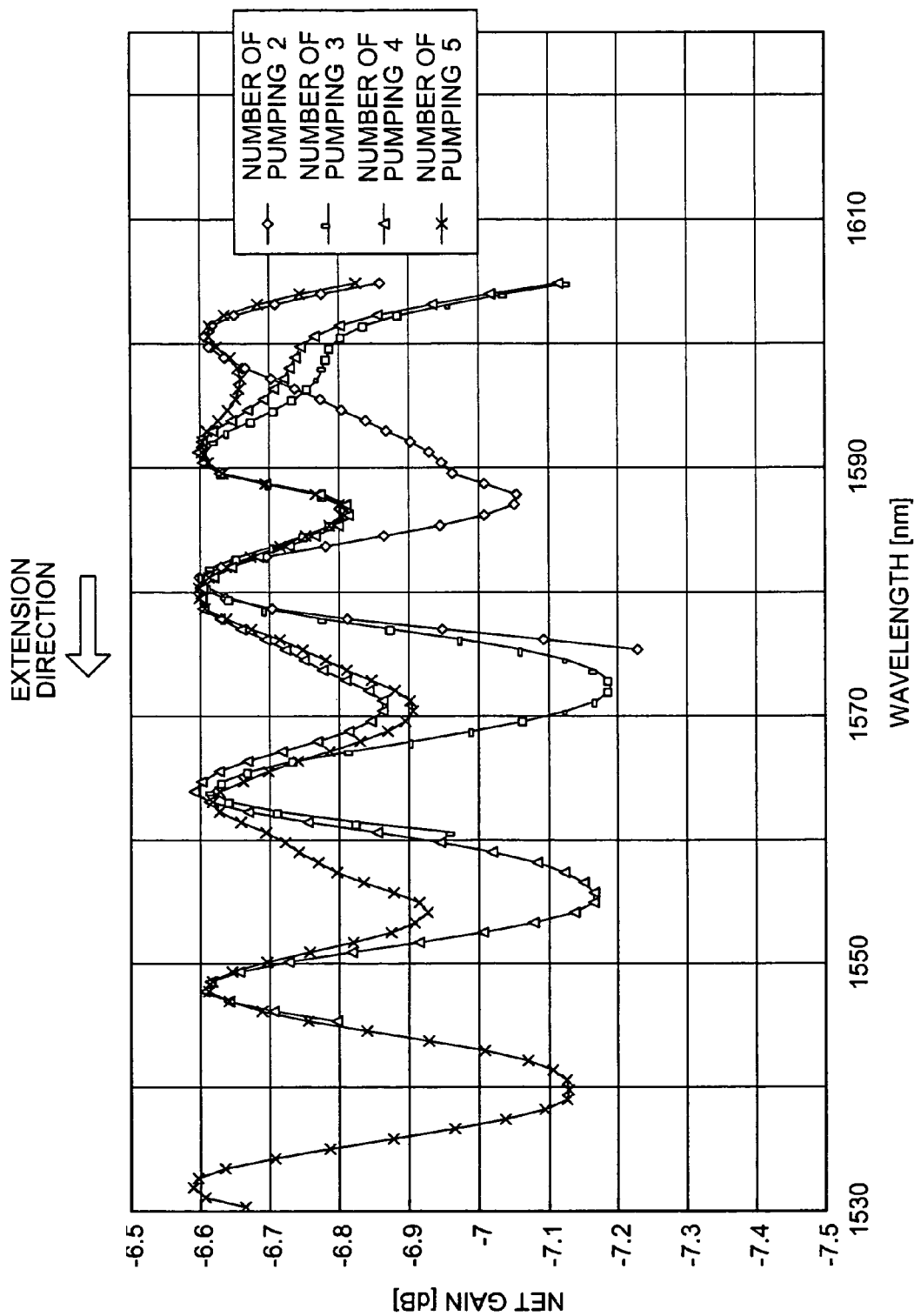
FIG. 52 is a graph for explaining wavelength dependency of a net gain at the time when a pumping light frequency interval is 2 terahertz, a fiber for amplification is a True-Wave-RS, a net gain is about −7 decibels or less, and an amplification band is sequentially extended in a short wavelength direction.
Figure 53:
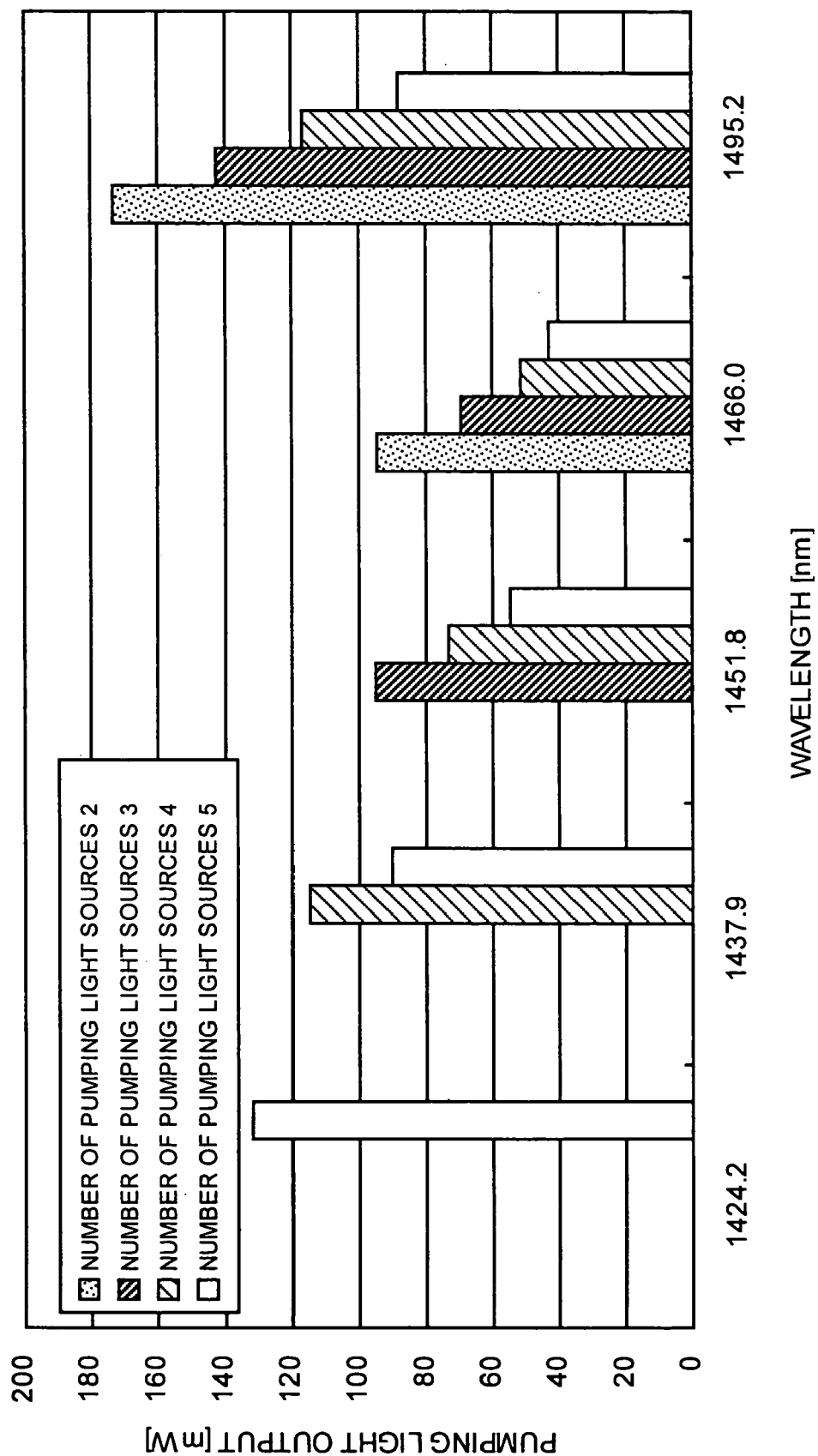
FIG. 53 is a graph for explaining pumping light outputs of respective pumping light sources, which are used for the extension of the amplification band shown in FIG. 52, by wavelength.
Figure 54:
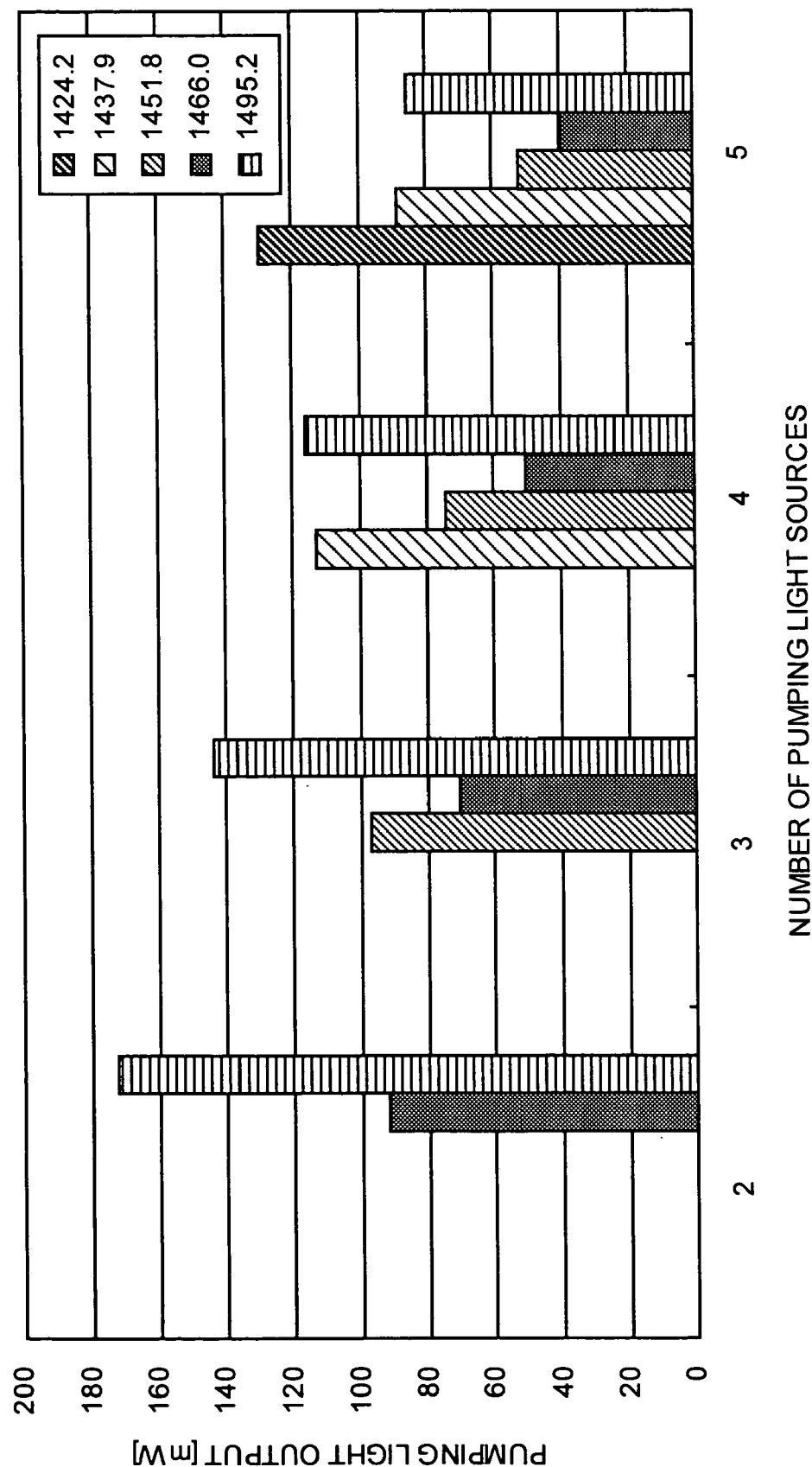
FIG. 54 is a graph for explaining pumping light outputs of the respective pumping light sources, which are used for the extension of the amplification band shown in FIG. 52, for each number of pumping light sources.

FIG. 52 is a graph for explaining wavelength dependency of a net gain at the time when a pumping light frequency interval is 2 terahertz, a fiber for amplification is a True-Wave-RS, a net gain is about −7 decibels or less, and an amplification band is sequentially extended in a short wavelength direction. FIG. 53 is a graph for explaining pumping light outputs of respective pumping light sources, which are used for the extension of the amplification band shown in FIG. 52, by wavelength. FIG. 54 is a graph for explaining pumping light outputs of the respective pumping light sources, which are used for the extension of the amplification band shown in FIG. 52, for each number of pumping light sources.

The first condition is that a pumping light output required of a longest pumping wavelength 1495.2 nanometers at each stage of band extension decreases as a band width increases. As shown in FIG. 53, this condition is satisfied.

The second condition is that a pumping light output required of a certain pumping wavelength is the largest when the pumping wavelength is a shortest wavelength. In FIG. 53, for example, paying attention to a pumping wavelength 1466.0 nanometers, among the respective numbers of pumping light sources, the pumping wavelength 1466.0 nanometers is a shortest wavelength when the number of pumping light sources is two. Therefore, the second condition is set such that a pumping light output, which is required at the time when the number of pumping light sources is two and the pumping wavelength is 1466.0 nanometers, is the largest at the pumping wavelength 1466.0 nanometers.

The fourth condition is that a pumping light output of a longest pumping wavelength or a shortest pumping wavelength at each stage of band extension is the largest among respective pumping light outputs at the stage. In FIG. 54, for example, when the number of pumping light sources is five, the fourth condition is set such that a pumping light output at a pumping wavelength 1495.2 nanometers, which is a longest wavelength among wavelengths of five pumping lights, or a pumping wavelength 1424.2 nanometers, which is a shortest wavelength among wavelengths of five pumping lights, is the largest among pumping light outputs of the five pumping lights. In FIGS. 52 to 54, a pumping light output at the shortest pumping wavelength 1424.2 nanometers is set to be the largest. Similarly, when the number of pumping light sources is three, the fourth condition is set such that a pumping light output at a pumping wavelength 1495.2 nanometers, which is a longest wavelength among wavelengths of three pumping lights, or a pumping wavelength 1451.8 nanometers, which is a shortest wavelength among wavelengths of three pumping lights, is the largest among pumping light outputs of the three pumping lights. In FIGS. 52 to 54, a pumping light output at the longest pumping wavelength 1495.2 nanometers is set to be the largest.

In the twelfth embodiment, among the first, the second, and the fourth conditions indicated according to the seventh embodiment are set as determination conditions. By satisfying these conditions, it is possible to maintain a flat amplification band with a net gain of about −7 decibels or less shown in FIG. 52 at each stage of extension of an amplification band in a short wavelength direction.

Note that, in FIG. 55, a correspondence relation of the first to the fifth conditions applied to the first to the twelfth embodiments are arranged.

According to a thirteenth embodiment of the present invention, the results indicated in the seventh to the eleventh embodiments are summarized and a new condition at the time of band extension is found from a relation between the number of pumping wavelengths and a total pumping light output at each stage of the band extension.

Figure 56:
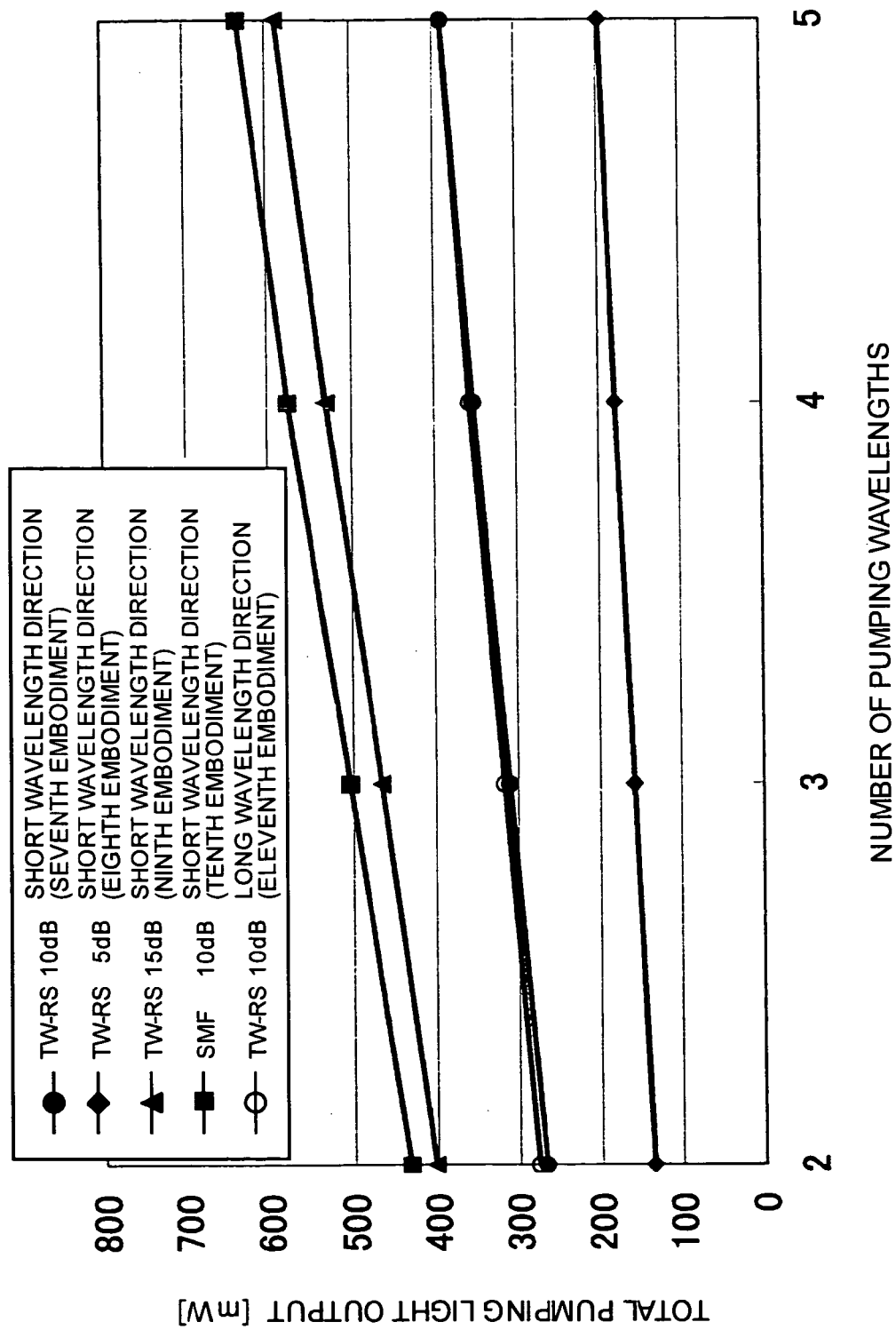
FIG. 56 is a graph for explaining a relation of a total pumping light output to the number of pumping wavelengths according to the seventh to the eleventh embodiments.

FIG. 56 is a graph for explaining a relation of a total pumping light output to the number of pumping wavelengths at each stage of band extension for each of the seventh to the eleventh embodiments. As shown in FIG. 56, a total pumping light output at each stage corresponding to each of the first to the fifth embodiments linearly increases according to an increase in the number of pumping wavelengths and has a proportional relation to the number of pumping wavelengths. Here, since the number of pumping wavelengths is proportional to the amplification band, the total pumping light output is proportional to the amplification band. In other words, this proportional relation sets a limitation that the total pumping light output at each stage of the band extension has to be proportional to the number of pumping wavelengths.

Figure 57:
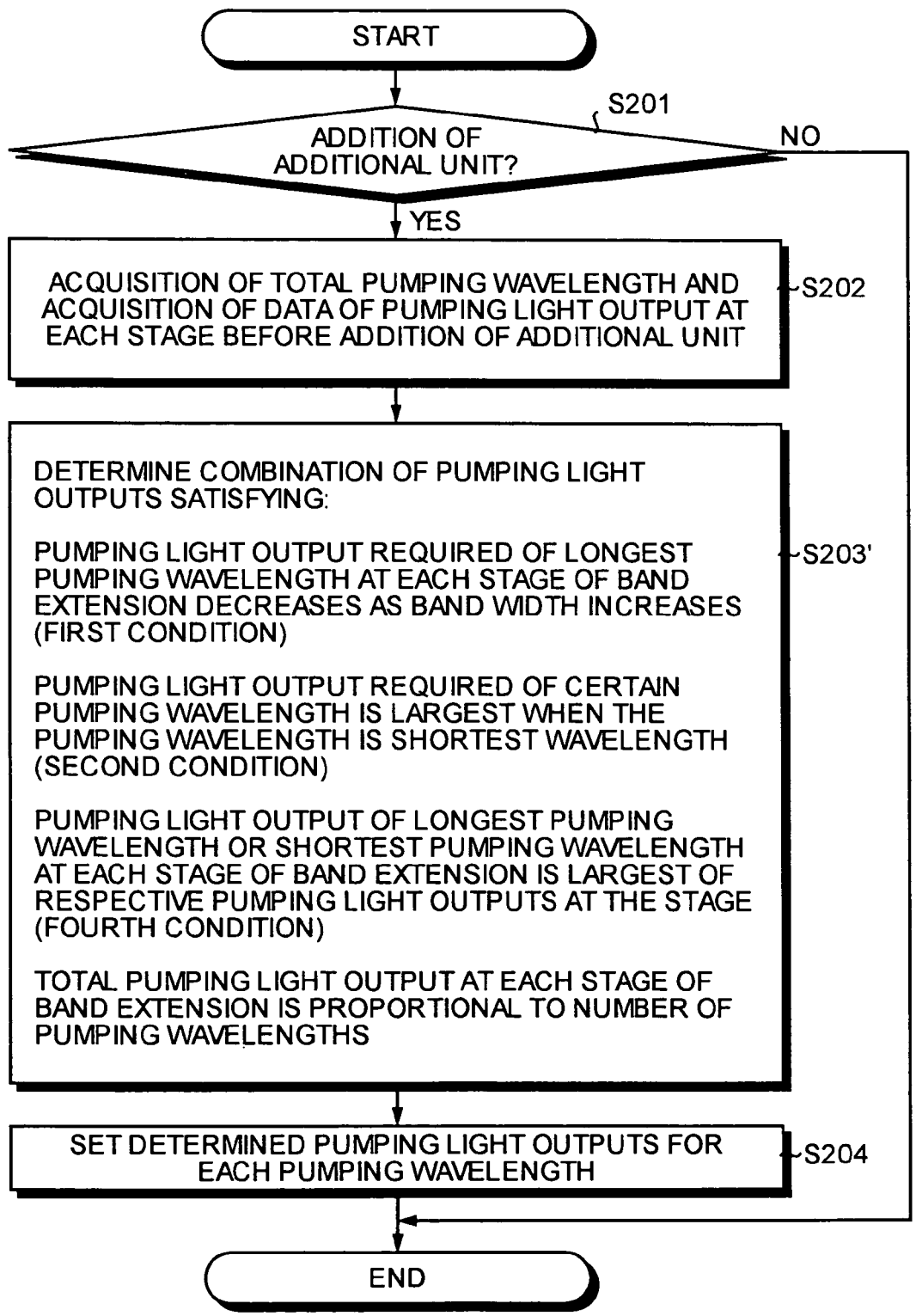
FIG. 57 is a flowchart of a setting control processing procedure by a setting control unit according to a thirteenth embodiment of the present invention.

Therefore, as shown in FIG. 57, for example, when processing for determining a pumping light output for each pumping wavelength corresponding to the first embodiment is performed, as indicated at step S203', it is possible to add a condition that a total pumping light output at each stage of band extension is proportional to the number of pumping wavelengths to the first, the second, and the fourth conditions as a new condition to determine a pumping light output for each pumping wavelength. In this case, since the new condition is added, it is possible to narrow down a value of a pumping light output for each pumping wavelength and perform prompt and accurate determination processing. Note that, at step S203', it is possible to exclude the first, the second, and the fourth conditions and determine a pumping light output for each pumping wavelength according to only this new condition. Moreover, this new condition may be combined with an arbitrary condition for defining a pumping light output, which is not inconsistent with but completely different from the new condition itself, other than the conditions of the present invention.

It is possible to represent a total pumping light output from this proportional relation using the expression (1). Here, FIG. 58 is a table of values of constants C1 and C2 at the time when a relation of a total pumping light output to the number of pumping wavelengths in the seventh to the eleventh embodiments is represented by the expression (1). As shown in FIG. 58, the seventh to the ninth embodiments have substantially the same values of the constants C1 and C2, which can be used as common constants C1 and C2. Note that the constants C1 and C2 according to the eleventh embodiment have values approximate to the constants C1 and C2 in the seventh to the ninth embodiments. Note that the constants C1 and C2 according to the tenth embodiment have slightly different values compared with the constants C1 and C2 in the seventh to the ninth and the eleventh embodiments. However, in the case of the tenth embodiment, the constants C1 and C2 according to the tenth embodiment only have to be used.

In FIG. 58, when a type of a fiber is the same as in the seventh to the ninth and the eleventh embodiments, it is possible to use substantially the same values for the constants C1 and C2 in the seventh to the ninth and the eleventh embodiments. In addition, it is possible to apply the expression (1) regardless of a direction of band extension (a long wavelength direction or a short wavelength direction).

Figure 59:
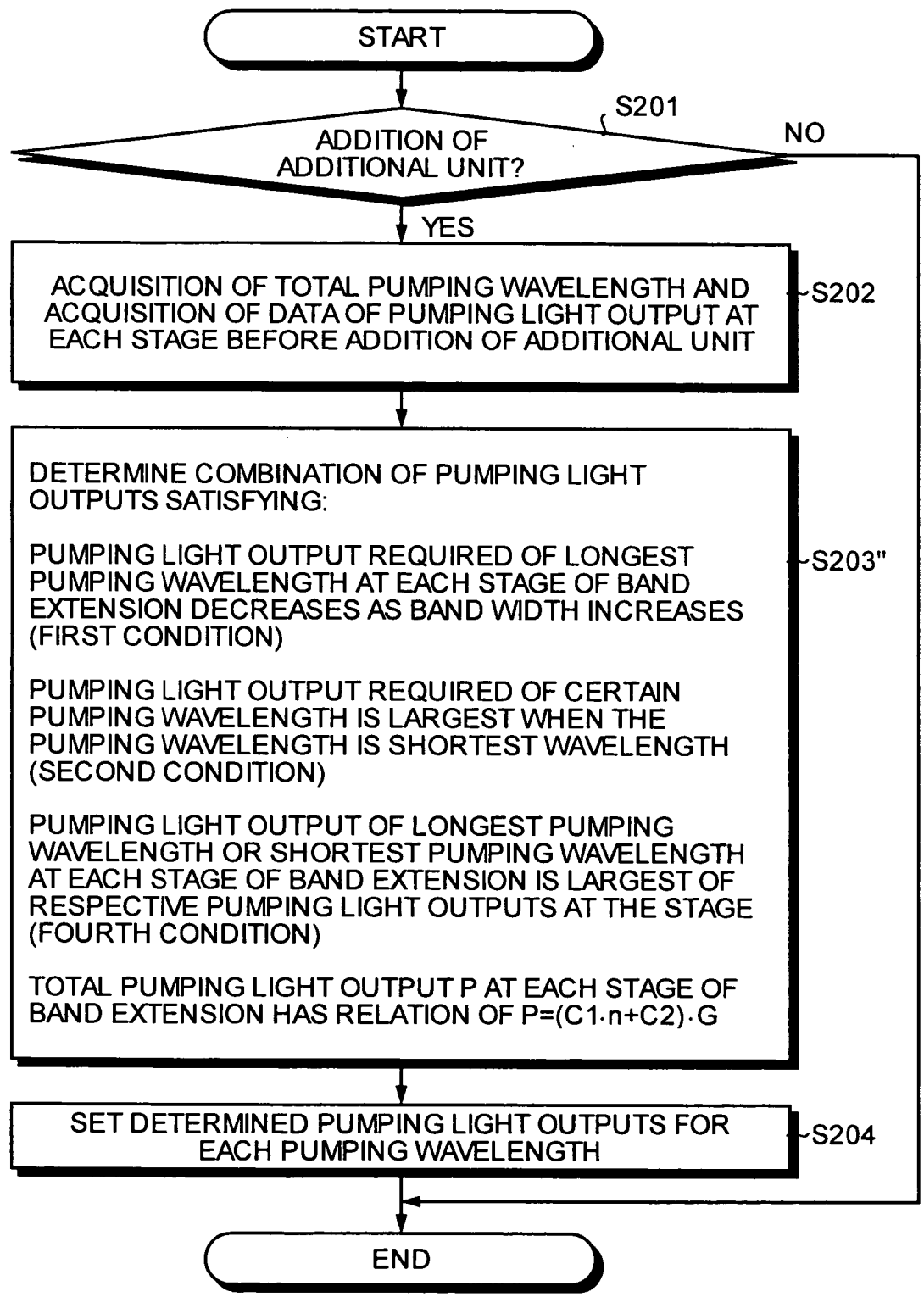
FIG. 59 is a flowchart of a setting control processing procedure by a setting control unit according to a modification of the thirteenth embodiment.

Therefore, as shown in FIG. 59, for example, when processing for determining a pumping light output for each pumping wavelength corresponding to the seventh embodiment is performed, as indicated at step S203", it is possible to add a condition that the relation of the expression (1) is established to the first, the second, and the fourth conditions as a new condition to determine a pumping light output for each pumping wavelength. In this case, since the new condition is added, it is possible to narrow down a value of a pumping light output for each pumping wavelength and perform prompt and accurate determination processing. Note that, at step S203", it is possible to exclude the first, the second, and the fourth conditions and determine a pumping light output for each pumping wavelength according to only this new condition.

Note that, according to the thirteenth embodiment, when the constants C1 and C2 of the expression (1) are set, it is possible to estimate a total pumping light output easily even if the Raman gain G changes.

Here, an extension direction of a band will be considered. First, pumping light outputs required for respective pumping lights according to the first embodiment and the fifth embodiment are compared. In both the first embodiment and the fifth embodiment, a pumping light frequency interval is 1 terahertz, a fiber for amplification is a TrueWave-RS ®, and a Raman gain is about 10 decibels or less. However, whereas an amplification band is sequentially extended in a short wavelength direction according to the first embodiment, an amplification band is sequentially extended in a long wavelength direction.

Figure 60:
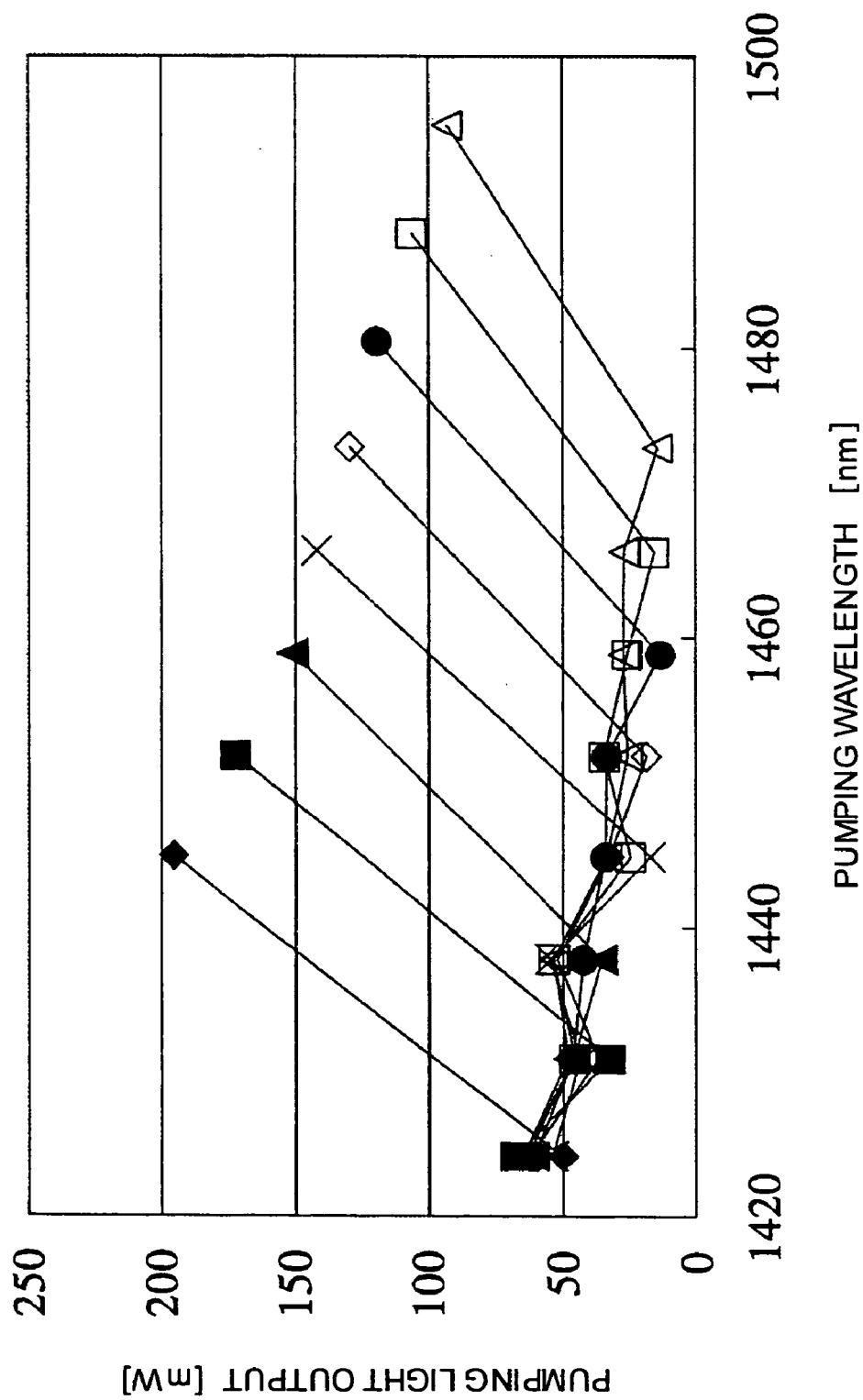
FIG. 60 is a graph for explaining a relation of a pumping light output to pumping wavelengths of respective pumping light sources at the time when the fifth embodiment is applied to the Raman amplifier shown in FIG. 1.

FIG. 12 is a line graph of a relation of a pumping light output to pumping wavelengths of respective pumping light sources according to the first embodiment in which an amplification band is extended in a short wavelength direction as described above. On the other hand, FIG. 60 is a line graph of a relation of a pumping light output to pumping wavelengths of respective pumping light sources according to the fifth embodiment in which an amplification band is extended in a long wavelength direction. FIG. 61 is a table of comparative data of pumping light outputs required for respective pumping wavelengths in the first and the fifth embodiments. It is seen from FIGS. 12, 60, and 61 that, when the amplification band is extended in the short wavelength direction, a pumping light output required for pumping wavelengths other than 1495.2 nanometers, which is a longest wavelength, is equal to or less than 80 milliwatts at a fiber input and is extremely small compared with the time when the amplification band is extended in the long wavelength direction. In addition, when totals of pumping light outputs required for respective pumping wavelengths are compared, whereas a total at the time when the amplification band is extended in the short wavelength direction is 662.7 milliwatts, a total at the time when the amplification band is extended in the long wavelength direction is 1277.2 milliwatts. Moreover, when the amplification band is extended in the long wavelength direction, pumping wavelength of 1480.5 nanometers and 1487.8 nanometers are further required. As a result, it can be said that it is more efficient and economical to extend the amplification band in the short wavelength direction than in the long wavelength direction.

Next, pumping light outputs required for respective pumping lights according to the seventh embodiment and the eleventh embodiment are compared. In both the seventh embodiment and the eleventh embodiment, a pumping light frequency interval is 2 terahertz, a fiber for amplification is a TrueWave-RS®, and a Raman gain is about 10 decibels or less. However, whereas an amplification band is sequentially extended in a short wavelength direction according to the seventh embodiment, an amplification band is sequentially extended in a long wavelength direction according to the eleventh embodiment.

Figure 62:
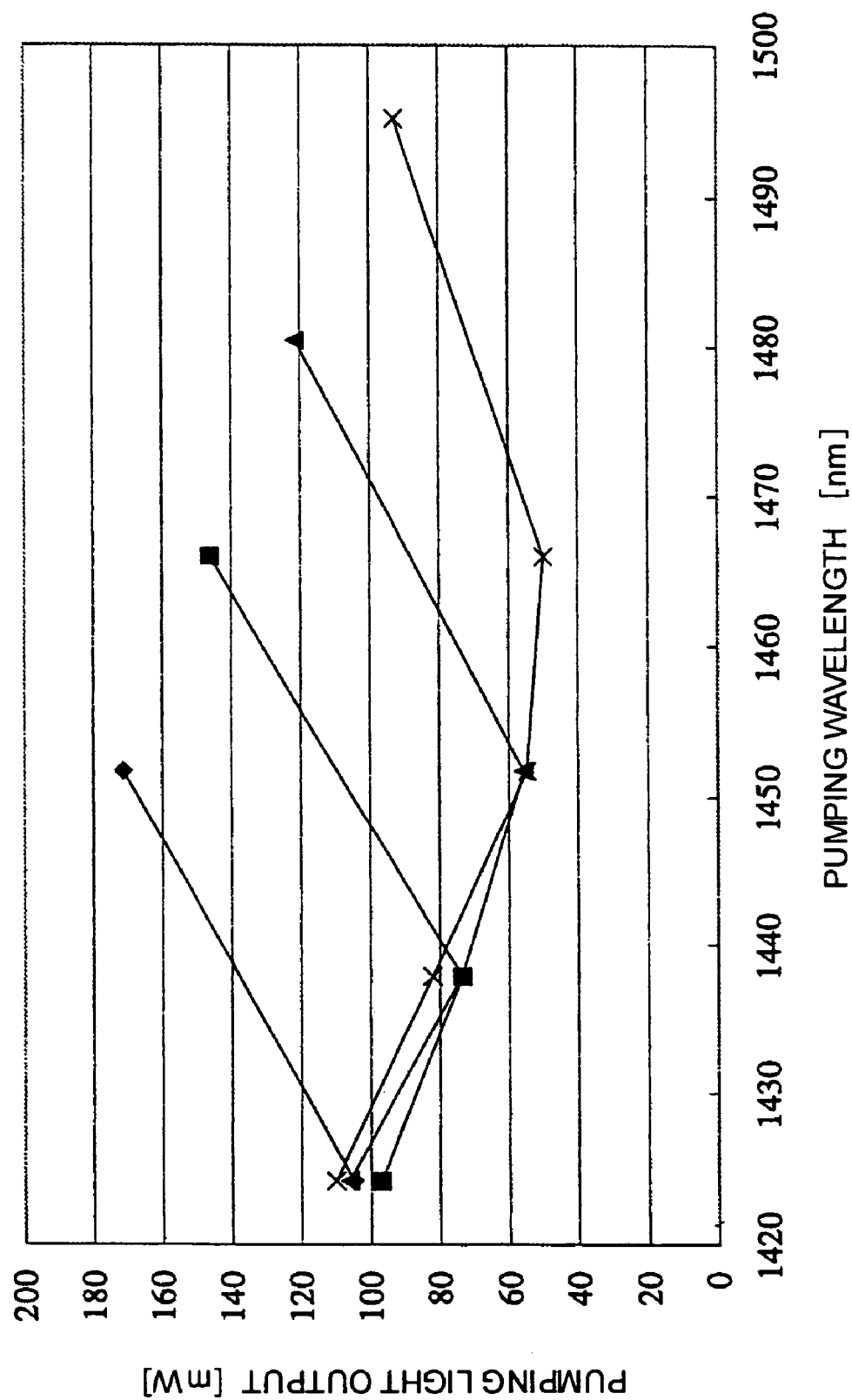
FIG. 62 is a graph for explaining a relation of a pumping light output to pumping wavelengths of respective pumping light sources at the time when the eleventh embodiment is applied to the Raman amplifier shown in FIG. 1.

FIG. 38 is a line graph of a relation of a pumping light output to pumping wavelengths of respective pumping light sources according to the seventh embodiment in which an amplification band is extended in a short wavelength direction as described above. On the other hand, FIG. 62 is a line graph of a relation of a pumping light output to pumping wavelengths of respective pumping light sources according to the eleventh embodiment in which an amplification band is extended in a long wavelength direction. FIG. 63 is a table of comparative data of pumping light outputs required for respective pumping wavelengths in the seventh and eleventh embodiments. It is seen from FIGS. 38, 62, and 63 that, when totals of pumping light outputs required for respective pumping wavelengths are compared, whereas a total at the time when the amplification band is extended in the short wavelength direction is 574.4 milliwatts, a total at the time when the amplification band is extended in the long wavelength direction is 723.5 milliwatts. Moreover, when the amplification band is extended in the long wavelength direction, pumping wavelength of 1480.5 nanometers is further required. As a result, it can be said that it is more efficient and economical to extend the amplification band in the short wavelength direction than in the long wavelength direction.

According to the first to the eleventh and the thirteenth embodiments, flattening for a Raman gain is explained. According to a fourteenth embodiment of the present invention, taking into account wavelength dependency of a loss of the fiber for amplification 13 or the like, pumping light outputs of respective pumping light sources are reset such that a final net gain of an optical output is flat.

Here, a relation among a net gain, a Raman gain, and a fiber loss is represented by the following expression.

Net gain (dB)=Raman gain (dB)+fiber loss (dB)

Figure 64:
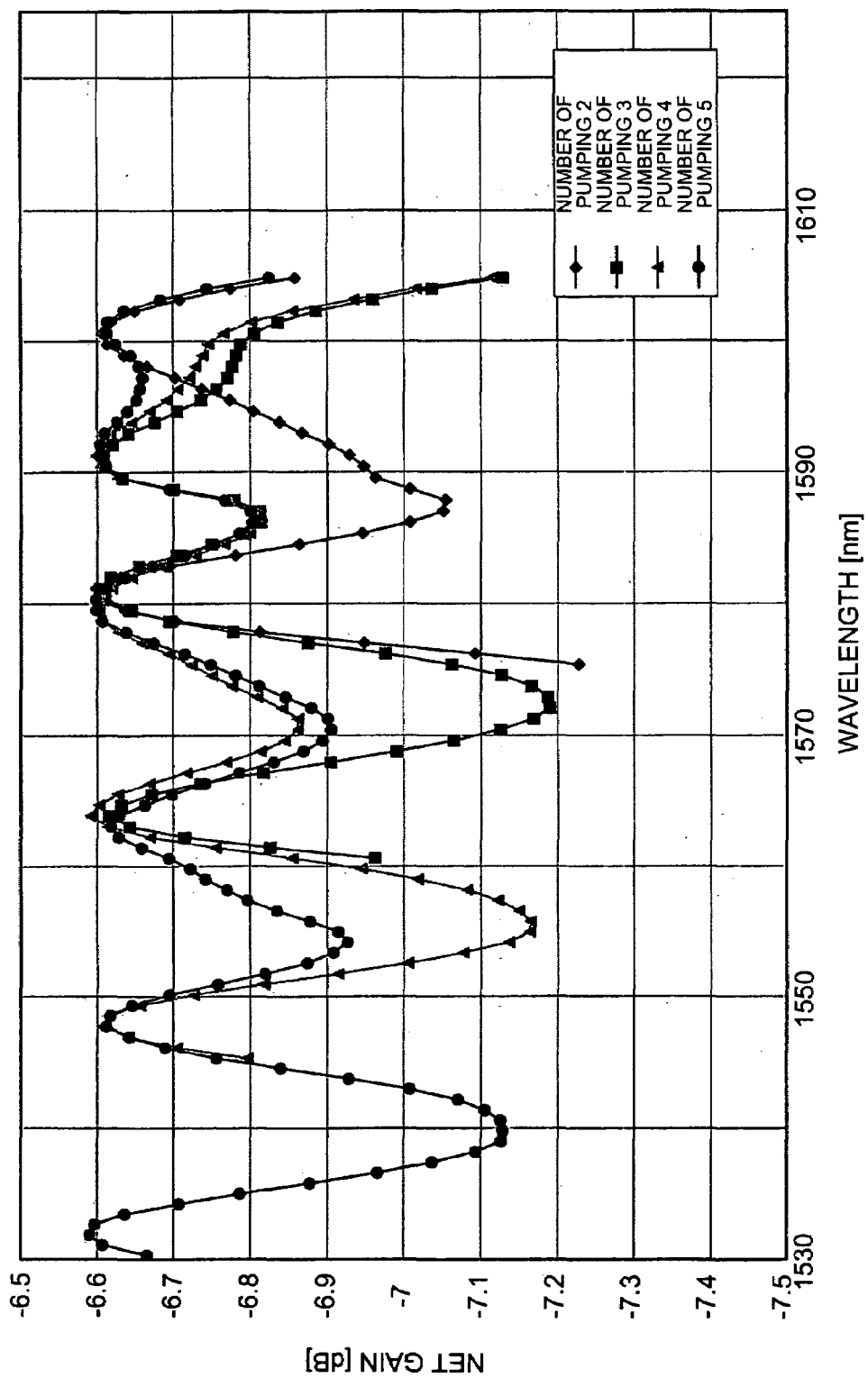
FIG. 64 is a graph for explaining wavelength dependency of a net gain according to a fourteenth embodiment corresponding to FIG. 52.

FIG. 64 is a graph for explaining wavelength dependency of a net gain taking into account wavelength dependency of a loss of the optical fiber for amplification 13 under the same conditions as the twelfth embodiment. In FIG. 64, an amplification band is extended stepwise to a short wavelength side, and a net gain assumes the same wavelength dependency as that shown in FIG. 52.

Figure 65:
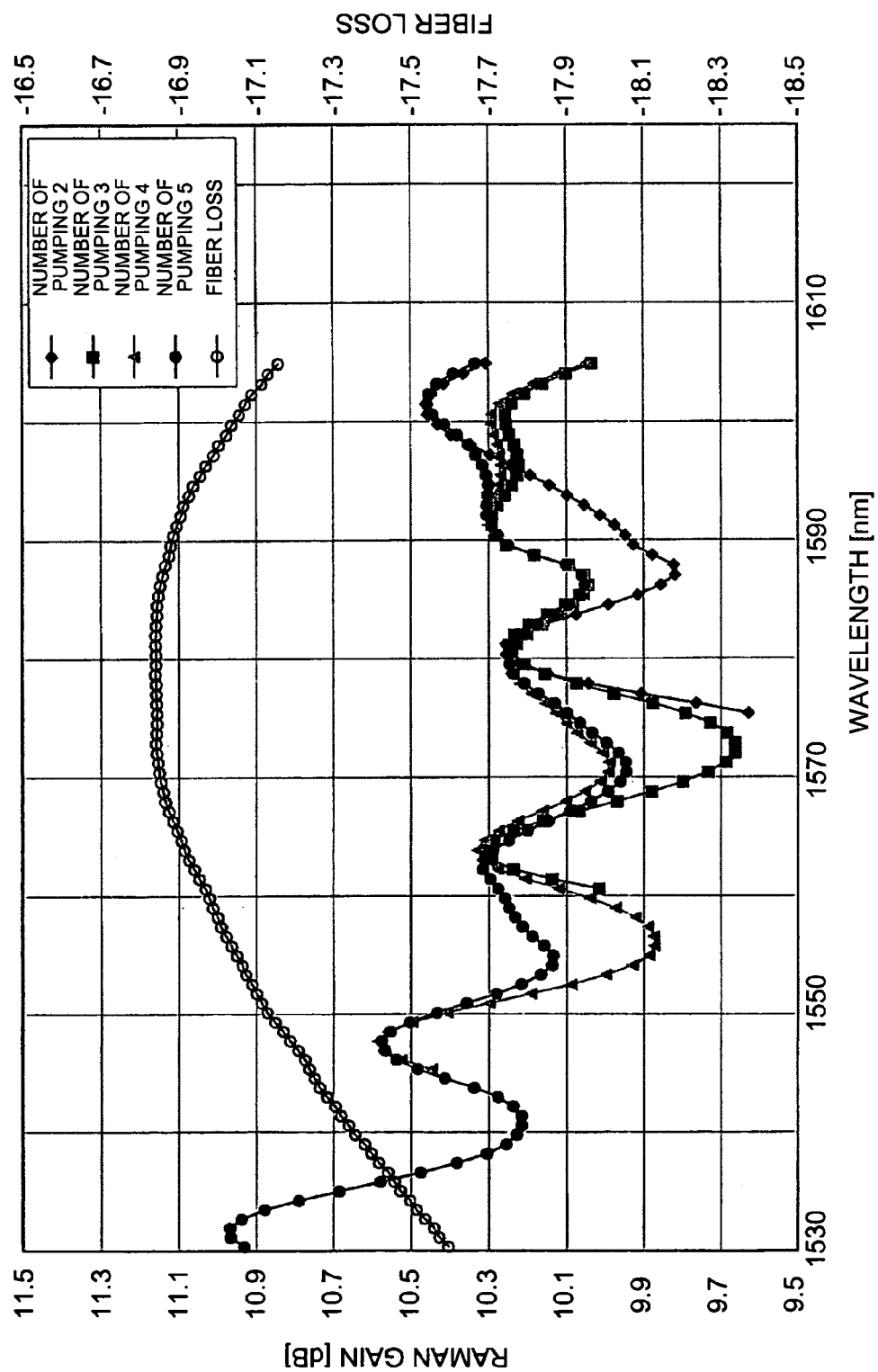
FIG. 65 is a graph for explaining the wavelength dependency of a net gain shown in FIG. 64 divided into wavelength dependency of a Raman gain and wavelength dependency of a fiber loss.

FIG. 65 is a graph for explaining the wavelength dependency of a net gain shown in FIG. 64 divided into wavelength dependency of a loss of the optical fiber for amplification 13 and wavelength dependency of a Raman gain extended stepwise in a short wavelength direction. In FIG. 65, the wavelength dependency of a loss of the optical fiber for amplification 13 is not flat and shows a characteristic curve projected in the center of an amplification band. Therefore, the wavelength dependency of a Raman gain is generally reset to a characteristic curve recessed in the center. Consequently, this wavelength dependency of a Raman gain offsets the wavelength dependency of a loss, which is not flat, to realize flattening of a final net gain.

Figure 66:
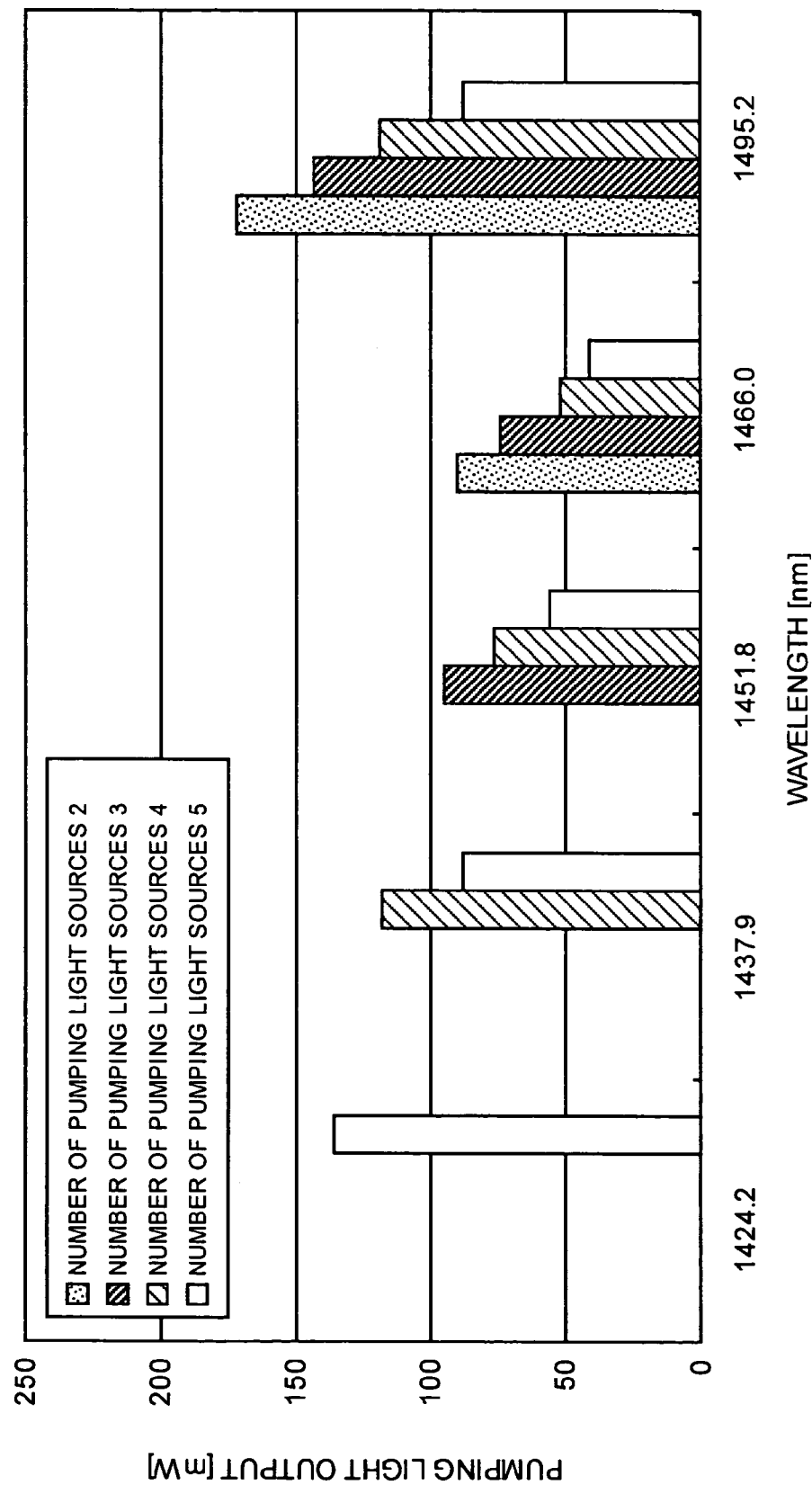
FIG. 66 is a graph for explaining pumping light outputs of respective pumping light sources, which are used for the extension of the amplification band shown in FIG. 64, by wavelength.
Figure 67:
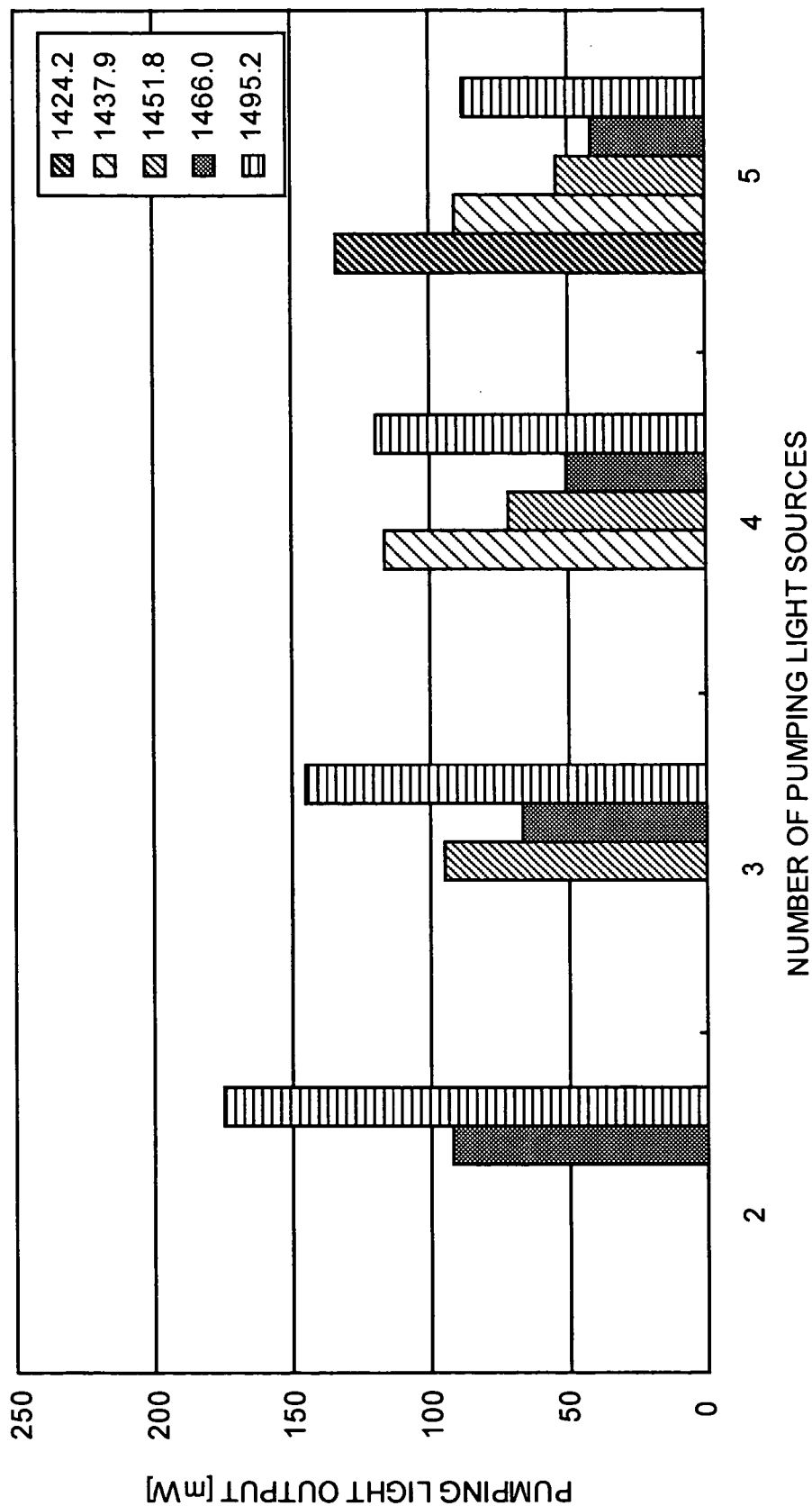
FIG. 67 is a graph for explaining pumping light outputs of the respective pumping light sources, which are used for the extension of the amplification band shown in FIG. 64, for each number of pumping light sources.

Here, a formation of the wavelength dependency of a Raman gain in an amplification band to be sequentially extended, which is shown in FIG. 65, is realized by resetting the wavelength dependency such that the first condition, the second condition, and the fourth condition are satisfied as in the twelfth embodiment. Actually, FIGS. 66 and 67, which correspond to FIGS. 53 and 54, respectively, indicate that the first condition, the second condition, and the fourth condition are satisfied.

It is also possible to flatten a final net gain by applying the processing described in the first to the thirteenth embodiments to the wavelength dependency itself of a Raman gain, which is not flat, for example, the wavelength dependency of a Raman gain that is recessed near the center of an entire amplification band or the wavelength dependency of a Raman gain that is inclined over an entire amplification band to offset an inclination of the wavelength dependency of a loss.

Note that, although the fourteenth embodiment is explained on the premise that a distributed amplifier is used, it is also possible to apply the present invention to a discrete amplifier. In the case of the centralized amplifier, outputs of respective pumping light sources only have to be reset to realize wavelength dependency of a Raman gain that offsets wavelength dependency of a loss of a transmission fiber.

As described above, according to the present invention, the setting control unit controls resetting for pumping light outputs of respective pumping light sources including one or more existing pumping light sources and one or more additional pumping light sources under predetermined conditions to perform setting control for a gain of an entire amplification band. Thus, for example, there is an effect that it is possible to extend an existing amplification band flexibly, for example, from 20 nanometers to 80 nanometers by an extension unit of 20 nanometers or less while maintaining a flat amplification band and, as a result, it is possible to control initial investment.

Furthermore, according to the present invention, the setting control unit resets pumping light outputs of respective pumping light sources such that a total pumping light output at each stage of extension of an amplification band is proportional to the number of pumping wavelengths or a total pumping light output P satisfies a condition P=(C1·n+C2)G. Thus, for example, there is an effect that it is possible to extend an existing amplification band stepwise while maintaining a flat amplification band and perform flexible extension of an amplification band.

Note that, when the expression P=(C1·n+C2)G is used, the constants C1 and C2 take substantially fixed values if a type of a fiber is the same. Thus, there is an effect that it is possible to estimate the total pumping light output P at each stage of extension of an amplification band easily even if the Raman gain G changes.

Moreover, according to the present invention, in an acquiring step, histories of pumping light wavelengths of a pumping light source, which covers an existing amplification band, and a pumping light source to be added and a pumping light output of the pumping light source, which covers the existing amplification band, are acquired. In a determining step, determination processing is performed to determine a pumping light output for each pumping light wavelength that satisfies a first condition for sequentially reducing a pumping light output of a longest pumping light wavelength at each stage of extension of an amplification band according to progress of stages, a second condition for, when an amplification band is extended to a short wavelength side, maximizing a pumping light output in a pumping light source that has a shortest pumping light wavelength according to a combination of pumping light sources at each stage, when the amplification band is extended to a long wavelength side, maximizing a pumping light output in a pumping light source that has a longest pumping light wavelength according to a combination of pumping light sources at each stage, and a third condition for maximizing a pumping light output of a pumping light source, which has a longest pumping wavelength, or a pumping light output of a pumping light source, which has a shortest pumping wavelength at each stage, for each stage of band extension. In a resetting step, pumping light outputs for the pumping light sources having the respective pumping light wavelengths determined in the determining step are reset. Consequently, for example, there is an effect that it is possible to extend an existing amplification band stepwise while maintaining a flat amplification band and perform flexible extension of an amplification band.

In this case, in the determining step, when pumping light outputs of the respective pumping light sources are further determined such that a total pumping light output at each stage of extension of an amplification band is proportional to the number of pumping wavelengths or the total pumping light output P satisfies the condition P=(C1·n+C2)G, there is an effect that it is possible to perform this determination processing more promptly and accurately.

Furthermore, according to the present invention, an additional unit, which has one or more additional pumping light sources, is added to a basic unit, which includes one or more existing pumping light sources and multiplexes and outputs inputted pumping lights, by connector connection. Thus, there is an effect that it is possible to realize stepwise extension of an amplification band easily with a simple structure.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pumping light source unit for Raman amplification comprising:
   at least one pumping light source that outputs a first pumping light covering a current amplification band;
   at least one additional pumping light source that outputs a second pumping light covering an amplification band to be extended; and
   a setting control unit that controls a setting for a gain of an entire amplification band by resetting outputs of the first pumping light and the second pumping light, wherein
   the pumping light source unit has a function of extending the amplification band in a stepwise manner, wherein the setting control unit controls the setting for the gain in such a manner that a total output of pumping lights at each stage of amplification band extension is proportional to number of pumping wavelengths.

2. A pumping light source unit for Raman amplification comprising:
   at least one pumping light source that outputs a first pumping light covering a current amplification band;
   at least one additional pumping light source that outputs a second pumping light covering an amplification band to be extended; and
   a setting control unit that controls a setting for a gain of an entire amplification band by resetting outputs of the first pumping light and the second pumping light, wherein
   the pumping light source unit has a function of extending the amplification band in a stepwise manner, wherein the setting control unit controls the setting for the gain in such a manner that a total output of pumping lights P in milliwatt satisfies a condition $$P=(C1 \cdot n+C2)G$$

where n is number of pumping wavelengths, G is a Raman gain in decibel, and C1 and C2 are constants that are set for each amplifier to which the pumping light source unit is applied.

3. A pumping light source unit for Raman amplification comprising:
   at least one pumping light source that outputs a first pumping light covering a current amplification band;
   at least one additional pumping light source that outputs a second pumping light covering an amplification band to be extended; and
   a setting control unit that controls a setting for a gain of an entire amplification band by resetting outputs of the first pumping light and the second pumping light, wherein
   the pumping light source unit has a function of extending the amplification band in a stepwise manner, wherein the setting control unit controls the setting for the gain under a condition that an output of a pumping light in a longest wavelength at each stage of amplification band extension is reduced sequentially with progress of stages.

4. The pumping light source unit according to claim 3, wherein, when an amplification band is extended to a short wavelength side, the setting control unit controls the setting for the gain under a condition that an output of a pumping light of a pumping light source that has a shortest wavelength according to a combination of each of the pumping light sources at each stage is maximized.

5. The pumping light source unit according to claim 3, wherein, when an amplification band is extended to a long wavelength side, the setting control unit controls the setting for the gain under a condition that an output of a pumping light of a pumping light source that has a longest wavelength according to a combination of each of the pumping light sources at each stage is maximized.

6. A pumping light source unit for Raman amplification comprising:
- at least one pumping light source that outputs a first pumping light covering a current amplification band;
- at least one additional pumping light source that outputs a second pumping light covering an amplification band to be extended; and
- a setting control unit that controls a setting for a gain of an entire amplification band by resetting outputs of the first pumping light and the second pumping light, wherein
- the pumping light source unit has a function of extending the amplification band in a stepwise manner, wherein the setting control unit controls the setting for the gain under a condition that either an output of a pumping light of a pumping light source that has a longest wavelength at each stage or an output of a pumping light of a pumping light source that has a shortest wavelength is maximized.

7. A pumping light source unit for Raman amplification comprising:
- at least one pumping light source that outputs a first pumping light covering a current amplification band;
- at least one additional pumping light source that outputs a second pumping light covering an amplification band to be extended; and
- a setting control unit that controls a setting for a gain of an entire amplification band by resetting outputs of the first pumping light and the second pumping light, wherein
- the pumping light source unit has a function of extending the amplification band in a stepwise manner, wherein the setting control unit controls the setting for the gain under a condition that an output of a pumping light of a pumping light source that has a longest wavelength at each stage is maximized.

8. The pumping light source unit according to claim 3, wherein the setting control unit controls the setting for the gain to satisfy
- a condition that, when an amplification band is extended to a short wavelength side, an output of a pumping light of a pumping light source that has a shortest wavelength according to a combination of each of the pumping light sources at each stage is maximized; and
- a condition that an output of a pumping light output of a pumping light source that has a longest wavelength at each stage is maximized for each stage of the amplification band extension.

9. The pumping light source unit according to claim 3, wherein the setting control unit controls the setting for the gain to satisfy
- a condition that, when an amplification band is extended to a short wavelength side, an output of a pumping light of a pumping light source that has a shortest wavelength according to a combination of each of the pumping light sources at each stage is maximized; and
- a condition that either an output of a pumping light of a pumping light source that has a longest wavelength at each stage or an output of a pumping light of a pumping light source that has a shortest wavelength is maximized.

10. The pumping light source unit according to claim 3, wherein the setting control unit controls the setting for the gain to satisfy
- a condition that an output of a pumping light output of a pumping light source that has a longest wavelength at each stage is maximized for each stage of the amplification band extension; and
- a condition for, when an amplification band is extended in a long wavelength side, maximizing a pumping light output in a pumping light source, which has a longest pumping light wavelength, according to a combination of the respective pumping light sources at each stage.

11. The pumping light source unit according to claim 3, wherein the setting control unit controls the setting for the gain to satisfy
- a condition that either an output of a pumping light of a pumping light source that has a longest wavelength at each stage or an output of a pumping light of a pumping light source that has a shortest wavelength is maximized; and
- a condition for, when an amplification band is extended in a long wavelength side, maximizing a pumping light output in a pumping light source, which has a longest pumping light wavelength, according to a combination of the respective pumping light sources at each stage.

12. The pumping light source unit according to claim 1, wherein
- a minimum interval of a pumping light frequency of each of the pumping light sources is about 1 terahertz, and
- a Raman gain is about 10 decibels or less.

13. The pumping light source unit according to claim 1, wherein
- a minimum interval of a pumping light frequency of each of the pumping light sources is about 2 terahertz, and
- a Raman gain is about 5 decibels or less.

14. The pumping light source unit according to claim 1, further comprising a multiplexer that multiplexes pumping lights output from each of the pumping light sources, wherein
- the multiplexer is a Mach-Zender type wavelength multiplexer.

15. A pumping light source unit for Raman amplification comprising:
- at least one pumping light source that outputs a first pumping light covering a current amplification band;
- at least one additional pumping light source that outputs a second pumping light covering an amplification band to be extended; and
- a setting control unit that controls a setting for a gain of an entire amplification band by resetting outputs of the first pumping light and the second pumping light, wherein
- the pumping light source unit has a function of extending the amplification band in a stepwise manner, wherein the setting control unit controls the setting for the gain in such a manner that a total output of pumping lights at each stage of amplification band extension is proportional to number of pumping wavelengths, wherein a primary unit is constituted with the at least one pumping light source, the primary unit multiplexing an input pumping light and outputting a pumping light multiplexed, and a secondary unit constituted with the at least one additional pumping light source is added to the primary unit.

16. The pumping light source unit according to claim 15, wherein the secondary unit is added by a connector connection.

17. A pumping light source unit for Raman amplification comprising:

at least one pumping light source that outputs a first pumping light covering a current amplification band;

at least one additional pumping light source that outputs a second pumping light covering an amplification band to be extended; and a setting control unit that controls a setting for a gain of an entire amplification band by resetting outputs of the first pumping light and the second pumping light, wherein the pumping light source unit has a function of extending the amplification band in a stepwise manner, wherein the setting control unit controls the setting for the gain in such a manner that a total output of pumping lights at each stage of amplification band extension is proportional to number of pumping wavelengths, wherein a primary unit multiplexes an input pumping light, and outputs a pumping light multiplexed, and a secondary unit constituted with the at least one additional pumping light source is connected to the primary unit.

18. The pumping light source unit according to claim 15, wherein the secondary unit constituted with the at least one additional pumping light source is added to the primary unit on a shorter wavelength side than an amplification band of the at least one pumping light source.

19. The pumping light source unit according to claim 15, wherein the secondary unit constituted with the at least one additional pumping light source is added to the primary unit on a shorter wavelength side than a pumping wavelength of the at least one pumping light source.

20. A Raman amplifier that amplifies an input signal light using a pumping light source for Raman amplification, wherein the pumping light source includes at least one pumping light source that outputs a first pumping light covering a current amplification band;

at least one additional pumping light source that outputs a second pumping light covering an amplification band to be extended; and a setting control unit that controls a setting for a gain of an entire amplification band by resetting outputs of the first pumping light and the second pumping light, and the pumping light source unit has a function of extending the amplification band in a stepwise manner, wherein the setting control unit controls the setting of the gain in such a manner that a total output of pumping lights at each stage of amplification band extension is proportional to number of pumping wavelengths.

21. A method of setting outputs of pumping lights from each of a plurality of pumping light sources used when extending an amplification band in a stepwise manner, the method comprising:

acquiring pumping light wavelengths of a pumping light source covering a current amplification band and an additional pumping light source, and a history of an output of a pumping light of the pumping light source;

determining an output of a pumping light of each of the pumping light sources in such a manner that a total output of the pumping light at each stage of amplification band extension is proportional to number of pumping wavelengths; and resetting an output of a pumping light of a pumping light source having the respective pumping light wavelengths determined at the determining.

22. A method of setting outputs of pumping lights from each of a plurality of pumping light sources used when extending an amplification band in a stepwise manner, the method comprising:

acquiring pumping light wavelengths of a pumping light source covering a current amplification band and an additional pumping light source, and a history of an output of a pumping light of the pumping light source;

determining an output of a pumping light of each of the pumping light sources in such a manner that a total output of pumping lights P in milliwatt in each stage of amplification band extension satisfies a condition $$P=(C1 \cdot n + C2)G$$

where n is number of pumping wavelengths, G is a Raman gain in decibel, and C1 and C2 are constants that are set for each amplifier to which the pumping light source unit is applied; and resetting an output of a pumping light of a pumping light source having the respective pumping light wavelengths determined at the determining.

23. A method of setting outputs of pumping lights from each of a plurality of pumping light sources used when extending an amplification band in a stepwise manner, the method comprising:

acquiring pumping light wavelengths of a pumping light source covering a current amplification band and an additional pumping light source, and a history of an output of a pumping light of the pumping light source;

determining an output of a pumping light of each of the pumping light sources to satisfy a condition that an output of a pumping light in a longest wavelength at each stage of amplification band extension is reduced sequentially with progress of stages;

a condition that, when an amplification band is extended to a short wavelength side, an output of a pumping light of a pumping light source that has a shortest wavelength according to a combination of each of the pumping light sources at each stage is maximized, and when an amplification band is extended in a long wavelength side, maximizing a pumping light output in a pumping light source, which has a longest pumping light wavelength, according to a combination of the respective pumping light sources at each stage; and a condition that either an output of a pumping light of a pumping light source that has a longest wavelength at each stage or an output of a pumping light of a pumping light source that has a shortest wavelength is maximized; and resetting an output of a pumping light of a pumping light source having the respective pumping light wavelengths determined at the determining.

24. The method according to claim 23, wherein the determining includes determining the output of the pumping light of each of the pumping light sources to satisfy

- a condition that an output of a pumping light in a longest wavelength at each stage of amplification band extension is reduced sequentially with progress of stages;
- a condition that, when an amplification band is extended to a short wavelength side, an output of a pumping light of a pumping light source that has a shortest wavelength according to a combination of each of the pumping light sources at each stage is maximized, and when an amplification band is extended in a long wavelength side, maximizing a pumping light output in a pumping light source, which has a longest pumping light wavelength, according to a combination of the respective pumping light sources at each stage; and
- a condition that an output of a pumping light output of a pumping light source that has a longest wavelength at each stage is maximized for each stage of the amplification band extension.

25. A computer-readable recording medium that stores a computer program for setting outputs of pumping lights from each of a plurality of pumping light sources used when extending an amplification band in a stepwise manner, wherein the computer program makes a computer execute

- acquiring pumping light wavelengths of a pumping light source covering a current amplification band and an additional pumping light source, and a history of an output of a pumping light of the pumping light source;
- determining an output of a pumping light of each of the pumping light sources in such a manner that a total output of the pumping light at each stage of amplification band extension is proportional to number of pumping wavelengths; and
- resetting an output of a pumping light of a pumping light source having the respective pumping light wavelengths determined at the determining.

* * * * *